US009083520B2

United States Patent
Lee et al.

(10) Patent No.: US 9,083,520 B2
(45) Date of Patent: Jul. 14, 2015

(54) APPARATUS FOR TRANSMITTING CONTROL INFORMATION IN A WIRELESS COMMUNICATION SYSTEM AND METHOD THEREOF

(75) Inventors: Hyunwoo Lee, Anyang-si (KR); Jaehoon Chung, Anyang-si (KR); Seunghee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 13/820,452

(22) PCT Filed: Sep. 15, 2011

(86) PCT No.: PCT/KR2011/006806
§ 371 (c)(1),
(2), (4) Date: Mar. 1, 2013

(87) PCT Pub. No.: WO2012/036479
PCT Pub. Date: Mar. 22, 2012

(65) Prior Publication Data
US 2013/0163553 A1    Jun. 27, 2013

Related U.S. Application Data

(60) Provisional application No. 61/382,933, filed on Sep. 15, 2010, provisional application No. 61/386,569, filed on Sep. 27, 2010, provisional application No. 61/389,622, filed on Oct. 4, 2010, provisional application No. 61/389,725, filed on Oct. 5, 2010, provisional application No. 61/390,190, filed on Oct. 6, 2010.

(51) Int. Cl.
*H04L 1/16* (2006.01)
*H04W 72/04* (2009.01)
(Continued)

(52) U.S. Cl.
CPC ............ *H04L 1/1671* (2013.01); *H04L 1/0027* (2013.01); *H04L 1/0029* (2013.01);
(Continued)

(58) Field of Classification Search
CPC ... H04L 5/0053; H04L 5/0055; H04L 1/1861; H04L 1/1671; H04L 1/0026; H04L 1/0073; H04L 27/2697; H04L 5/0057; H04W 72/0406; H04W 72/1278
USPC ......................................... 370/329, 252, 280
See application file for complete search history.

(56) References Cited

U.S. PATENT DOCUMENTS

2010/0232311 A1*   9/2010   Zhang et al. .................. 370/252
2010/0232382 A1*   9/2010   Gauvreau et al. ............. 370/329
(Continued)

OTHER PUBLICATIONS

LG Electronics, "Resource allocation for ACK/NACK PUCCH", R1-103728, 3GPP TSG RAN WG1 #61bis, Jun. 2010, 6 pages.
(Continued)

*Primary Examiner* — Charles C Jiang
*Assistant Examiner* — Will Lin
(74) *Attorney, Agent, or Firm* — Lee, Hong, Degerman, Kang & Waimey

(57) ABSTRACT

In a wireless communication system, a method of transmitting control information, which is transmitted to a base station by a user equipment, includes the steps of receiving at least one of PDCCH and PDSCH from the base station via at least one serving cell configured in the user equipment and transmitting a 2nd control information to the base station together with a 1st control information resulting from performing a bundling on at least one portion of the control information on a reception of the PDCCH or a reception of the PDSCH indicated by the PDCCH, wherein the 1st control information and the 2nd control information are transmitted using PUCCH (Physical Uplink Control Channel) resource selected in accordance with a preset rule and a modulation value and wherein the 1st control information and the 2nd control information are identified by a combination of the selected PUCCH resource and the modulation value.

20 Claims, 39 Drawing Sheets

(51) Int. Cl.
*H04L 1/00* (2006.01)
*H04L 5/00* (2006.01)

(52) U.S. Cl.
CPC ............. *H04L 5/001* (2013.01); *H04L 5/0053* (2013.01); *H04L 5/0055* (2013.01); *H04L 5/0091* (2013.01); *H04W 72/0406* (2013.01); *H04L 5/0007* (2013.01)

(56) References Cited

U.S. PATENT DOCUMENTS

| | | | |
|---|---|---|---|
| 2011/0280164 A1* | 11/2011 | Luo et al. | 370/281 |
| 2012/0069826 A1* | 3/2012 | Nakao et al. | 370/336 |
| 2012/0113962 A1* | 5/2012 | Jen | 370/336 |
| 2014/0086183 A1* | 3/2014 | Aiba et al. | 370/329 |

OTHER PUBLICATIONS

Nokia, et al., "PUCCH Format 1a/1b Resource Allocation in LTE-A TDD", R1-104432, 3GPP TSG RAN WG1 Meeting #62, Aug. 2010, 5 pages.

Samsung, "Need for DAI and HARQ-ACK Transmission Aspects with CA", R1-104576, 3GPP TSG RAN WG1 #62, Aug. 2010, 4 pages.

Samsung, "Discussion on ACK/NACK bundling method for LTE-A TDD", R1-104579, 3GPP TSG RAN WG1 meeting #62, Aug. 2010, 6 pages.

PCT International Application No. PCT/KR2011/006806, Written Opinion of the International Searching Authority dated Feb. 24, 2012, 9 pages.

\* cited by examiner

FIG. 5
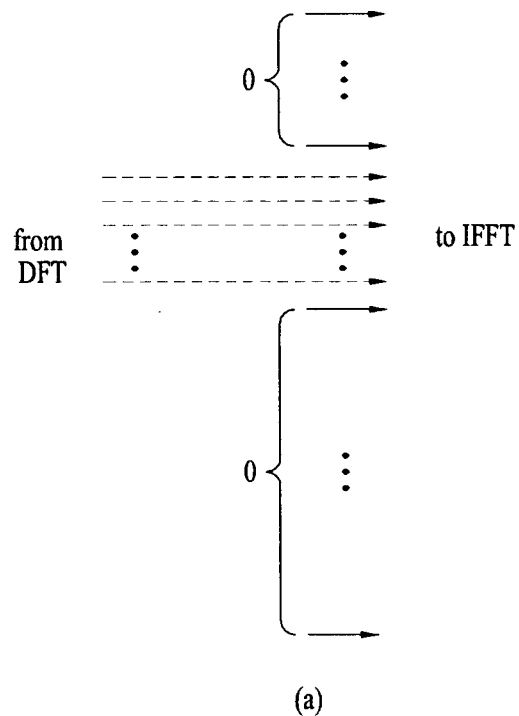
(a)
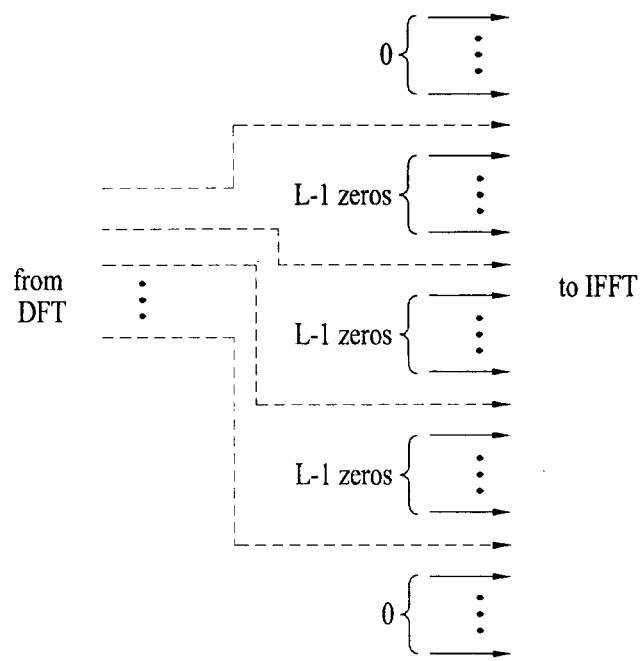
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\Delta_{shift}^{PUCCH}=2$

| Cell specific cyclic shift offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $\bar{n}_{OC}=0$ | $\bar{n}_{OC}=1$ | $\bar{n}_{OC}=2$ | $n_{OC}=0$ | $n_{OC}=1$ | $n_{OC}=2$ |
| $n_{CS}=1$ | $n_{CS}=0$ | $n'=0$ | 6 | 12 | $n'=0$ | 6 | 12 |
| 2 | 1 | 1 | 7 | 13 | 1 | 7 | 13 |
| 3 | 2 | 2 | 8 | 14 | 2 | 8 | 14 |
| 4 | 3 | 3 | 9 | 15 | 3 | 9 | 15 |
| 5 | 4 | 4 | 10 | 16 | 4 | 10 | 16 |
| 6 | 5 | 5 | 11 | 17 | 5 | 11 | 17 |
| 7 | 6 | | | | | | |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \{1,2,3\}$ for normal cyclic prefix
$\{1,2,3\}$ for extended cyclic prefix $\delta_{offset}^{PUCCH} \in \{0,1,...,\Delta_{shift}^{PUCCH}-1\}$ Cell specific cyclic shift offset $n_{OC}$ Orthogonal sequence index for ACK/NACK
$\bar{n}_{OC}$ Orthogonal sequence index for RS
$n_{CS}$ Cyclic shift value of a CAZAC sequence
$n'$ ACK/NACK resource index used for the channelization in a RB Cell-specific Cyclic shift value of CAZAC sequence

FIG. 18

APPARATUS FOR TRANSMITTING CONTROL INFORMATION IN A WIRELESS COMMUNICATION SYSTEM AND METHOD THEREOF

CROSS-REFERENCE TO RELATED APPLICATIONS

This application is the National Stage filing under 35 U.S.C. 371 of International Application No. PCT/KR2011/006806, filed on Sep. 15, 2011, which claims the benefit of U.S. Provisional Application Ser. No. 61/382,933, filed on Sep. 15, 2010, U.S. Provisional Application Ser. No. 61/386,569, filed on Sep. 27, 2010, U.S. Provisional Application Ser. No. 61/389,622, filed on Oct. 4, 2010, U.S. Provisional Application Ser. No. 61/389,725, filed on Oct. 5, 2010, and U.S. Provisional Application Ser. No. 61/390,190, filed on Oct. 6, 2010, the contents of which are all hereby incorporated by reference herein in their entirety.

TECHNICAL FIELD

The present invention relates to a wireless mobile communication system, and more particularly, to an apparatus for transmitting control information and method thereof. The wireless communication system may support carrier aggregation (hereinafter abbreviated CA).

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmission power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Problem

Accordingly, the present invention is directed to a wireless communication system that substantially obviates one or more of the problems due to limitations and disadvantages of the related art.

An object of the present invention is to provide an apparatus for transmitting control information in a wireless communication system and method thereof, by which control information may be efficiently transmitted.

Another object of the present invention is to provide a channel format, signal processing method and apparatus therefor, by which control information may be efficiently transmitted.

A further object of the present invention is to provide a method of allocating a resource for carrying control information efficiently and apparatus therefor. Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Technical Solution

To achieve these and other advantages and in accordance with the purpose of the present invention, as embodied and broadly described, in a wireless communication system, a method of transmitting control information, which is transmitted to a base station by a user equipment, includes the steps of receiving at least one of PDCCH (Physical Downlink Control Channel) and PDSCH (Physical Downlink Shared CHannel) from the base station via at least one serving cell configured in the user equipment and transmitting a $2^{nd}$ control information to the base station together with a $1^{st}$ control information resulting from performing a bundling on at least one portion of the control information on a reception of the PDCCH or a reception of the PDSCH indicated by the PDCCH, wherein the $1^{st}$ control information and the $2^{nd}$ control information are transmitted using PUCCH (Physical Uplink Control Channel) resource selected in accordance with a preset rule and a modulation value and wherein the $1^{st}$ control information and the $2^{nd}$ control information are identified by a combination of the selected PUCCH resource and the modulation value.

Preferably, the $1^{st}$ control information may include an acknowledgement response (ACK) information or a negative acknowledgement response (NACK) information, the 2nd control information may include DAI information last detected by the user equipment from at least one DAI (downlink assignment index) information carried on the PDCCH, and the at least one DAI information may indicate an assignment order of at least one of the received PDCCH and the received PDSCH.

More preferably, if the $1^{st}$ control information includes the NACK information, the selected PUCCH resource may include a $1^{st}$ PUCCH resource previously set among a plurality of PUCCH resources.

In this case, if the $1^{st}$ control information includes the ACK information, the selected PUCCH resource may include the PUCCH resource except the $1^{st}$ PUCCH resource among a plurality of the PUCCH resources.

Preferably, the bundling may include a full bundling.

Preferably, the PDCCH may carry at least one or more transport blocks or indicate the PDSCH carrying the at least one or more transport blocks. And, each of the $1^{st}$ and $2^{nd}$ control informations may relate to each of the at least one or more transport blocks included in the PDCCH or the PDSCH indicated by the PDCCH.

More preferably, the $1^{st}$ control information may relate to each of maximum transport blocks carried by the PDCCH or the PDSCH indicated by the PDCCH. If the number of the transport blocks carried by the PDCCH or the PDSCH indicated by the PDCCH is smaller than that of the maximum transport blocks, the $1^{st}$ control information on each of the transport blocks except the transport blocks actually carried by the PDCCH or the PDSCH indicated by the PDCCH among the maximum transport blocks carried by the PDCCH or the PDSCH indicated by the PDCCH may include the NACK information.

More preferably, the $1^{st}$ control information may relate to each of maximum transport blocks carried by the PDCCH or the PDSCH indicated by the PDCCH. If the number of the transport blocks carried by the PDCCH or the PDSCH indicated by the PDCCH is smaller than that of the maximum transport blocks, the $1^{st}$ control information on each of the transport blocks except the transport blocks actually carried by the PDCCH or the PDSCH indicated by the PDCCH among the maximum transport blocks carried by the PDCCH or the PDSCH indicated by the PDCCH may be equal to the $1^{st}$ control information on the actually carried transport blocks.

Meanwhile, if the control information on the reception of the PDCCH or the reception of the PDSCH indicated by the PDCCH includes DTX (discontinuous transmission) information, the $1^{st}$ control information and the $2^{nd}$ control information may relate to the PDCCH before generation of the DTX information or the PDSCH indicated by the PDCCH among the received PDCCH or the PDSCH indicated by the PDCCH.

In this case, if the $1^{st}$ control information includes the ACK, the $1^{st}$ control information and the $2^{nd}$ control information may be transmitted.

To further achieve these and other advantages and in accordance with the purpose of the present invention, in a wireless communication system, a method of receiving control information, which is received by a base station from a user equipment, includes the steps of transmitting at least one of PDCCH (Physical Downlink Control Channel) and PDSCH (Physical Downlink Shared CHannel) via at least one serving cell configured in the user equipment and receiving a $2^{nd}$ control information from the user equipment together with a $1^{st}$ control information resulting from performing a bundling on at least one portion of the control information on a transmission of the PDCCH or a transmission of PDSCH indicated by the PDCCH, wherein the $1^{st}$ control information and the $2^{nd}$ control information are received using PUCCH (Physical Uplink Control Channel) resource selected in accordance with a preset rule and a modulation value and wherein the $1^{st}$ control information and the $2^{nd}$ control information are identified by a combination of the selected PUCCH resource and the modulation value.

Preferably, the $1^{st}$ control information may include an acknowledgement response (ACK) information or a negative $2^{nd}$ acknowledgement response (NACK) information, the control information may include DAI information last detected by the user equipment from at least one DAI (downlink assignment index) information carried on the PDCCH, and the at least one DAI information may indicate an assignment order of at least one of the received PDCCH and the received PDSCH.

To further achieve these and other advantages and in accordance with the purpose of the present invention, a user equipment, which transmits control information to a base station in a wireless communication system, includes a receiver receiving at least one of PDCCH (Physical Downlink Control Channel) and PDSCH (Physical Downlink Shared CHannel) from the base station via at least one serving cell configured in the user equipment, a transmitter transmitting a $2^{nd}$ control information to the base station together with a $1^{st}$ control information resulting from performing a bundling on at least one portion of the control information on a reception of the PDCCH or a PDSCH reception indicated by the PDCCH, and a processor controlling the $1^{st}$ control information and the $2^{nd}$ control information to be transmitted using PUCCH (Physical Uplink Control Channel) resource selected in accordance with a preset rule and a modulation value, wherein the $1^{st}$ control information and the $2^{nd}$ control information are identified by a combination of the selected PUCCH resource and the modulation value.

Preferably, the $1^{st}$ control information may include an acknowledgement response (ACK) information or a negative $2^{nd}$ acknowledgement response (NACK) information, the control information may include DAI information last detected by the user equipment from at least one DAI (downlink assignment index) information carried on the PDCCH, and the at least one DAI information may indicate an assignment order of at least one of the received PDCCH and the received PDSCH.

More preferably, if the $1^{st}$ control information includes the NACK information, the selected PUCCH resource may include a $1^{st}$ PUCCH resource previously set among a plurality of PUCCH resources.

In this case, if the $1^{st}$ control information includes the ACK information, the selected PUCCH resource may include the PUCCH resource except the $1^{st}$ PUCCH resource among a plurality of the PUCCH resources.

Meanwhile, the PDCCH may carry at least one or more transport blocks or indicate the PDSCH carrying the at least one or more transport blocks. And, each of the $1^{st}$ and $2^{nd}$ control informations may relate to each of the at least one or more transport blocks included in the PDCCH or the PDSCH indicated by the PDCCH.

In this case, the $1^{st}$ control information may relate to each of maximum transport blocks carried by the PDCCH or the PDSCH indicated by the PDCCH. If the number of the transport blocks carried by the PDCCH or the PDSCH indicated by the PDCCH is smaller than that of the maximum transport blocks, the $1^{st}$ control information on each of the transport blocks except the transport blocks actually carried by the PDCCH or the PDSCH indicated by the PDCCH among the maximum transport blocks carried by the PDCCH or the PDSCH indicated by the PDCCH may include the NACK information.

Moreover, the $1^{st}$ control information may relate to each of maximum transport blocks carried by the PDCCH or the PDSCH indicated by the PDCCH. If the number of the transport blocks carried by the PDCCH or the PDSCH indicated by the PDCCH is smaller than that of the maximum transport blocks, the $1^{st}$ control information on each of the transport blocks except the transport blocks actually carried by the PDCCH or the PDSCH indicated by the PDCCH among the maximum transport blocks carried by the PDCCH or the PDSCH indicated by the PDCCH may be equal to the $1^{st}$ control information on the actually carried transport blocks.

Besides, if the control information on the reception of the PDCCH or the reception of the PDSCH indicated by the PDCCH includes DTX (discontinuous transmission) information, the $1^{st}$ control information and the $2^{nd}$ control information may relate to the PDCCH before generation of the DTX information or the PDSCH indicated by the PDCCH among the received PDCCH or the PDSCH indicated by the PDCCH.

It is to be understood that both the foregoing general description and the following detailed description are exemplary and explanatory and are intended to provide further explanation of the invention as claimed.

Advantageous Effects

Accordingly, the present invention provides the following effects and/or advantages.

First of all, the present invention may transmit control information efficiently in a wireless communication system.

Secondly, the present invention may provide a channel format and a signal processing method, thereby transmitting control information efficiently.

Thirdly, the present invention may efficiently allocate a resource for control information transmission.

It is to be understood by those skilled in the art, to which the present invention pertains, that both the foregoing general description and the following detailed description are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a diagram for examples of mapping input symbols to subcarriers in a frequency domain by meeting single carrier property;

FIG. 17 is a diagram of ACK/NACK channelization for PUCCH format 1a and 1b;

FIG. 18 is a diagram of channelization for a hybrid structure of PUCCH format 1/1a/1b and PUCCH format 2/2a/2b;

BEST MODE

Figure 1:
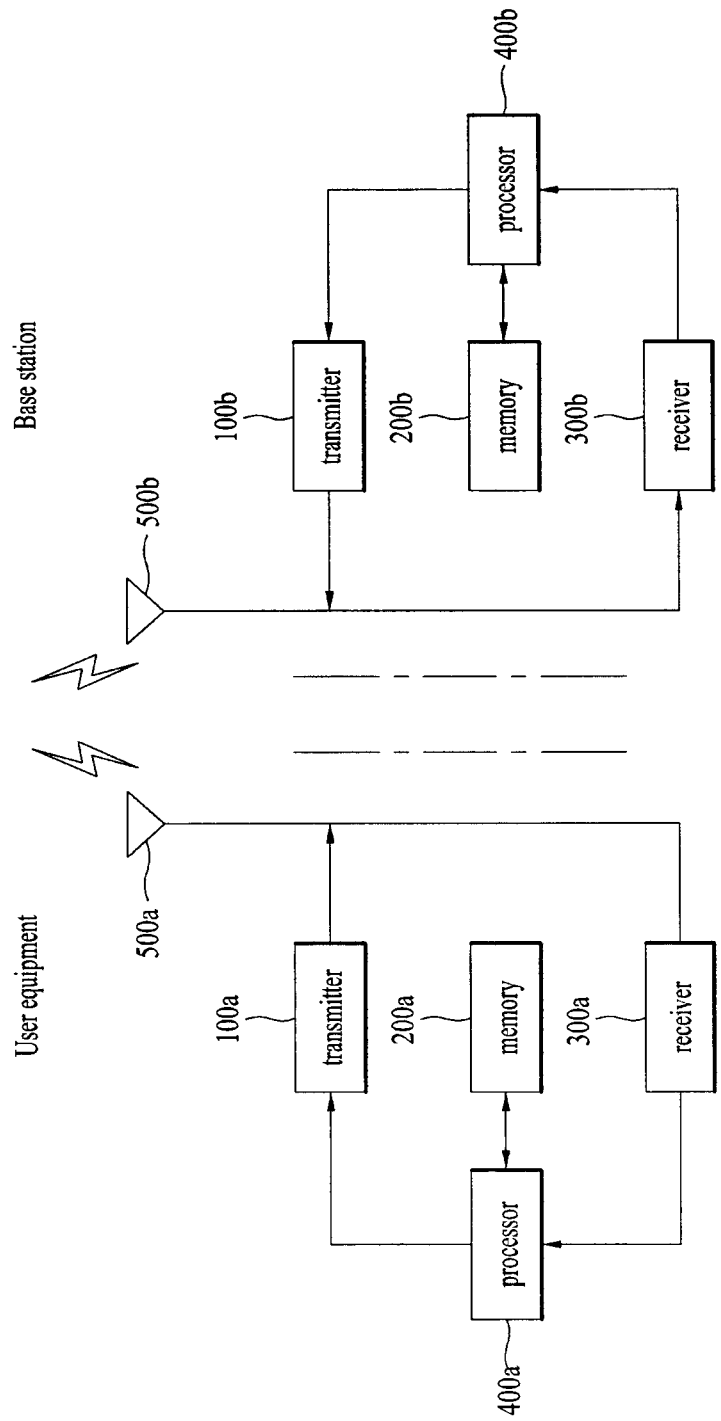
FIG. 1 is a block diagram for configuration of a user equipment and a base station, to which the present invention is applicable.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

First of all, techniques, apparatuses (devices) and systems described in the following description may be applicable to various kinds of wireless multiple access systems. For example, the multiple access system may include one of CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented by such a wireless or radio technology as UTRA (universal terrestrial radio access), CDMA 2000 and the like. TDMA may be implemented with such a wireless technology as GSM (Global System for Mobile communications), GPRS (General Packet Radio Service), EDGE (Enhanced Data Rates for GSM Evolution) and the like. OFDMA may be implemented with such a wireless technology as IEEE (Institute of Electrical and Electronics Engineers) 802.11 (Wi-Fi), IEEE 802.16 (WiMAX), IEEE 802.20, E-UTRA (Evolved UTRA), etc. UTRAN is a part of UMTS (Universal Mobile Telecommunications System). 3GPP (3rd Generation Partnership Project) LTE (long term evolution) is a part of E-UMTS (Evolved UMTS) that uses E-UTRAN. The 3GPP LTE adopts OFDMA in downlink (DL) and SC-FDMA in uplink (UL). And, LTE-A (LTE-Advanced) is an evolved version of 3GPP LTE. For clarity, the following description mainly concerns a case that the present invention is applied to 3GPP LTE/LTE-A, by which the present invention is non-limited. For instance, although the detailed description of the invent may be based on a wireless communication system corresponding to 3GPP LTE/LTE-A system, it may be applicable to other random wireless communication systems except items unique to 3GPP LTE/LTE-A.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts.

Besides, in the following description, a terminal may be stationary or may have mobility. And, the terminal may be a common name of a device for transceiving various kinds of data and control informations by communicating with a base station. The terminal may be named one of a user equipment (UE), a mobile station (MS), a mobile terminal (MT), a user terminal (UT), a subscriber station (SS), a wireless device, a personal digital assistant (PDA), a wireless modem, a handheld device and the like.

A base station generally means a fixed station communicating with a terminal or other base stations and exchanges various kinds of data and control informations by communicating with a terminal and other base stations. The base station may be named such a terminology as an evolved-NodeB (eNB), a base transceiver system (BTS), an access point (AP) and the like.

In the present invention, if a specific signal is assigned to one of frame, subframe, slot, carrier and subcarrier, it may mean that a specific signal is transmitted in an interval or timing of frame/subframe/slot via corresponding carrier/subcarrier.

In the present invention, a rank or a transmission rank may mean the number of layers multiplexed with or allocated to one OFDM symbol or one resource element (RE).

In the present invention, PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) may mean a set of resource elements carrying ACK/NACK (ACKnowlegement/Negative ACK)/downlink data for DCI (Downlink Control Information)/CFI (Control Format Indicator)/uplink transmission.

And, PUCCH (Physical Uplink Control CHannel)/PUSCH (Physical Uplink Shared CHannel)/PRACH (Physical Random Access CHannel) may mean a set of resource elements carrying UCI (Uplink Control Information)/uplink data/random access signal.

In particular, a resource element (RE) allocated or belonging to PDCCH/PCFICH/PHICH/PDSCH/PUCCH/PUSCH/PRACH may be named PDCCH/PCFICH/PHICH/PDSCH/PUCCH/PUSCH/PRACH RE or PDCCH/PCFICH/PHICH/PDSCH/PUCCH/PUSCH/PRACH resource.

Therefore, the expression 'a user equipment transmits PUCCH/PUSCH/PRACH' may be used as the same meaning 'uplink control information/uplink data/random access signal is carried or transmitted on PUSCH/PUCCH/PRACH'. Moreover, the expression 'a base station transmits PDCCH/PCFICH/PHICH/PDSCH' may be used as the same meaning 'downlink control information/downlink data or the like is carried or transmitted on PDCCH/PCFICH/PHICH/PDSCH'

Meanwhile, the expression 'mapping ACK/NACK information to a specific constellation point' may be used as the same meaning 'mapping ACK/NACK information to a specific complex modulation symbol'. And, the expression 'mapping ACK/NACK information to a specific complex modulation symbol' may be used as the same meaning 'modulating ACK/NACK information into a specific complex modulation symbol'.

FIG. 1 is a block diagram for configuration of a user equipment and a base station, to which the present invention is applicable. In particular, a user equipment works as a transmitting device in UL or works as a receiving device in DL. On the contrary, a base station works as a receiving device in UL or works as a transmitting device in DL.

Referring to FIG. 1, a user equipment/base station UE/BS) may include an antenna 500a/500b capable of transmitting and receiving information, data, signals and/or messages and the like, a transmitter 100a/100b transmitting information, data, signals and/or messages by controlling the antenna 500a/500b, a receiver 300a/300b receiving information, data, signals and/or messages by controlling the antenna 500a/500b and a memory 200a/200b storing various kinds of informations within a wireless communication system temporarily or permanently. Moreover, the user equipment/base station may further include a processor 400a/400b controlling various components by being operatively connected to the components including the transmitter, the receiver, the memory and the like.

The transmitter 100a, the receiver 300a, the memory 200a and the processor 400a in the user equipment may be implemented with separate chips as independent components, respectively. Alternatively, at least two of the transmitter 100a, the receiver 300a, the memory 200a and the processor 400a in the user equipment may be implemented with a single chip. On the other hand, the transmitter 100b, the receiver 300b, the memory 200b and the processor 400b in the base station may be implemented with separate chips as independent components, respectively. Alternatively, at least two of the transmitter 100b, the receiver 300b, the memory 200b and the processor 400b in the base station may be implemented with a single chip. Alternatively, the transmitter and the receiver may be integrated into a single transceiver in the user equipment or the base station.

The antenna 500a/500b may play a role in externally transmitting a signal generated from the transmitter 100a/100b. And, the antenna 500a/500b may play a role in receiving a signal from outside and then delivering the received signal to the receiver 300a/300b. Moreover, the antenna 500a/500b may be called an antenna port. In this case, the antenna port may correspond to a single physical antenna or may be configured by a combination of a plurality of physical antennas. In case that MIMO (multi-input multi-output) function of transceiving data and the like using a plurality of antennas is supported by a transceiver, at least two antennas may be connected to the transceiver.

The processor 400a/400b may generally control overall operations of various components or modules in the mobile/base station. In particular, the processor 400a/400b may be able to perform various control functions to implement the above-described embodiments of the present invention, a MAC (medium access control) frame variable control function according to service characteristics and propagation environment, a power saving mode function of controlling an idle mode operation, a handover function, an authentication and encryption function and the like. And, the processor 400a/400b may be named one of a controller, a microcontroller, a microprocessor, a microcomputer and the like. Moreover, the processor 400a/400b may be implemented by hardware, firmware, software or a combination thereof.

The processor 400a of the user equipment may transmit a $2^{nd}$ control information to the base station via the transmitter 100a together with a $1^{st}$ control information including a bundle of at least one portion of a control information on at least one PDCCH reception.

The processor 400a may select PUCCH (physical uplink control channel) resource for the $1^{st}$ control information and the $2^{nd}$ control information from a plurality of PUCCH resources and may control the transmitter 100a to transmit a PUCCH signal carrying a modulation value corresponding to the $1^{st}$ control information and the $2^{nd}$ control information to the base station via the selected PUCCH resource. In this case, each of the $1^{st}$ control information and the $2^{nd}$ control information may be identified by a combination of the selected PUCCH resource and the modulation value.

If the $1^{st}$ control information is NACK (negative acknowledgement) information, the processor 400a may control the selected PUCCH resource to become a $1^{st}$ PUCCH resource previously set among a plurality of the PUCCH resources. On the contrary, if the $1^{st}$ control information is ACK (acknowledgement) information, the processor 400a may control the selected PUCCH resource to become one of a plurality of the PUCCH resources except the $1^{st}$ PUCCH resource.

If the control information on the at least one PDCCH reception includes DTX (discontinuous transmission) information, the processor 400a may control the $1^{st}$ control information and the $2^{nd}$ control information to relate to PDCCH prior to the occurrence of the DTX information among the received at least one or more PDCCHs. In this case, if the $1^{st}$ control information includes the ACK, the processor 400a may control the $1^{st}$ control information and the $2^{nd}$ control information to be transmitted to the base station.

In case of implementing the present invention using hardware, the processor 400a/400b may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing the present invention using firmware or software, the firmware or software may be configured to include modules, procedures, and/or functions for performing the functions or operations of the present invention. And, the firmware or software configured to perform the present invention may be driven by the processor 400a/400b in a manner of being loaded in the processor 400a/400b or being saved in the memory 200a/200b.

The transmitter 100a/100b may perform prescribed coding and modulation on a signal and/or data, which is scheduled by the processor 400a/400b or a scheduler connected to the processor 400a/400b and will be then transmitted externally, and may be then able to deliver the coded and modulated signal and/or data to the antenna 500a/500b.

The memory 200a/200b may store programs for processing and control of the processor 400a/400b and may be able to temporarily store input/output information. And, the memory 200a/200b may be utilized as a buffer. Moreover, the memory 200a/200b may include at least one of storage media including a flash type memory, a hard disk type memory, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Figure 2:
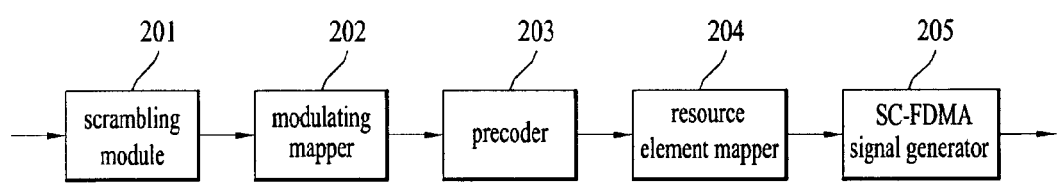
FIG. 2 is a block diagram of a signal processing method for a user equipment to transmit an uplink signal.

FIG. 2 is a block diagram of a signal processing method for a user equipment to transmit an uplink signal.

Referring to FIG. 2, the transmitter 100a within the user equipment may include a scrambling module 201, a modulating mapper 202, a precoder 203, a resource element mapper 204 and an SC-FDMA signal generator 205.

In order to transmit a UL signal, the scrambling module 201 may scramble a transmission signal using a scrambling signal. The scrambled signal may be inputted to the modulating mapper 202 and may be then modulated into a complex modulation symbol using BPSK (Binary Phase Shift Keying), QPSK (Quadrature Phase Shift Keying) or 16 QAM/64 QAM (Quadrature Amplitude Modulation) scheme in accordance with a type of the transmission signal or a channel status. The complex modulation symbol may be processed by the precoder 203 and may be then inputted to the resource element mapper 204. The resource element mapper 204 may be then able to map the complex modulation symbol to a time-frequency resource element. The above-processed signal may be inputted to the SC-FDMA signal generator 205 and may be then transmitted to a base station via an antenna port.

Figure 3:
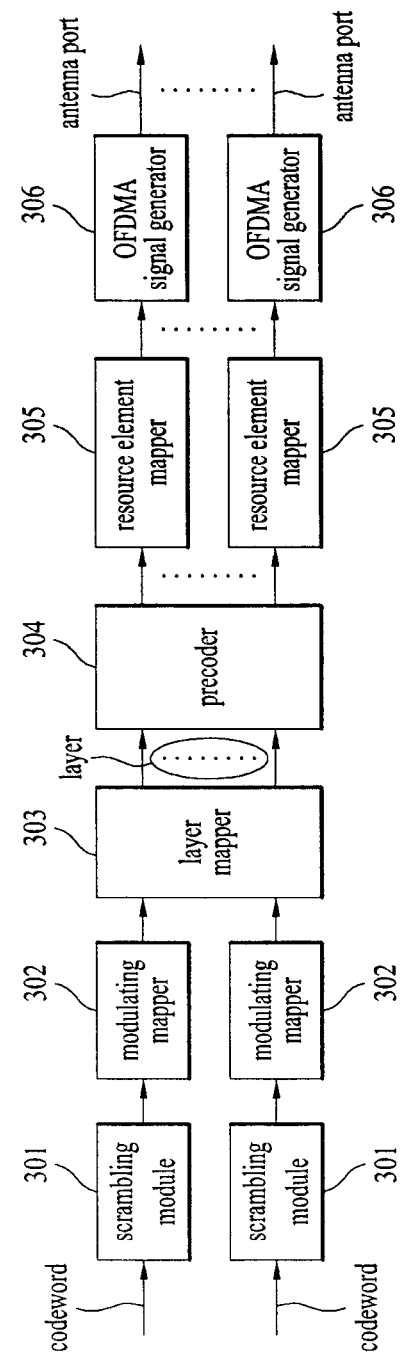
FIG. 3 is a block diagram of a signal processing method for a base station to transmit a downlink signal.

FIG. 3 is a block diagram of a signal processing method for a base station to transmit a downlink signal.

Referring to FIG. 3, the transmitter 100b in the base station may include a scrambling module 301, a modulating mapper 302, a layer mapper 303, a precoder 304, a resource element mapper 305 and an OFDMA signal generator 306.

In order to transmit a DL signal or at least one codeword, a signal or codeword may be modulated into a complex modulation symbol in a manner similar to that shown in FIG. 2. The complex modulation symbol may be mapped to a plurality of layers by the layer mapper 303. Each of the layers is multiplied by a precoding matrix by the precoder 304 and may be then allocated to each transmitting antenna. The above-processed transmission signal per antenna may be mapped to a time-frequency resource element by the resource element mapper 305, may be inputted to the OFDMA (orthogonal frequency division multiple access) signal generator 306, and may be then transmitted via each antenna port.

In case that a user equipment transmits a signal in UL in a wireless communication system, compared to a case that a base station transmits a signal in DL, PAPR (peak-to-average ratio) cause a problem. Hence, as mentioned in the foregoing description with reference to FIG. 2 and FIG. 3, unlike the OFDMA used for DL signal transmission, UL signal transmission adopts SC-FDMA (single carrier-frequency division multiple access).

Figure 4:
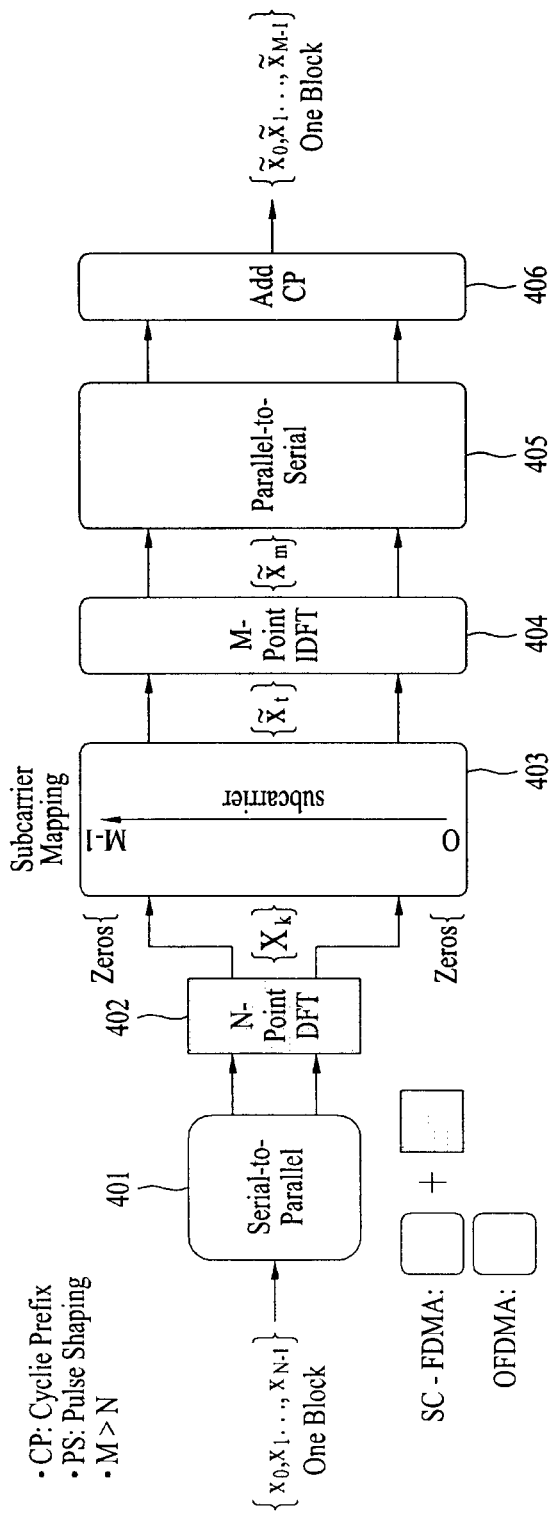
FIG. 4 is a lock diagram for SC-FDMA system and OFDMA system, to which the present invention is applicable.

FIG. 4 is a lock diagram for SC-FDMA system and OFDMA system, to which the present invention is applicable. In particular, 3GPP system adopts OFDMA in DL and SC-FDMA in UL.

Referring to FIG. 4, each of a user equipment for UL signal transmission and a base station for DL signal transmission may identically include a serial-to-parallel converter 401, a subcarrier mapper 403, an M-point IDFT module 404 and a CP (cyclic prefix) adding module 406. Yet, the user equipment for transmitting signals by SC-FDMA may further include an N-point DFT module 402. In particular, the N-point DFT module 402 may offset IDFT processing effect of the M-point IDFT module 404 to some extent, thereby enabling a transmission signal to have single carrier property.

The SC-FDMA should meet the single carrier property. FIG. 5 is a diagram for examples of mapping input symbols to subcarriers in a frequency domain by meeting single carrier property.

Referring to FIG. 5, if a symbol through DFT is allocated to a subcarrier in accordance with one of FIG. 5 (a) and FIG. 5 (b), it may obtain a transmission signal that meets the single carrier property. In this case, FIG. 5 (a) shows a localized mapping scheme and FIG. 5 (b) shows a distributed mapping scheme.

Figure 6:
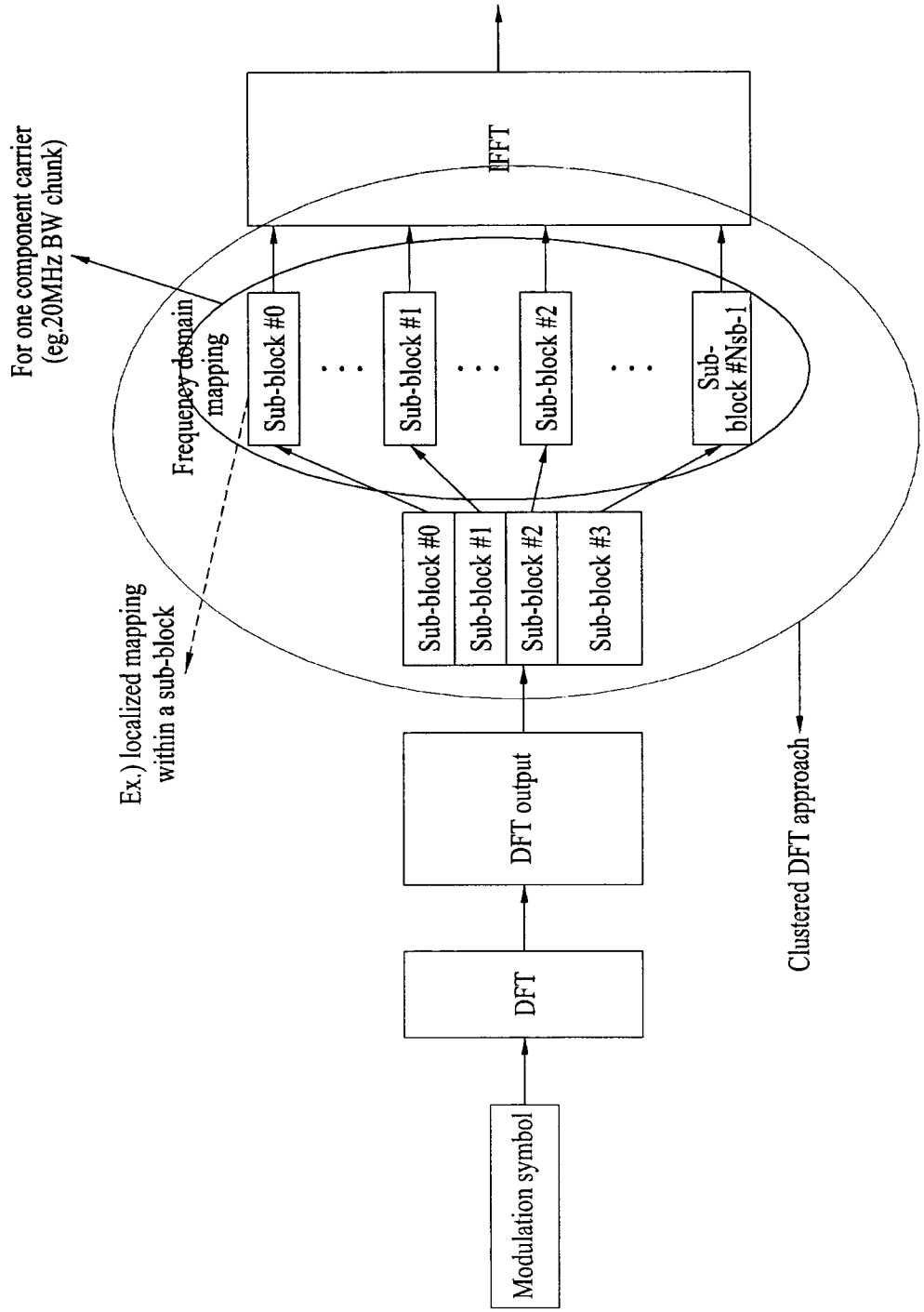
FIG. 6 is a block diagram of a signal processing method for mapping DFT process output samples to single carrier in clustered SC-FDMA.
Figure 7:
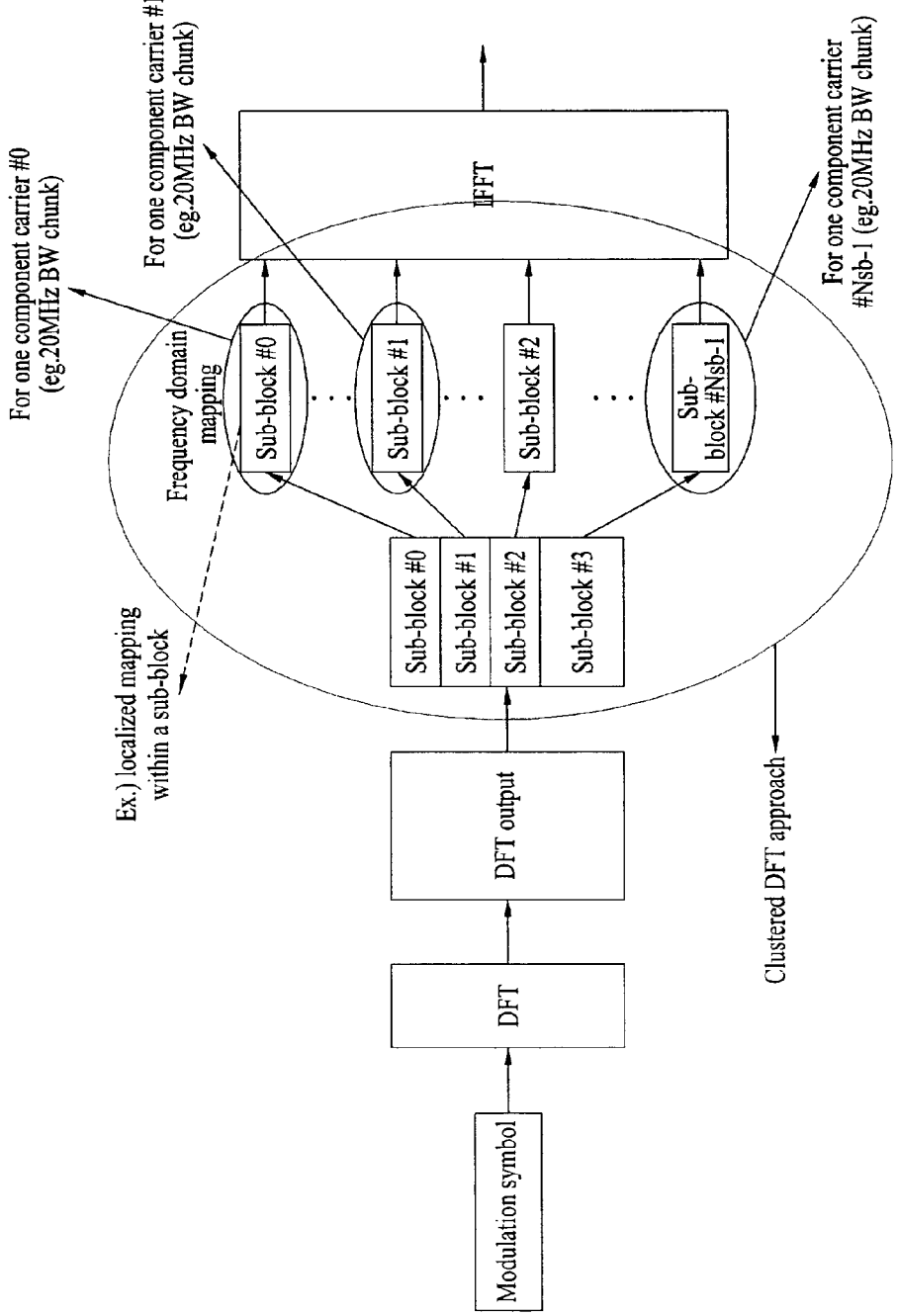
FIG. 7 and FIG. 8 are block diagrams of a signal processing method for mapping DFT process output samples to multi-carrier in clustered SC-FDMA.
Figure 8:
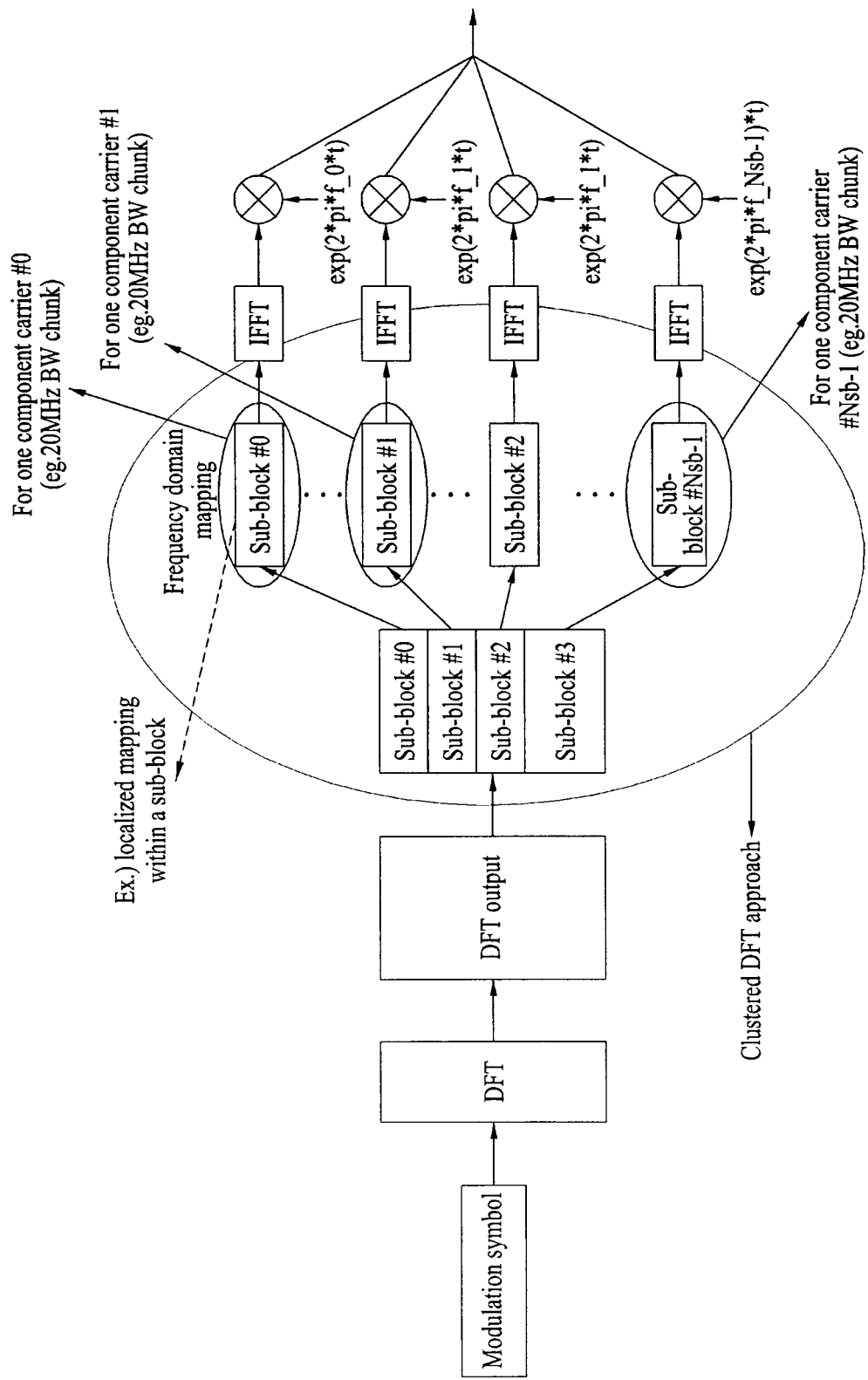

Meanwhile, the transmitter 100a/100b may adopt clustered DFT-s-OFDM. In particular, the clustered DFT-s-OFDM is modification of conventional SC-FDMA and is a signal mapping method including the steps of dividing a signal from a precoder into several subblocks and mapping the subblocks to subcarriers. FIGS. 6 to 8 show examples of mapping an input symbol to a single carrier by DFT-s-OFDM.

FIG. 6 is a block diagram of a signal processing method for mapping DFT process output samples to single carrier in clustered SC-FDMA. FIG. 7 and FIG. 8 are block diagrams of a signal processing method for mapping DFT process output samples to multi-carrier in clustered SC-FDMA. In particular, FIG. 6 shows an example of applying intra-carrier clustered SC-FDMA. FIG. 7 and FIG. 8 correspond to examples of applying inter-carrier clustered SC-FDMA. Referring to FIG. 7, in a situation that component carriers are contiguously allocated in a frequency domain, when subcarrier spacing between adjacent component carriers is aligned, a signal is generated through a single IFFT block. Referring to FIG. 8, in a situation that component carriers are non-contiguously allocated in a frequency domain, a signal is generated through a plurality of IFFT blocks.

Figure 9:
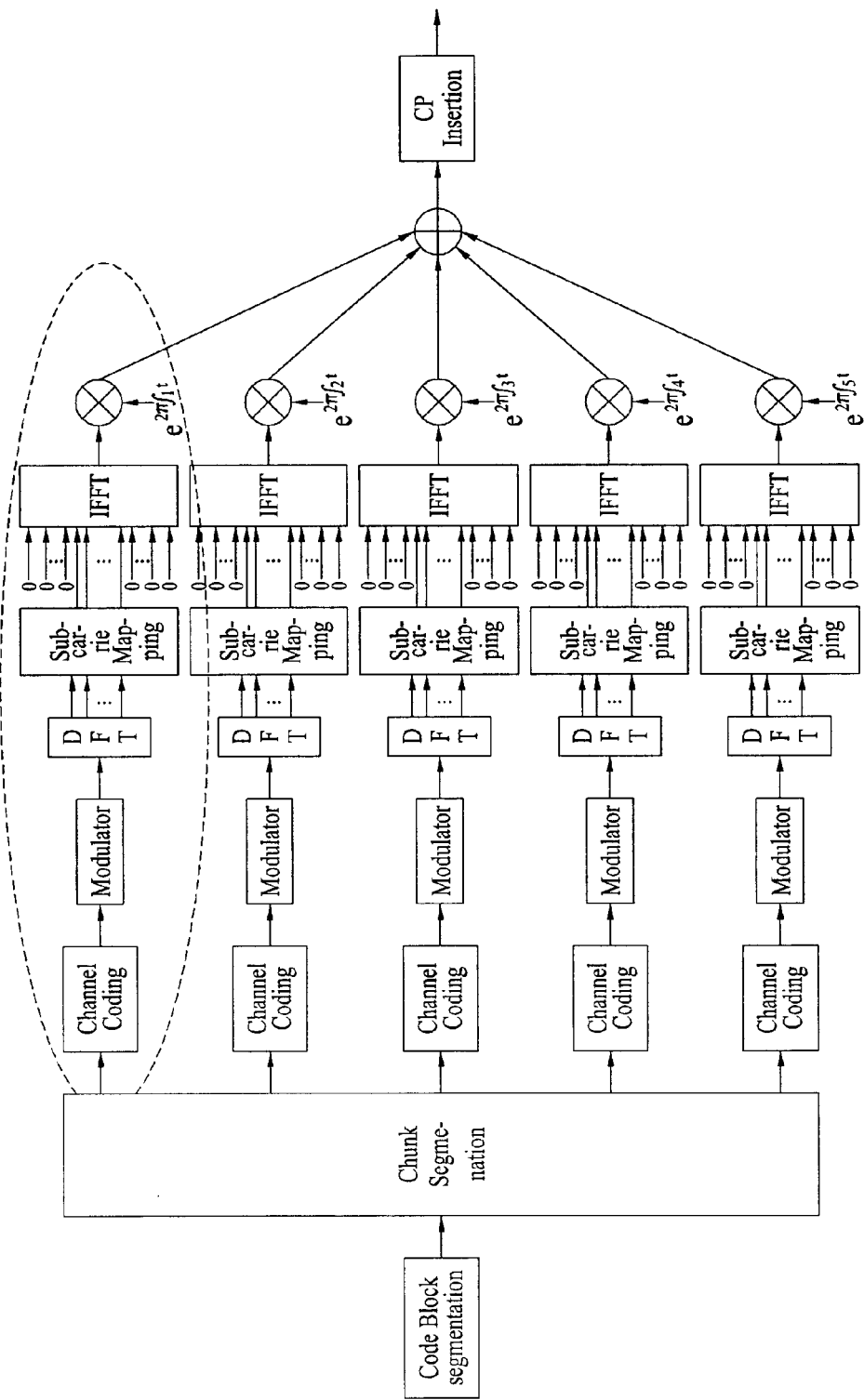
FIG. 9 is a block diagram of a signal processing method of segmented SC-FDMA.

FIG. 9 is a block diagram of a signal processing method of segmented SC-FDMA.

First of all, if IFFTs, of which number is equal to a random number of DFTs, are applied, the configuration of the relation between DFT and IFT becomes one-to-one relation, the segmented SC-FDMA results from simply extending DFT spreading of conventional SC-FDMA and frequency subcarrier mapping configuration of IFFT. And, the segmented SC-FDMA may be expressed as NxSC-FDMA or NxDFT-s-OFDMA. In this specification, they shall be connectively named the segmented SC-FDMA. Referring to FIG. 9, the segmented SC-FDMA may perform a DFT process in a manner of grouping all time-domain modulation symbols into N groups to mitigate the single carrier property condition.

Figure 10:
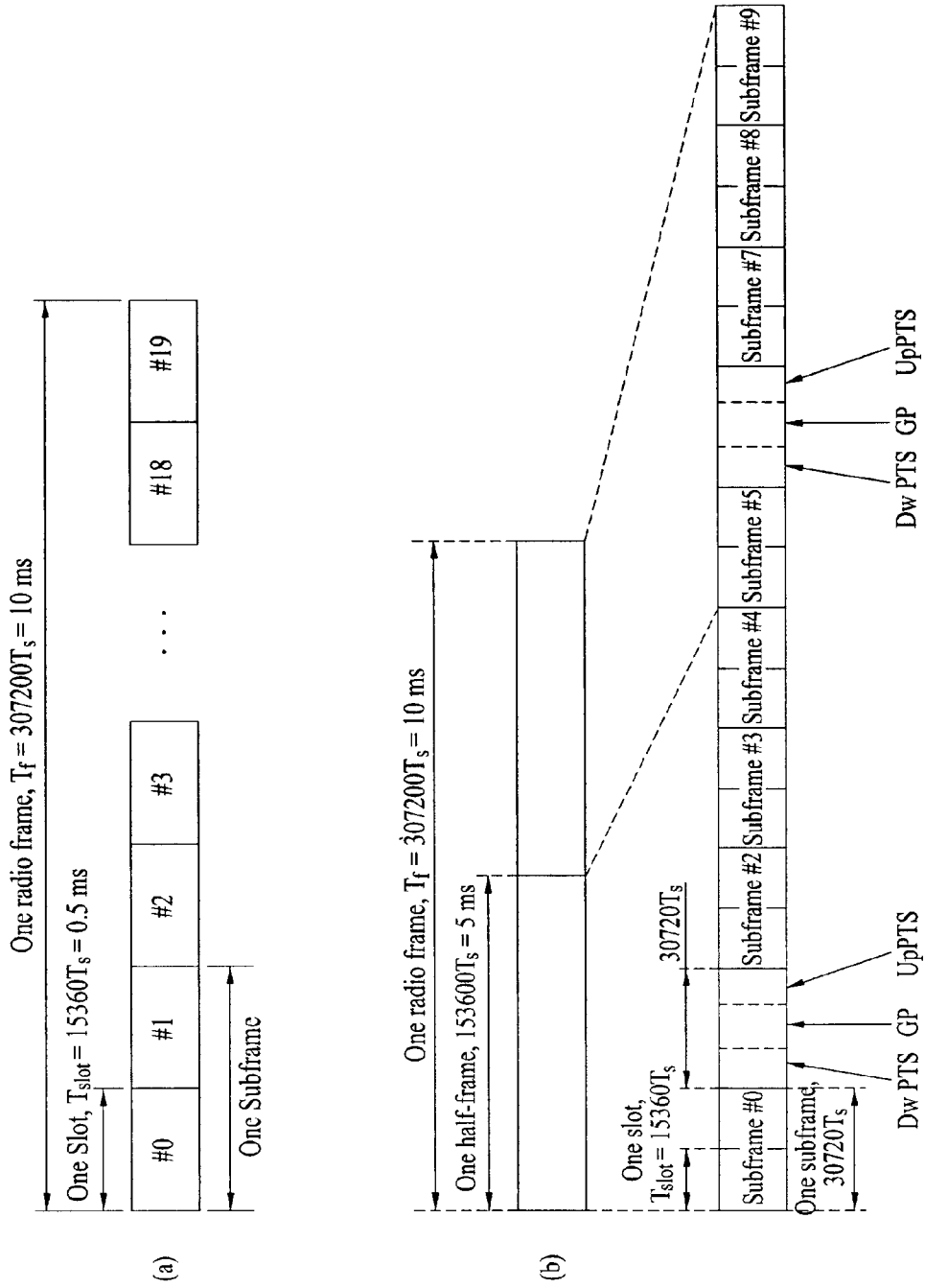
FIG. 10 is a diagram for examples of a radio frame structure used in a wireless communication system.

FIG. 10 is a diagram for examples of a radio frame structure used in a wireless communication system. In particular, FIG. 10 (a) shows an example of a radio frame according to a frame structure type 1 (FS-1) of 3GPP LTE/LTEA system. And, FIG. 10 (b) shows an example of a radio frame according to a frame structure type 2 (FS-2) of 3GPP LTE/LTEA system. The frame structure shown in FIG. 10 (a) may be applicable to FDD (frequency division duplex mode) and half FDD (H-FDD) mode. And, the frame structure shown in FIG. 10 (b) may be applicable to TDD (time division duplex) mode.

Referring to FIG. 10, a radio frame used by 3GPP LTE/LTE-A may have a length of 10 ms (307,200 $T_s$) and may include 10 subframes equal to each other in size. 10 Subframes in one radio frame may be numbered. In this case, $T_s$ may indicate a sampling time and may be represented as Ts=1/(2,048×15 kHz). Each of the subframes may have a length of 1 ms and may include 2 slots. 20 slots in one radio frame may be sequentially numbered from 0 to 19. Each of the slots may have a length of 0.5 ms. Time for transmitting one subframe may be defined as TTI (transmission time interval). And, a time resource may be identifiable through at least one of a radio frame number (or a radio frame index), a subframe number (or a subframe index), a slot number (or a slot index), and the like.

A radio frame may be configured different according to a duplex mode. For instance, since DL (downlink) transmission and UL (uplink) transmission in FDD mode are distinguished from each other with reference to frequency, a radio frame may include either DL subframe or UL subframe.

On the contrary, since DL (downlink) transmission and UL (uplink) transmission in TDD mode are distinguished from each other with reference to time, subframes in a frame may be divided into DL subframes and UL subframes.

Figure 11:
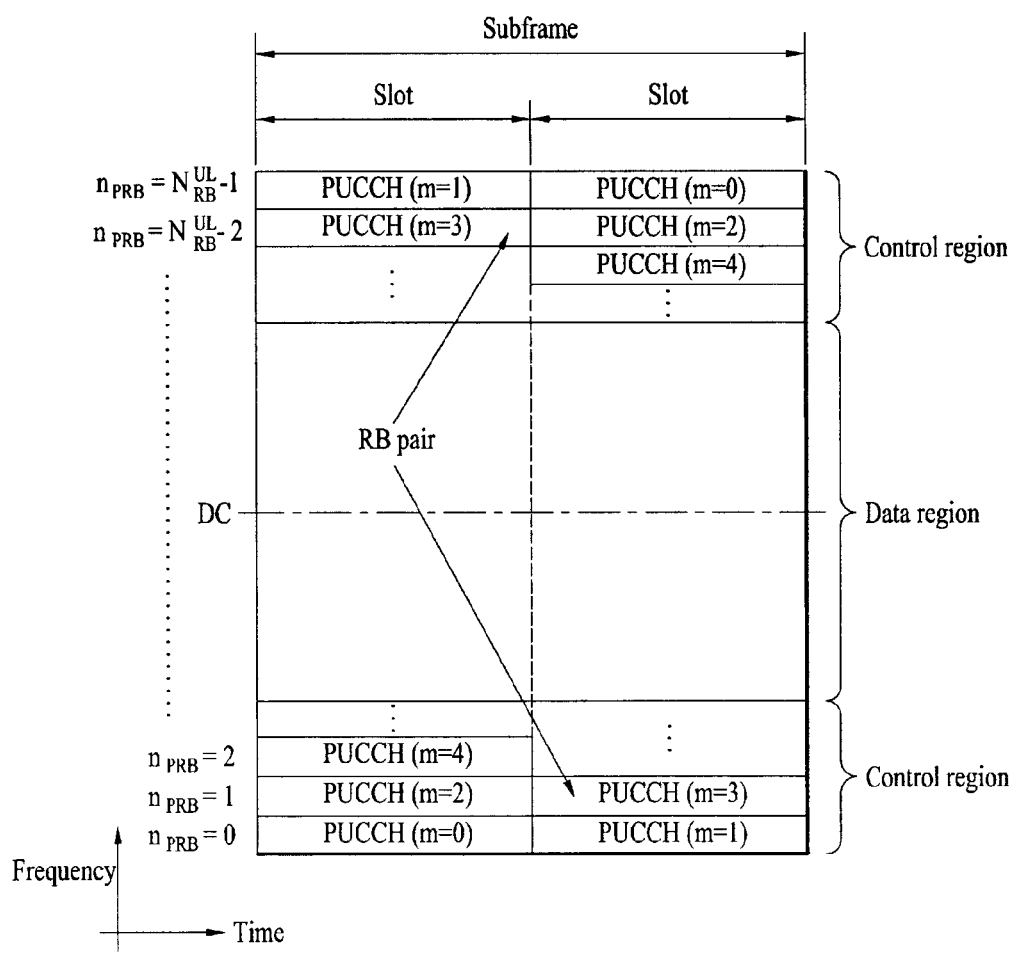
FIG. 11 is a diagram of an uplink subframe structure.

FIG. 11 is a diagram of an uplink subframe structure.

Referring to FIG. 11, UL subframe may be divided into a control region and a data region in a frequency domain. At least one PUCCH (physical uplink control channel) may be allocated to the control region to carry UL control information (UCI). And, at least one PUSCH (physical uplink shared channel) may be allocated to the data region to carry user data. Yet, in case that a user equipment adopts SC-FDMA in LTE Release 8 or LTE Release 9, it may be unable to simultaneously transmit both of PUCCH and PUSCH in a same subframe to maintain the single carrier property.

The UL control information (UCI) carried on PUCCH may differ in size and usage in accordance with PUCCH format. And, a size of the UL control information may vary in accordance with a coding rate. For instance, it may be able to define PUCCH formats as follows:

(1) PUCCH format 1: On-Off keying (OOK) modulation, used for SR (Scheduling Request)

(2) PUCCH format 1a & 1b: Used for ACK/NACK (Acknowledgment/Negative Acknowledgment) information transmission
   1) PUCCH format 1a: 1-bit ACK/NACK information modulated by BPSK
   2) PUCCH format 1b: 2-bit ACK/NACK information modulated by QPSK (3) PUCCH format 2: Modulate by QPSK, used for CQI transmission (4) PUCCH format 2a & PUCCH format 2b: Used for simultaneous transmission of CQI and ACK/NACK information Table 1 shows a modulation scheme according to PUCCH format and the number of bits per subframe. Table 2 shows the number of reference signals (RS) per slot according to PUCCH format. Table 3 shows SC-FDMA symbol location of RS (reference signal) according to PUCCH format. In Table 1, PUCCH format 2a and PUCCH format 2b correspond to a case of normal cyclic prefix (CP).

TABLE 1

| PUCCH format | Modulation scheme | No. of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH format | Normal CP | Extended CP |
|---|---|---|
| 1, 1a, 1b | 3 | 2 |
| 2 | 2 | 1 |
| 2a, 2b | 2 | N/A |

TABLE 3

| PUCCH format | SC-FDMA symbol location of RS | |
|---|---|---|
| | Normal CP | Extended CP |
| 1, 1a, 1b | 2, 3, 4 | 2, 3 |
| 2, 2a, 2b | 1, 5 | 3 |

In UL subframe, subcarriers distant with reference to DC (direct current) subcarrier may be utilized as a control region. So to speak, subcarriers located at both ends of UL transmission bandwidth may be allocated for transmission of UL control information. The DC subcarrier may be the component remaining instead of being used for signal transmission and may be mapped to a carrier frequency $f_0$ in a frequency UL transform process by OFDMA/SC-FDMA signal generator.

PUSCCH for one user equipment may be allocated to RB pair in subframe. And, RBs belonging to the RB pair may occupy different subcarriers in two slots, respectively. The above-allocated PUCCH may be represented as 'RB pair allocated to PUCCH may perform frequency hopping on a slot boundary'. Yet, in case that the frequency hopping is not applied, the RB pair may occupy the same subcarriers in two slots. Irrespective of a presence or non-presence of frequency hopping, since PUCCH for a user equipment is allocated to RB pair in a subframe, the same PUCCH may be transmitted twice in a manner of being transmitted via one RB in each slot in the subframe.

In the following description, the RB pair used for PUCCH transmission in a subframe may be named PUCCH region. And, PUCCH region and code used in the region may be named PUCCH resource. In particular, different PUCCH resources may have different PUCCH regions, respectively, or may have different codes in the same PUCCH region, respectively. For clarity and convenience, PUCCH carrying ACK/NACK information may be named ACK/NACK PUCCH, PUCCH carrying CQI/PMI/RI information may be named CSI (channel state information) PUCCH, and PUCCH carrying SR information may be named SR PUCCH.

A user equipment may receive allocation of PUCCH resource for transmission of UL control information from a base station by an explicit or implicit scheme.

Such UL control information (UCI) as ACK/NACK (ACKnowlegement/negative ACK) information, CQI (Channel Quality Indicator) information, PMI (Precoding Matrix Indicator) information, RI (Rank Information) information, SR (Scheduling Request) information and the like may be carried on a control region of UL subframe.

In a wireless communication system, a user equipment and a base station may exchange signals, data and the like with each other by transmission and reception. In particular, after the base station has transmitted data to the user equipment, the user equipment may decode the received data. If the corresponding data decoding is successful, the user equipment may send ACK to the base station. If the corresponding data decoding is not successful, the user equipment may send NACK to the base station. The above-mentioned data transmission and reception may be identically applicable to a case that the user equipment transmits data to the base station. In 3GPP LTE system, a user equipment receives PDSCH and the like from a base station and then transmits ACK/NACK for the PDSCH through implicit PUCCH determined by the PDCCH carrying scheduling information on the PDSCH. In this case, if the user equipment does not receive data, it may be regarded as DTX (discontinuous transmission) state, handled as a case that there is no received data according to a predetermined rule, or handled in the same manner of NACK (i.e., a case that decoding is not successful despite reception of data).

Figure 12:
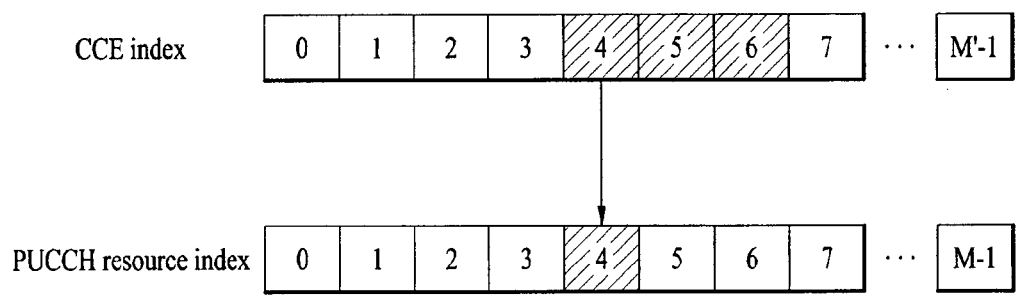
FIG. 12 is a diagram of a structure for determining PUCCH for ACK/NACK transmission.

FIG. 12 is a diagram of a structure for determining PUCCH for ACK/NACK transmission.

First of all, PUCCH resource for transmission of ACK/NACK transmission may not be allocated to a user equipment in advance. Instead, a plurality of user equipments in a cell may use a plurality of PUCCH resources in a manner of dividing them each timing point. In particular, PUCCH resource used by a user equipment to transmit ACK/NACK transmission may be determined by an implicit scheme based on PDCCH carrying scheduling information on PDSCH carrying the corresponding DL data. A whole region for transmitting PDCCH in a DL subframe may include a plurality of CCEs (control channel elements). And, PDCCH transmitted to a user equipment may include at least one CCE. The CCE may include a plurality of REGs (resource element groups) (e.g., 9 REGs). One REG may include 4 REs (resource elements) neighboring to one another in a stat that a reference signal (RS) is excluded. A user equipment may transmit ACK/NACK transmission via implicit PUCCH resource induced or calculated by a function of a specific CCE index (e.g., $1^{st}$ index, lowest CCE index, etc.) among a plurality of indexes of CCEs configuring the received PDCCH.

Referring to FIG. 12, a lowest CCE index of PDCCH may correspond to PUCCH resource index for ACK/NACK transmission. Assuming that scheduling information on PDSCH is transmitted to a user equipment via PDCCH constructed with $4^{th}$ to $6^{th}$ CCEs shown in FIG. 12, a user equipment transmits ACK/NACK to a base station via PUCCH resource induced or calculated from an index of the $4^{th}$ CCE configuring the PDCCH, e.g., the PUCCH resource corresponding to the $4^{th}$.

FIG. 12 exemplarily shows a case that maximum M' CCEs and maximum M PUCCH resources exist in DL subframe and UL subframe, respectively. It may be ale to assume a case of 'M'=M'. Alternatively, the M' and the M may be designed to have different values, respectively. And, mapping of CCE and PUCCH resource may be set to be overlap with each other. For instance, PUCCH resource index may be defined as follow.

$$n^{(1)}_{PUCCH} = n_{CCE} + N^{(1)}_{PUCCH} \qquad \text{[Formula 1])}$$

In Formula 1, the $n^{(1)}_{PUCCH}$ indicates an index of PUCCH resource to carry ACK/NACK transmission and the $N^{(1)}_{PUCCH}$ indicates a signal value delivered from an upper layer. Moreover, the $n_{CCE}$ indicates a smallest value among CCE indexes used for PDCCH transmission.

Figure 13:
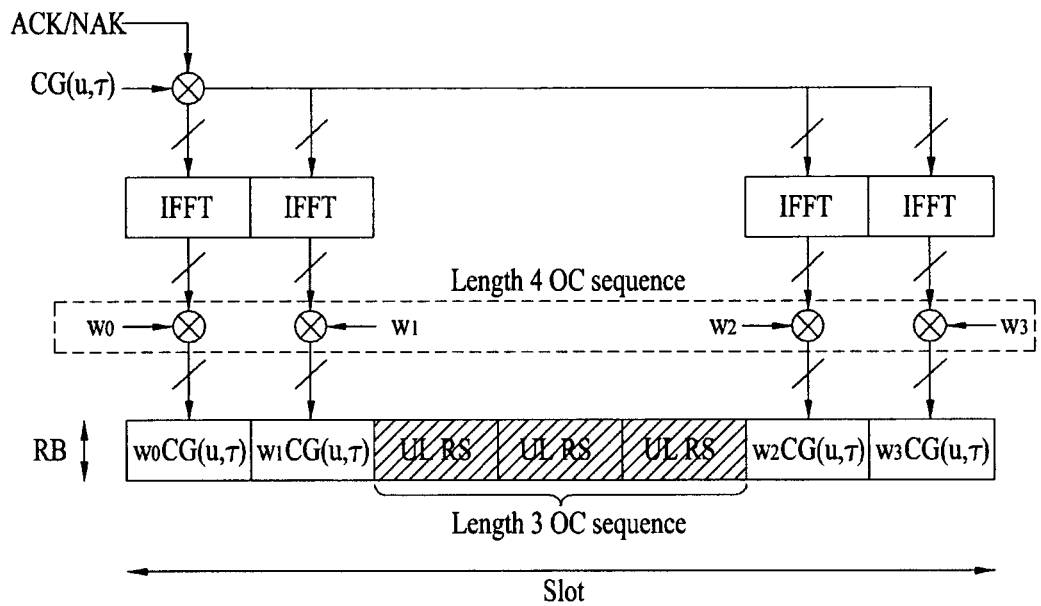
FIG. 13 and FIG. 14 are diagrams of slot level structures of PUCCH format 1a and 1b for ACK/NACK transmission.
Figure 14:
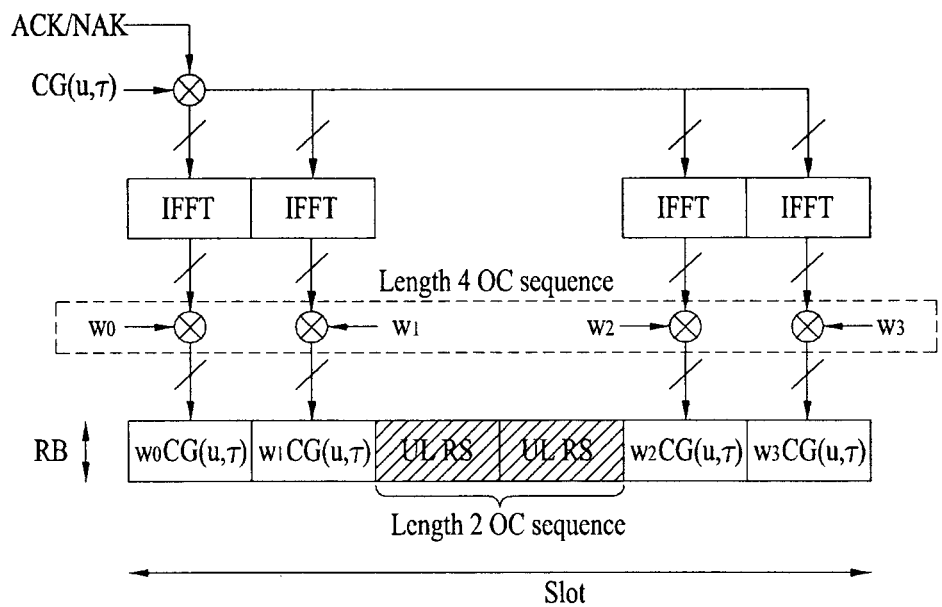

FIG. 13 and FIG. 14 are diagrams of slot level structures of PUCCH format 1a and 1b for ACK/NACK transmission.

In particular, FIG. 13 shows PUCCH format 1a and 1b in case of a normal cyclic prefix. And, FIG. 14 shows PUCCH format 1a and 1b in case of an extended cyclic prefix. According to the PUCCH format 1a and 1b, UL control information of the same content is repeated in a subframe. In a user equipment, ACK/NACK signal is transmitted via different resources constructed with a different cyclic shift (CS) (frequency domain code) and an orthogonal cover (OC) or orthogonal cover code (OCC) (time domain spreading code) of CG-CAZAC (computer-generated constant amplitude zero auto correlation) sequence. For instance, the OC includes Walsh/DFT orthogonal code. If the number of CS and the number of OC are 6 and 3, respectively, total 18 user equipments may be multiplexed within the same PRB (physical resource block) with reference to a single antenna. Orthogonal sequences w0, w1, w2 and w3 may be applicable to a random time domain (after FFT modulation) or a random frequency domain (before FFT modulation). A slot level structure of PUCCH format 1 for transmitting SR (scheduling request) information is identical to that of PUCCH format 1a and 1b but differs from that of the PUCCH format 1a and 1b in modulation scheme only.

For ACK/NACK about the transmission of SR information and semi-persistent scheduling (SPS), PUCCH resource including CS, OC, PRB (physical resource block) and RS (reference signal) may be allocated to a user equipment through signaling. As mentioned in the foregoing description with reference to FIG. 12, for a dynamic ACK/NACK (or ACK/NACK for non-persistent scheduling) feedback and ACK/NACK feedback for PDCCH to indicate SPS cancellation, the PUCCH resource may be implicitly allocated to a user equipment using a smallest CCE index of PDCCH corresponding to PDCCH or PDCCH for SPS cancellation.

Figure 15:
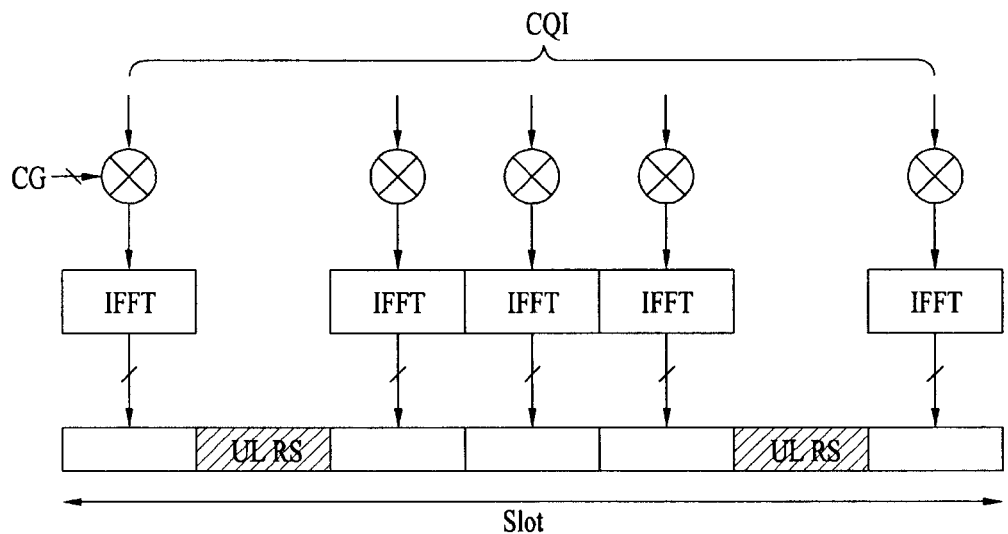
FIG. 15 is a diagram of PUCCH format 2/2a/2b in case of a normal cyclic prefix.

FIG. 15 is a diagram of PUCCH format 2/2a/2b in case of a normal cyclic prefix. And, FIG. 16 is a diagram of PUCCH format 2/2a/2b in case of an extended cyclic prefix.

Figure 16:
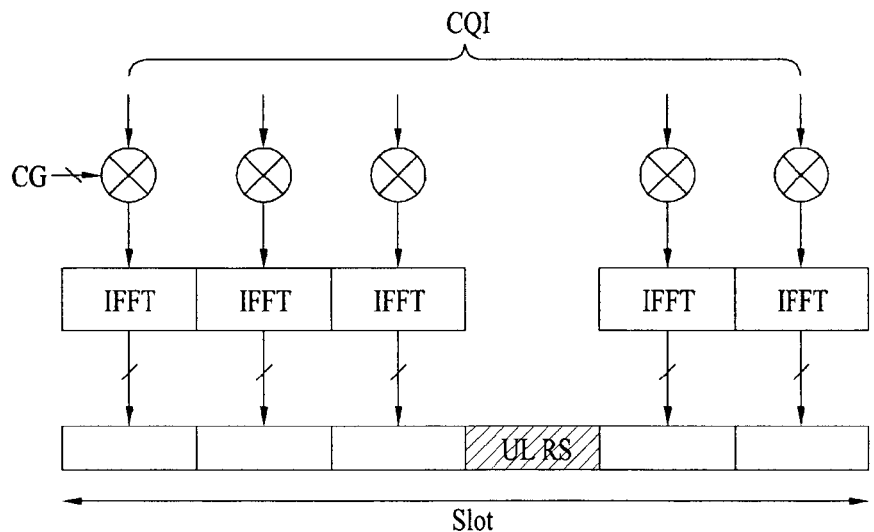
FIG. 16 is a diagram of PUCCH format 2/2a/2b in case of an extended cyclic prefix.

Referring to FIG. 15 and FIG. 16, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 user equipments may be multiplexed in the same PRB. For instance, assuming that the number of available CSs is 6, 6 user equipments may be multiplexed in the same PRB. In brief, a plurality of user equipments in PUCCH format 1/1a/1b and PUCCH format 2/2a/2b may be multiplexed by CS+OC+PRB and CS+PRB, respectively.

Length-4 orthogonal sequence (OC) and length-3 orthogonal sequence for PUCCH format 1/1a/1b are shown in Table 4 and Table 5, respectively.

TABLE 4

| Sequence index | Orthogonal sequence |
|---|---|
| 0 | [+1 +1 +1 +1] |
| 1 | [+1 −1 +1 −1] |
| 2 | [+1 −1 −1 +1] |

TABLE 5

| Sequence index | Orthogonal sequence |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC) for a reference signal in PUCCH format 1/1a/1b is shown in Table 6.

TABLE 6

| Sequence index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 is a diagram of ACK/NACK channelization for PUCCH format 1a and 1b. In particular, FIG. 14 corresponds to a case of '$\Delta_{shift}^{PUCCH}=2$'.

Figure 18:
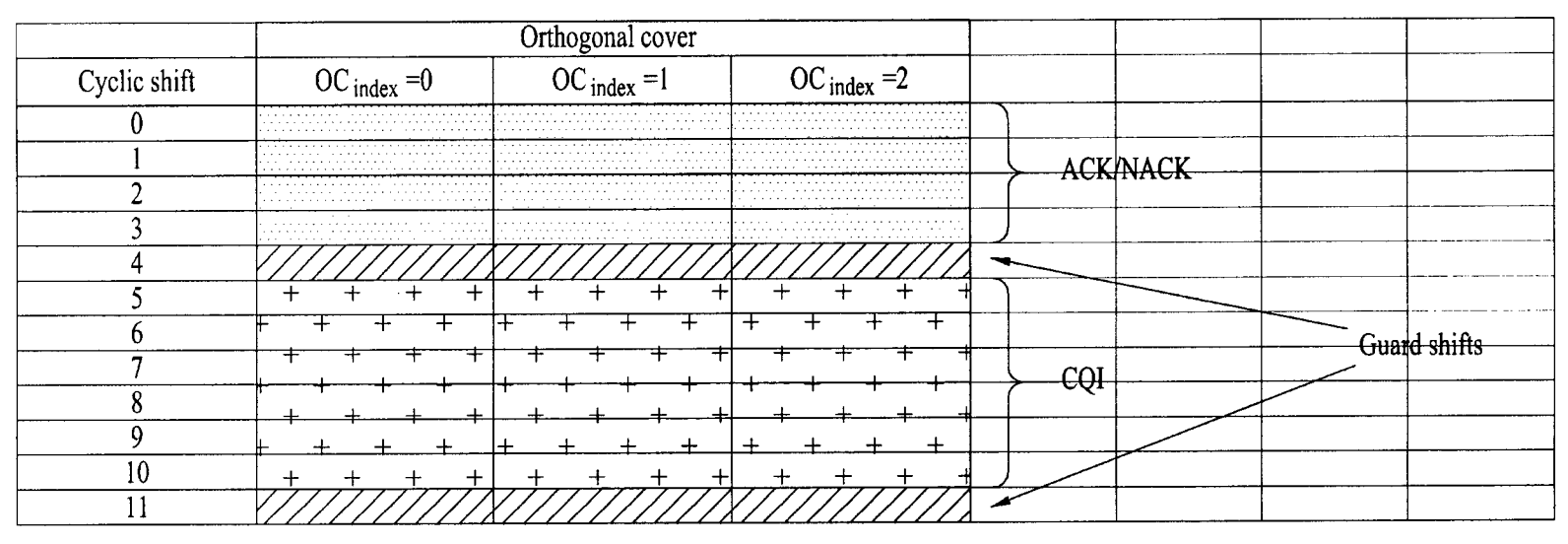

FIG. 18 is a diagram of channelization for a hybrid structure of PUCCH format 1/1a/1b and PUCCH format 2/2a/2b.

Cyclic shift (CS) hopping and orthogonal cover (OC) remapping may be applicable in a following manner.

(1) Symbol-based cell-specific CS hopping for randomization of inter-cell interference)

(2) Slot level CS/OC remapping

1) For inter-cell randomization

2) Slot based access for mapping between ACK/NACK channel and resource (k)

Meanwhile, resource $n_r$ for PUCCH format 1/1a/1b may include the following combinations.

(1) CS (=equal to DFT orthogonal code at symbol level) ($n_{cs}$)

(2) OC (orthogonal cover at slot level) ($n_{oc}$)

(3) Frequency RB (Resource Block) ($n_{rb}$)

If indexes indicating CS, OC and RB are set to $n_{cs}$, $n_{oc}$, $n_{rb}$, respectively, a representative index $n_r$ may include $n_{cs}$, $n_{oc}$ and $n_{rb}$. In this case, the $n_r$ may meet the condition of '$n_r = (n_{cs}, n_{oc}, n_{rb})$'.

The combination of CQI, PMI, RI, CQI and ACK/NACK may be delivered through the PUCCH format 2/2a/2b. And, Reed Muller (RM) channel coding may be applicable.

For instance, channel coding for uplink CQI in LTE system may be described as follows. First of all, bitstreams $\alpha_0, \alpha_1, \alpha_2, \alpha_3, \ldots, \alpha_{A-1}$ may be coded using (20,A) RM code. Table 7 shows a basic sequence for (20,A) code. $\alpha_0$ and $\alpha_{A-1}$ may indicates MSB (Most Significant Bit) and LSB (Least Significant Bit), respectively. In case of an extended cyclic prefix, maximum transmission bits include 11 bits except a case that QI and ACK/NACK are simultaneously transmitted. After coding has been performed with 20 bits using the RM code, QPSK modulation may be applied. Before the BPSK modulation, coded bits may be scrambled.

TABLE 7

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits may be generated by Formula 2.

$$b_i = \sum_{n=0}^{A-1} (a_n \cdot M_{i,n}) \bmod 2 \quad \text{[Formula 2]}$$

In Formula 2, 'i=0, 1, 2, . . . , B-1' is met.

Table 8 shows UCI (Uplink Control Information) field for broadband report (single antenna port, transmit diversity) or open loop spatial multiplexing PDSCH CQI feedback.

TABLE 8

| Field | Bandwidth |
|---|---|
| Broadband CQI | 4 |

Table 9 shows UL control information (UCI) field for broadband CQI and PMI feedback. In this case, the field reports closed loop spatial multiplexing PDSCH transmission.

TABLE 9

| | Bandwidth | | | |
| | 2 antenna ports | | 4 antenna ports | |
| Field | rank = 1 | rank = 2 | rank = 1 | Rank > 1 |
|---|---|---|---|---|
| Broadband CQI | 4 | 4 | 4 | 4 |
| Spatial difference CQI | 0 | 3 | 0 | 3 |
| PMI (Precoding Matrix Index) | 2 | 1 | 4 | 4 |

Table 10 shows UL control information (UCI) field for RI feedback to make a broadband report.

TABLE 10

| | Bit widths | | |
| | 2 antenna ports | 4 antenna ports | |
| Field | 2 antenna ports | Max. 2 layers | Max. 4 layers |
|---|---|---|---|
| RI (Rank Indication) | 1 | 1 | 2 |

Figure 19:
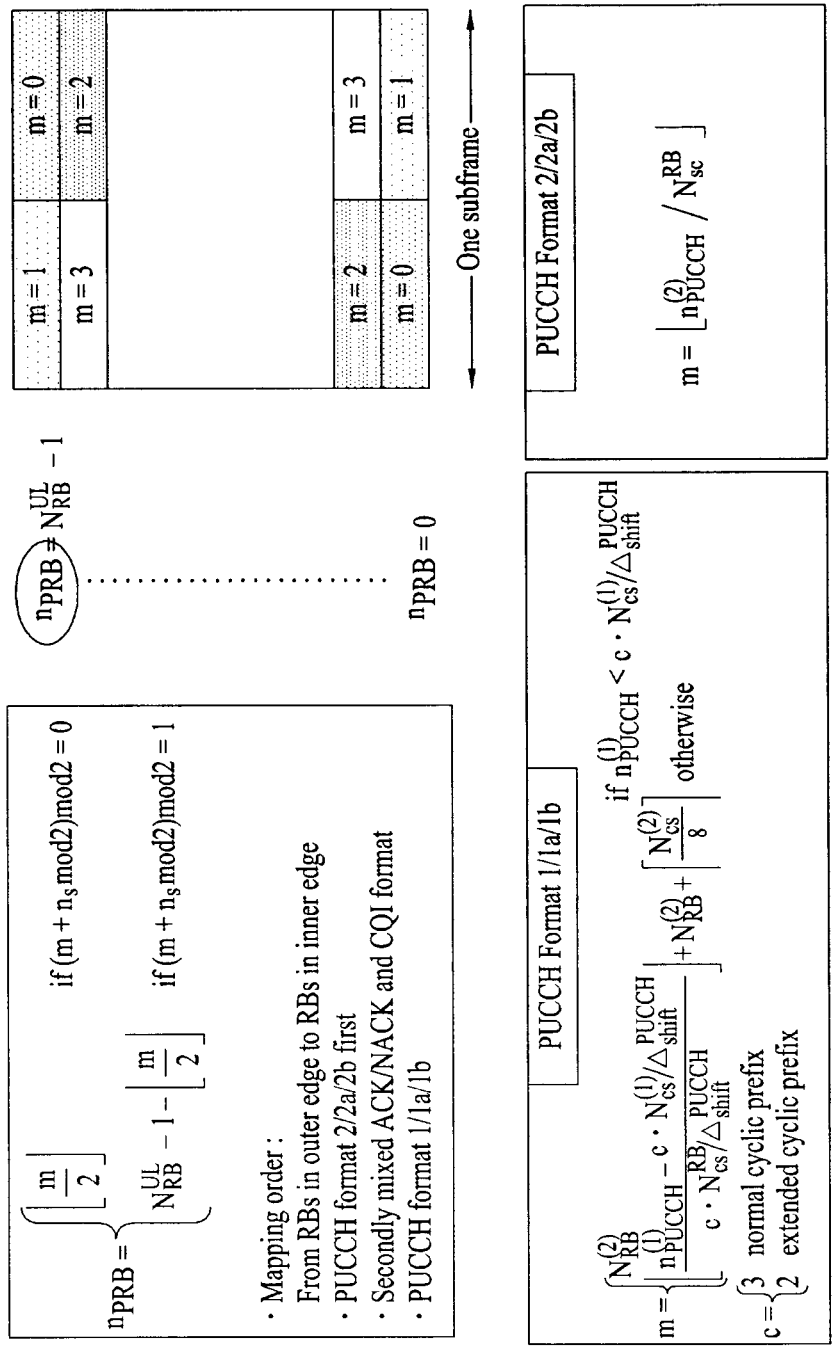
FIG. 19 is a diagram for allocation of physical resource block (PRB)

FIG. 19 is a diagram for allocation of physical resource block (PRB). Referring to FIG. 19, PRB may be usable for PUCCH transmission.

Multi-carrier system or CA (carrier aggregation) system may indicate the system that uses a plurality of carriers, each of which has a bandwidth smaller than a target bandwidth, for broadband support in a manner of aggregating the carriers. When a plurality of the carriers, each of which has the bandwidth smaller than the target bandwidth, are aggregated, a band of the aggregated carriers may be limited to a bandwidth used by a previous system for the backward compatibility with the previous system. For instance, the conventional LTE system supports bandwidths of 1.4, 3, 5, 10, 15 and 20 MHz. And, LTE-A (LTE-advanced) system may be able to support a bandwidth greater than 20 MHz using the bandwidths supported by the LTE system. Alternatively, it may be able to support carrier aggregation by defining a new bandwidth irrespective of a bandwidth used by a previous or conventional system. Multi-carrier is the name that may be interchangeably used together with carrier aggregation or bandwidth aggregation. The carrier aggregation may inclusively indicate contiguous carrier aggregation and non-contiguous carrier aggregation. And, the carrier aggregation may inclusively indicate intra-band carrier aggregation and inter-band carrier aggregation as well.

Figure 20:
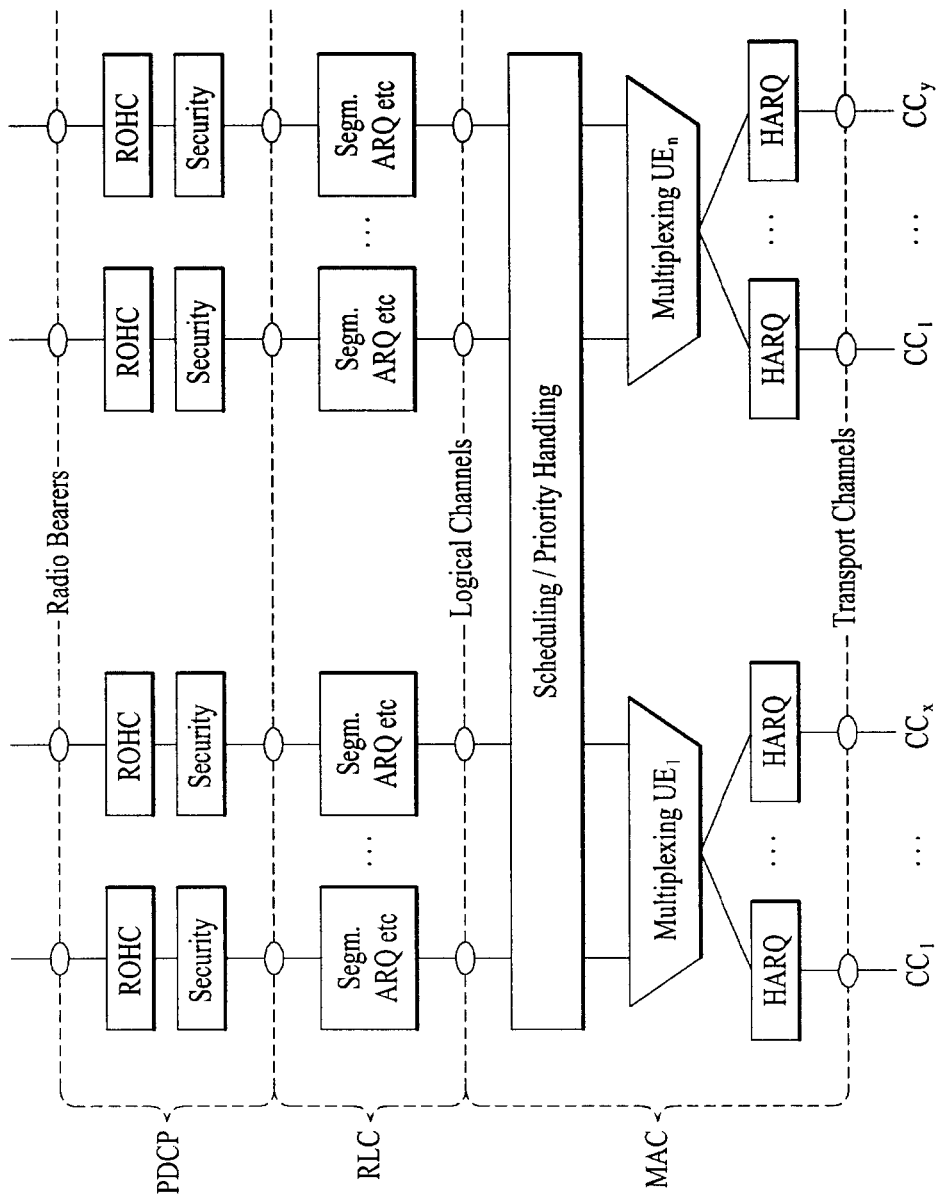
FIG. 20 is a block diagram for concept of managing downlink (DL) component carriers (CCs) in a base station.
Figure 21:
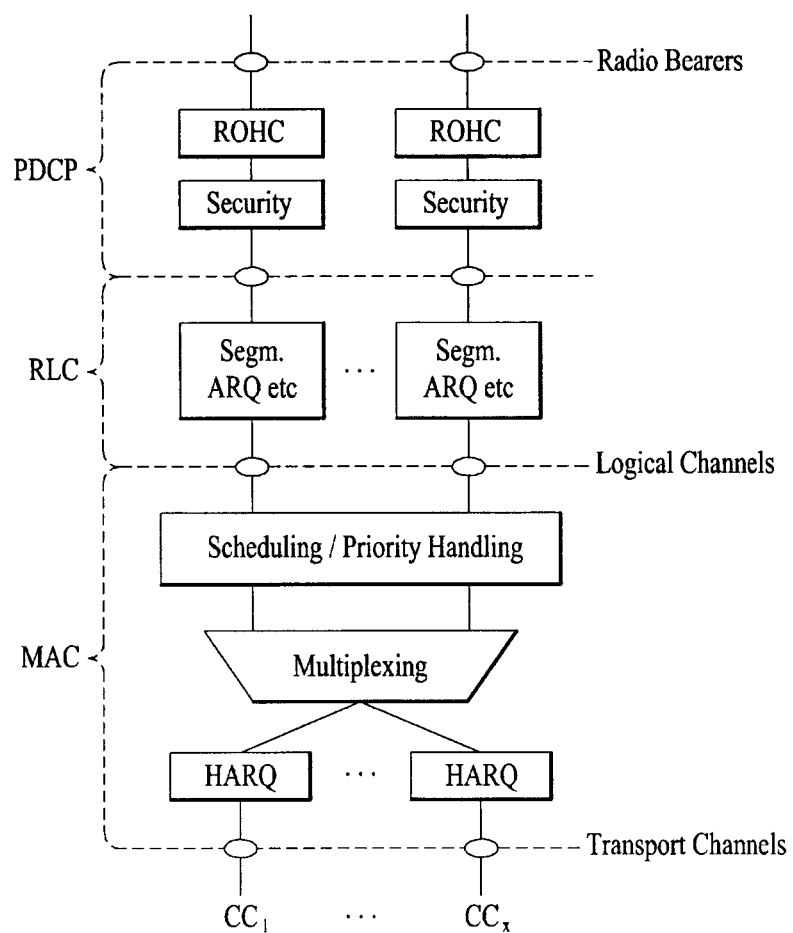
FIG. 21 is a block diagram for concept of managing uplink (UL) component carriers (CCs) in a user equipment.

FIG. 20 is a block diagram for concept of managing downlink (DL) component carriers (CCs) in a base station. And, FIG. 21 is a block diagram for concept of managing uplink (UL) component carriers (CCs) in a user equipment. For clarity and convenience of the following description, an upper layer in FIG. 19 or FIG. 20 may be schematized into MAC.

Figure 22:
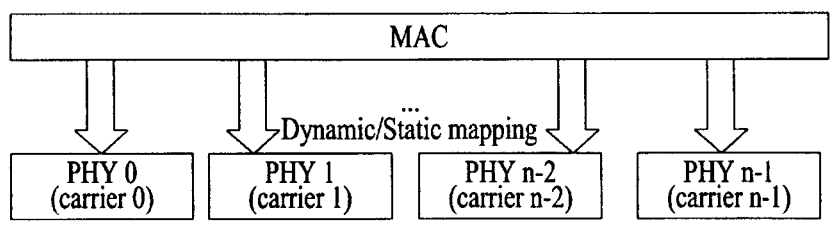
FIG. 22 is a block diagram of concept for one MAC to manage multi-carrier in a base station.

FIG. 22 is a block diagram of concept for one MAC to manage multi-carrier in a base station. And, FIG. 23 is a block diagram of concept for one MAC to manage multi-carrier in a user equipment.

Figure 23:
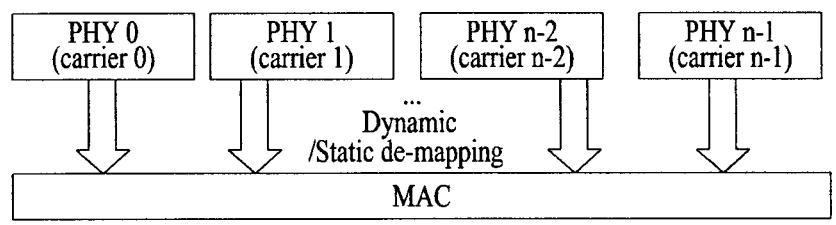
FIG. 23 is a block diagram of concept for one MAC to manage multi-carrier in a user equipment.

Referring to FIG. 22 and FIG. 23, one MAC may perform transmission and reception by managing and operating at least one or more frequency carriers. Since the frequency carriers managed by one MAC may not need to be contiguous with each other, it may be advantageous that they are more flexible in aspect of resource management. In FIG. 22 and FIG. 23, one PHY may mean one component carrier for clarity and convenience. In this case, it is not necessary for one PHY to mean an independent RF (radio frequency) device. One independent RF device generally means one PHY, which is not mandatory. And, one RF device may include a plurality of PHYs.

Figure 24:
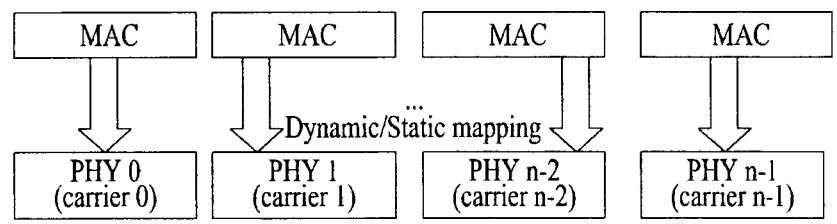
FIG. 24 is a block diagram of concept for a plurality of MACs to manage multi-carrier in a base station.
Figure 25:
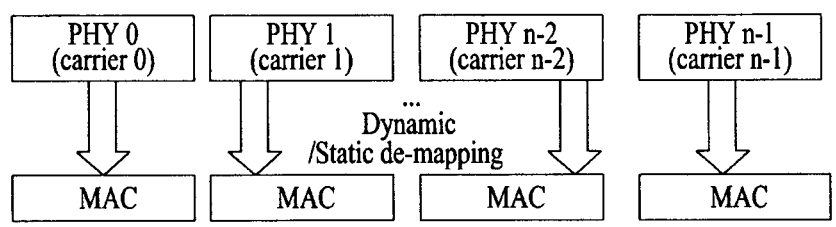
FIG. 25 is a block diagram of concept for a plurality of MACs to manage multi-carrier in a user equipment.
Figure 26:
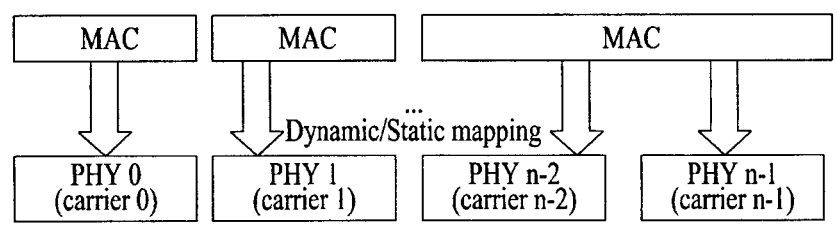
FIG. 26 is a block diagram of another concept for a plurality of MACs to manage multi-carrier in a base station.
Figure 27:
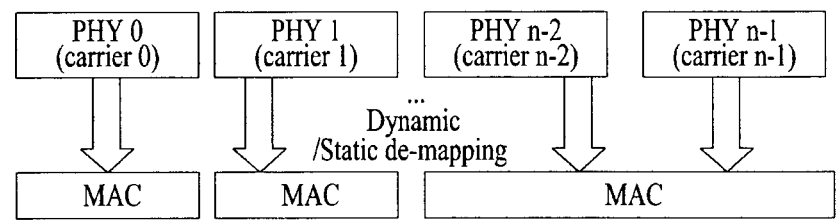
FIG. 27 is a block diagram of another concept for a plurality of MACs to manage multi-carrier in a user equipment.

FIG. 24 is a block diagram of concept for a plurality of MACs to manage multi-carrier in a base station. FIG. 25 is a block diagram of concept for a plurality of MACs to manage multi-carrier in a user equipment. FIG. 26 is a block diagram of another concept for a plurality of MACs to manage multi-carrier in a base station. And, FIG. 27 is a block diagram of another concept for a plurality of MACs to manage multi-carrier in a user equipment.

First of all, a plurality of carriers may be controlled by a plurality of MACs instead of one MAC, as shown in FIGS. 24 to 27, unlike the structures shown in FIG. 22 and FIG. 23.

Referring to FIG. 24 and FIG. 25, each MAC may be able to control each carrier by 1:1. Referring to FIG. 26 and FIG. 27, each MAC controls each carrier by 1:1 for some carriers and one MAC may control the rest of at least one or more carriers.

The above-mentioned system may be the system including a plurality of carriers (e.g., 1 to N carriers). And, each of the carriers may be usable contiguously or non-contiguously. This may be applicable irrespective of uplink/downlink. TDD system may be configured to operate a plurality of carriers (e.g., N carriers) in each of which DL/UL transmission is included. In case of the FDD system, asymmetric carrier aggregation, in which the numbers of carriers aggregated in DL and UL or bandwidths of the aggregated carriers are different from each other, may be supportable.

In case that the number of component carriers aggregated in DL is equal to that of component carriers aggregate in UL, it may be possible to configure all component carriers to be compatible with a previous system. Yet, component carriers failing in considering compatibility may not be excluded by the present invention.

Figure 28:
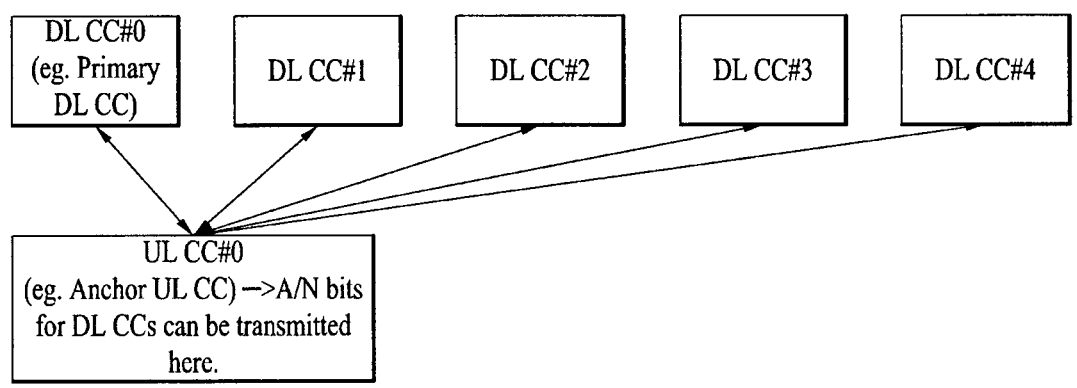
FIG. 28 is a block diagram for asymmetric carrier aggregation in which 5 downlink component carriers (DL CCs) are linked with 1 uplink component carrier (UL CC)

FIG. 28 is a block diagram for asymmetric carrier aggregation in which 5 downlink component carriers (DL CCs) are linked with 1 uplink component carrier (UL CC). The asymmetric carrier aggregation in the drawing may be set in aspect of UL control information (UCI). Specific UCI (e.g., ACK/NACK response) on a plurality of DL CCs may be transmitted in a manner of being gathered in one UL CC. Moreover, in case that a plurality of UL CCs are configured, a specific UCI (e.g., ACK/NACK response for DL CC) may be transmitted via one predetermined UL CC (e.g., primary CC, primary cell, PCell, etc.). For clarity and convenience, assuming that each DL CC may be able to carry maximum 2 codewords and assuming that the number ACKs/NACKs may depend on the maximum number of codewords set per CC (e.g., if the maximum number of codewords set for a specific CC by a base station is 2, although a specific PDCCH uses 1 codeword in CC, the number of the corresponding ACK/NACK may become 2 that is the maximum codeword number in CC), UL ACK/NACK may need at least 2 bits per DL CC in one subframe. In this case, in order to transmit ACK/NACK for data received on 5 DL CCs via one UL CC, ACK/NACK bits may need at least 10 bits in one subframe. In order to separately discriminate DTX (discontinuous transmission) state per DL CC, at least 12 ($=5^6=3125=11.61$ bits) bits may be necessary for ACK/NACK transmission. Since the conventional PUCCH format 1a and 1b can send ACK/NACK up to 2 bits, this structure is unable to transmit the extended ACK/NACK information. Although a size of the UL control information is increased due to the carrier aggregation for example, this situation may occur due to one of the incremented number of antennas, TDD system, a presence of backhaul subframe in relay system and the like. Similarly to ACK/NACK, in case that control information associated with a plurality of DL CCs is transmitted via one UL CC, a size of the control information to be transmitted may be increased. For instance, in case that CQI/PMI/RI for a plurality of DL CCs needs to be transmitted, UCI payload may be increased. Meanwhile, although the present invention exemplifies ACK/NACK information on codeword, transport block corresponding to the codeword exists, which is apparently applicable as ACK/NACK information on the transport block. Moreover, although the present invention exemplifies ACK/NACK information on one DL subframe per DL CC for transmission in one UL CC, if it is applied to TDD system, it may be apparently applicable as ACK/NACK information on at least one or more DL subframes per DL CC for transmission in one UL CC.

UL anchor CC, which may be called UL PCC (primary CC), shown in FIG. 28 is the CC carrying PUCCH resource or UCI and may be determine cell-specifically or UE-specifically. For instance, a user equipment may be able to determine a CC attempting an initial random access as a primary CC. In this case, DTX state may be explicitly fed back or may be fed back to share the same state of NACK.

LTE-A may use the concept of cell to manage radio resources. The cell may be defined as the combination of DL resource and UL resource. And, the UL resource may not be mandatory. Hence, the cell may include DL resource only or may include DL resource and UL resource. Linkage between a carrier frequency (or DL CC) of DL resource per cell and a carrier frequency (or UL CC) of UL resource may be indicated by system information. A cell operating on a primary frequency resource (or PCC) may be named a primary cell (PCell) and a cell operating on a secondary frequency resource (or SCC) may be named a secondary cell (SCell). In particular, the PCell may indicate the cell used by a user equipment to perform an initial connection configuring process or a connection reconfiguring process. The PCell may mean the cell indicated in a handover process. In LTE-A release 10, one PCell may exist only in performing carrier aggregation. The SCell may be configured after completion of RRC connection configuration or may be used to provide an additional radio resource. The PCell and the SCell may be generally called a serving cell. Hence, although a user equipment is in RRC_CONNECTED state, if the user equipment fails in setting up or supporting carrier aggregation, there exists one serving cell including PCell only. On the other hand, when a user equipment is in RRC_CONNECTED state, if the user equipment successfully sets up the carrier aggregation, at least one serving cell exists. And, one PCell and at least one or more SCells are included in a whole serving cell. For the carrier aggregation, after an initial security activating process has been initiated, a network may be able to configure at least one SCell in addition to PCell, which has been configured in an early stage of a connection configuring process, for a user equipment supporting carrier aggregation. Hence, PCC corresponds to one of PCell, a primary (radio) resource and a primary frequency resource, which may be interchangeably usable. Similarly, SCC corresponds to one of SCell, a secondary (radio) resource and a secondary frequency resource, which may be interchangeably usable.

In the following description, a method for transmitting an increased UL control information efficiently may be proposed with reference to the accompanying drawings. In particular, a new PUCCH format, a signal processing method, a resource allocating method and the like may be proposed to transmit an increased UL control information. For the following description, a new PUCCH format proposed by the present invention may be named CA (carrier aggregation) PUCCH format or may be named PUCCH format 3 in consideration that definition of PUCCH format 2 is included in the previous LTE Release 8/9. The technical idea of the PUCCH format proposed by the present invention may be easily applicable to random physical channels (e.g., PUSCH) capable of carrying UL control information using the same or similar method. For instance, an embodiment of the present invention may be applicable to a periodic PUSCH structure for transmitting control information periodically or an aperiodic PUSCH structure for transmitting control information aperiodically.

The following drawings and embodiments mainly relate to a case of using UCI/RS symbol structure of PUCCH format 1/1a/1b (nor mal CP) of the previous LTE as UCI/RS symbol structure at subframe/slot level applied to PUCCH format 3. Yet, the UCI/RS symbol structure at subframe/slot level in the PUCCH format 3 is defined for example and clarity, by which the present invention is non-limited to a specific structure. In PUCCH format 3 according to the present invention, the number of UCI/RS symbols, locations thereof and the like may be freely modifiable to feet the system design. For instance, PUCCH format 3 according to an embodiment of the present invention may be definable using the RS symbol structure of PUCCH format 1/2a/2b of the previous LTE.

PUCCH format 3 according to an embodiment of the present invention may be usable to carry UL control information of a random type/size. For instance, PUCCH format 3 according to an embodiment of the present invention may be able to transmit such information as HARQ ACK/NACK, CQI, PMI, RI, SR and the like. And, such information may have a payload of a random size. For clarity and convenience, the following drawings and embodiments may be described centering on a case that PUCCH format 3 according to the present invention carries ACK/NACK information.

FIGS. 29 to 32 are diagrams of structures of PUCCH format 3 and signal processing methods for the same, to which the present invention is applied. In particular, FIGS. 29 to 32 exemplarily show structures of DFT-based PUCCH format. According to the DFT-based PUCCH format structures, PUCCH is DFT-precoded and may be then transmitted by applying time-domain OC (orthogonal cover) at SC-FDMA level. In the following description, DFT-based PUCCH format may be generally named PUCCH format 3.

Figure 29:
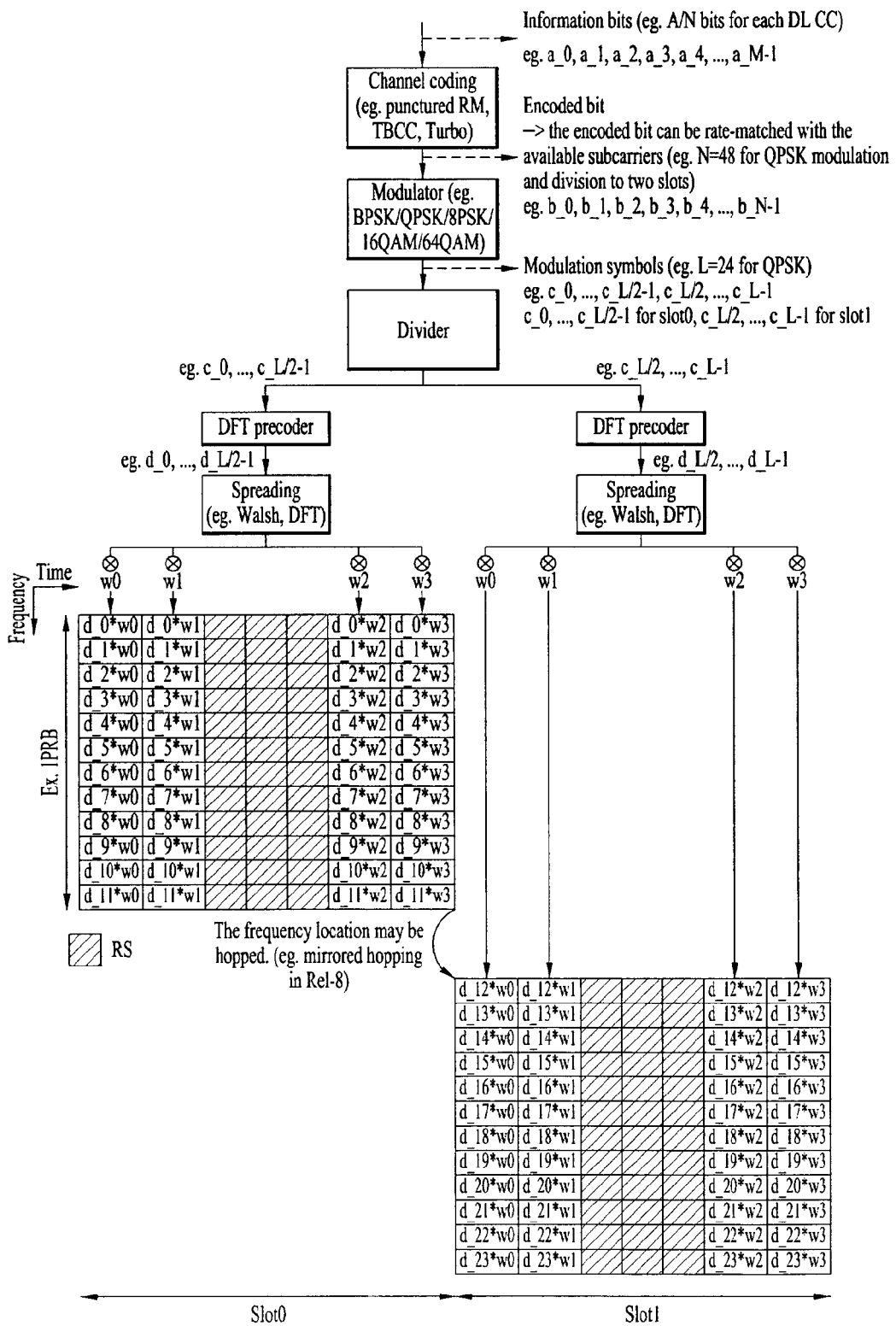
FIGS. 29 to 32 are diagrams of structures of PUCCH format 3 and signal processing methods for the same, to which the present invention is applied.

FIG. 29 exemplarily shows a structure of PUCCH format 3 using orthogonal code (OC) of 'SF=4'.

Referring to FIG. 29, a channel coding block may generate coding bits (e.g., encoded bits, coded bits, etc.) (or codeword) $b\_0, b\_1, \ldots$ and $b\_N-1$ by channel-coding transmission bits $a\_0, a\_1, \ldots$ and $a\_M-1$ (e.g., multiple ACK/NACK bits). In this case, the M indicates a size of transmission bits and the N indicates a size of the coding bits. The transmission bits may include multiple ACK/NACK for UL control information (UCI), e.g., a plurality of data (or PDSCH) received via a plurality of DL CCS. In this case, the transmission bits $a\_0, a\_1, \ldots$ and $a\_M-1$ may be joint-coded irrespective of type/number/size of the UCI configuring the transmission bits. For instance, in case that transmission bits include multiple ACK/NACK for a plurality of DL CCs, channel coding may not be performed per DL CC or individual ACK/NACK bit but may be performed on all bit information, from which a single codeword may be generated. And, channel coding is non-limited by this. Moreover, the channel coding may include one of simplex repetition, simplex coding, RM (Reed Muller) coding, punctured RM coding, TBCC (tail-biting convolutional coding), LDPC (low-density parity-check), turbo coding and the like. Besides, coding bits may be rate-matched in consideration of a modulation order and a resource size. A rate matching function may be included as a part of the channel coding block or may be performed via a separate function block. For instance, the channel coding block may obtain a single codeword by performing (32, 0) RM coding on a plurality of control informations and may be then able to perform cyclic buffer rate matching on the obtained single codeword.

A modulator may generate modulation symbols $c\_0, c\_1, \ldots$ and $c\_L-1$ by modulating coding bits $b\_0, b\_1, \ldots$ and $b\_N-1$. In this case, the L indicates a size of modulation symbol. This modulation scheme may be performed in a manner of modifying a size and phase of a transmission signal. For instance, the modulation scheme may include one of n-PSK (Phase Shift Keying), n-QAM (Quadrature Amplitude Modulation) and the like, where n is an integer equal to or greater than 2. In particular, the modulation scheme may include one of BPSK (Binary PSK), QPSK (Quadrature PSK), 8-PSK, QAM, 16-QAM, 64-QAM and the like.

A divider divides the modulation symbols $c\_0, c\_1, \ldots$ and $c\_L-1$ to slots, respectively. A sequence/pattern/scheme for dividing the modulation symbols to the slots may be specially non-limited. For instance, the divider may be able to divide the modulation symbols to the corresponding slots in order from a head to tail (Localized scheme). In dong so, as shown in the drawing, the modulation symbols $c\_0, c\_1, \ldots$ and $c\_L/2-1$ may be divided to the slot 0 and the modulation symbols $c\_L/2, c\_L/2+1, \ldots$ and $c\_L-1$ may be divided to the slot 1. Moreover, the modulation symbols may be divided to the corresponding slots, respectively, by interleaving or permutation. For instance, the even-numbered modulation symbol may be divided to the slot 0, while the odd-numbered modulation symbol may be divided to the slot 1. The modulation scheme and the dividing scheme may be switched to each other in order.

A DFT precoder may perform DFT precoding (e.g., 12-point DFT) on the modulation symbols divided to the corresponding slots to generate a single carrier waveform. Referring to the drawing, the modulation symbols $c\_0, c\_1, \ldots$ and $c\_L/2-1$ divided to the corresponding slot 0 may be DFT-precoded into DFT symbols $d\_0, d\_1, \ldots$ and $d\_L/2-1$, and the modulation symbols $c\_L/2, c\_L/2+1, \ldots$ and $c\_L-1$ divided to the slot 1 may be DFT-precoded into DFT symbols $d\_L/2, d\_L/2+1$, and $d\_L-1$. Moreover, the DFT precoding may be replaced by another linear operation (e.g., Walsh precoding) corresponding thereto.

A spreading block may spread the DFT-performed signal at SC-FDMA symbols level (e.g., time domain). The time-domain spreading at the SC-FDMA level may be performed using a spreading code (sequence). The spreading code may include pseudo orthogonal code and orthogonal code. The pseudo orthogonal code may include PN (pseudo noise) code, by which the pseudo orthogonal code may be non-limited. The orthogonal code may include Walsh code and DFT code, by which the orthogonal code may be non-limited. In this specification, for example, the orthogonal code may be mainly described as a representative example of the spreading code for clarity and convenience of the following description.

Optionally, the orthogonal code may be substituted with the pseudo orthogonal code. A maximum value of a spreading code size (or a spreading factor: SF) may be limited by the number of SC-FDAM symbols used for control information transmission. For example, in case that 4 SC-FDMA symbols are used in one slot for control information transmission, 4 orthogonal codes w0, w1, w2 and w3 of length 4 may be used per slot. The SF may mean a spreading degree of the control information and may be associated with a multiplexing order or an antenna multiplexing order of a user equipment. The SF may be variable like 1, 2, 3, 4, . . . and the like in accordance with a requirement of a system. The SF may be defined in advance between a base station and a user equipment. And, the SF may be notified to a user equipment via DL control information (DCI) or RRC signaling. For instance, in case of puncturing one of SC-FDMA symbols for control information to transmit SRS, it may be able to apply a spreading code, of which SF is reduced (e.g., SF=3 instead of SF=4), to control information of a corresponding slot.

The signal generated through the above-described process may be mapped to subcarrier within the PRB and may be then transformed into a time-domain signal through IFFT. CP may be added to the time-domain signal. The generated SC-FDMA symbol may be then transmitted via RF stage.

Assuming a case of transmitting ACK/NACK for 5 DL CCs, each process is exemplified in detail as follows. First of all, in case that each DL CC is able to carry PDSCH, corresponding ACK/NACK bits may be 12 bits in case of including DTX state. Assuming QPSK modulation and time spreading of 'SF=4', a coding block size (after rate matching) may include 48 bits. Coding bits may be modulated into 24 QPSK symbols and the generated QPSK symbols may be divided to the corresponding slots in a manner that 12 of them are divided to each of the slots. The 12 QPSK symbols in each of the slots may be transformed into 12 DFT symbols through 12-point DFT operation. The 12 DFT symbols in each of the slots may be spread and mapped to 4 SC-FDMA symbols using the spreading code 'SF=4' in the time domain. Since 12 bits are carried on [2 bits*12 subcarriers*8 SC-FDMA symbols], a coding rate may become 0.0625 (=12/192). Moreover, if SF=4, it may be able to multiplex maximum user equipments of 4 users per 1PRB.

Figure 30:
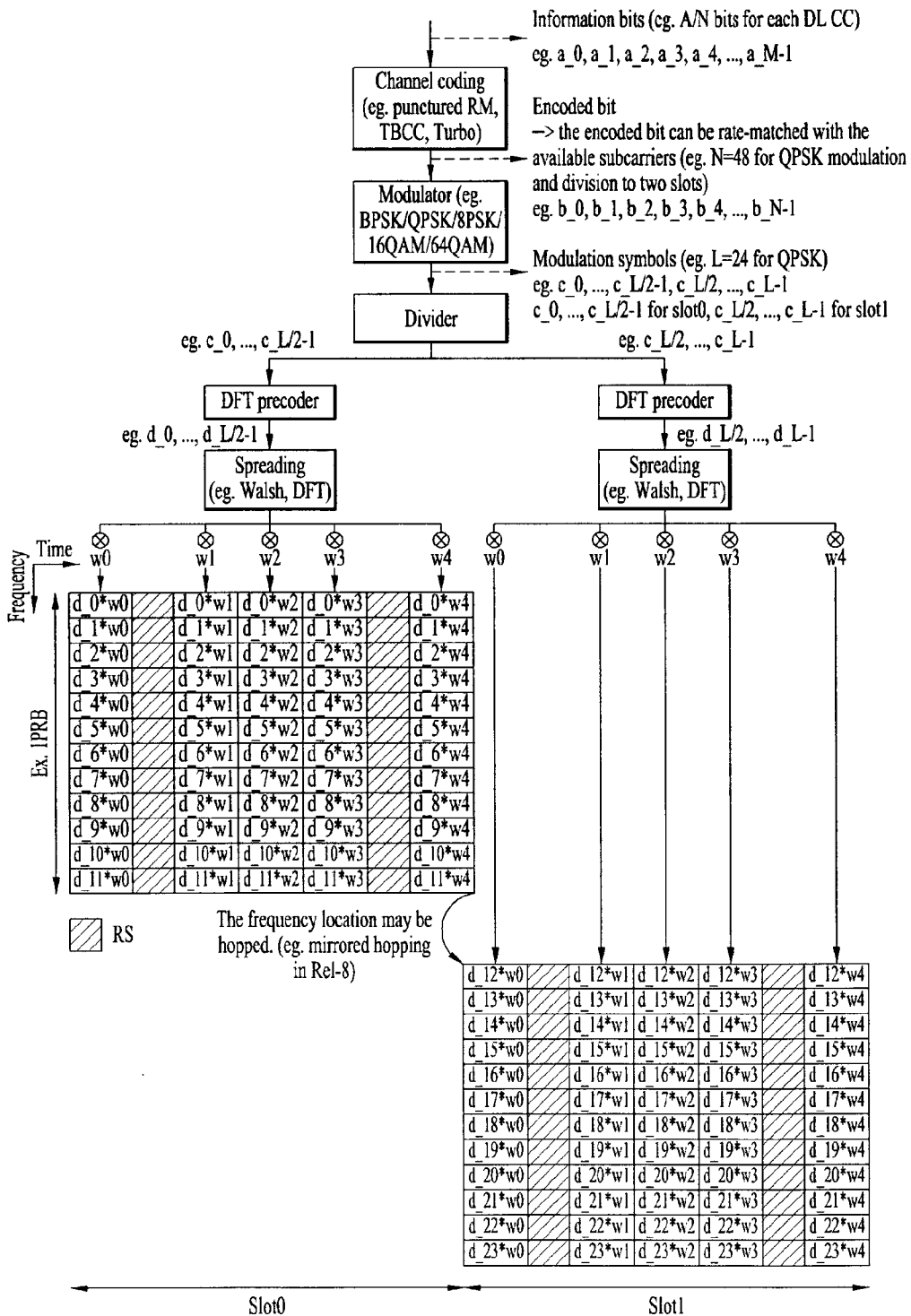

FIG. 30 exemplarily shows a structure of PUCCH format 3 using orthogonal code (OC) of 'SF=5'.

Referring to FIG. 30, a basic signal processing method may be equal to the former method described with reference to FIG. 29. FIG. 30 differs from FIG. 29 in the numbers/locations of UL control information (UCI) SC-FDMA symbols and RS SC-FDMA symbols. In this case, a spreading block may apply to a front stage of a DFT precoder.

In FIG. 3, RS may succeed to the structure of LTE system. For instance, a cyclic shift may be applicable to a basic sequence. A multiplexing capacity of a data part may become 5 due to 'SF=5'. Yet, a multiplexing capacity of an RS part may be determined according to a cyclic shift interval $\Delta_{shift}^{PUCCH}$. For instance, the multiplexing capacity may be given as $12/\Delta_{shift}^{PUCCH}$. In this case, a multiplexing capacity for $\Delta_{shift}^{PUCCH}=1$, a multiplexing capacity for $\Delta_{shift}^{PUCCH}=2$ and a multiplexing capacity for $\Delta_{shift}^{PUCCH}=3$ may become 12, 6 and 4, respectively. In FIG. 30, the multiplexing capacity of the data part becomes 5 due to SF=. Yet, if the multiplexing capacity of the RS becomes 4 in case of $\Delta_{shift}^{PUCCH}$, total multiplexing capacity may be limited to 4 corresponding to a smaller value of the two.

Figure 31:
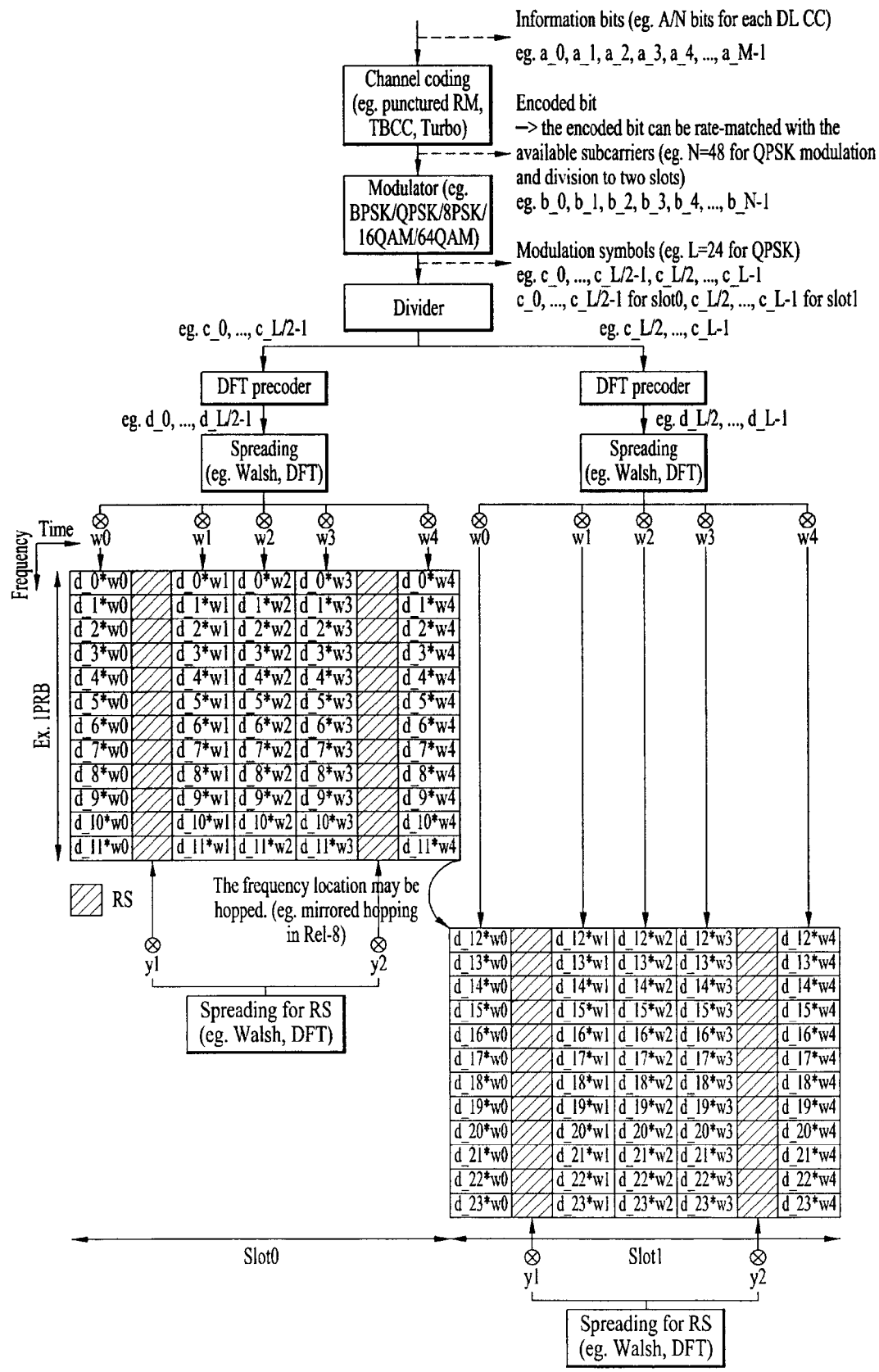

FIG. 31 exemplarily shows a structure of PUCCH format 3 that may increase multiplexing capacity at slot level.

First of all, it may be able to increase total multiplexing capacity by applying the SC-FDMA symbol level spreading described with reference to FIG. 29 and FIG. 30 to RS. Referring to FIG. 31, if Walsh cover (or DFT code cover) is applied with a slit, multiplexing capacity may be doubled. Hence, the multiplexing capacity may become 8 despite $\Delta_{shift}^{PUCCH}$ not to decrease multiplexing capacity in data interval. In FIG. 31, '[y1 y2]=[1 1]', '[y1 y2]=[1 −1]' or linear transform type thereof (e.g., [j j], [j −j], [1 j], [1 −j], etc.) may be usable as orthogonal cover code for RS.

Figure 32:
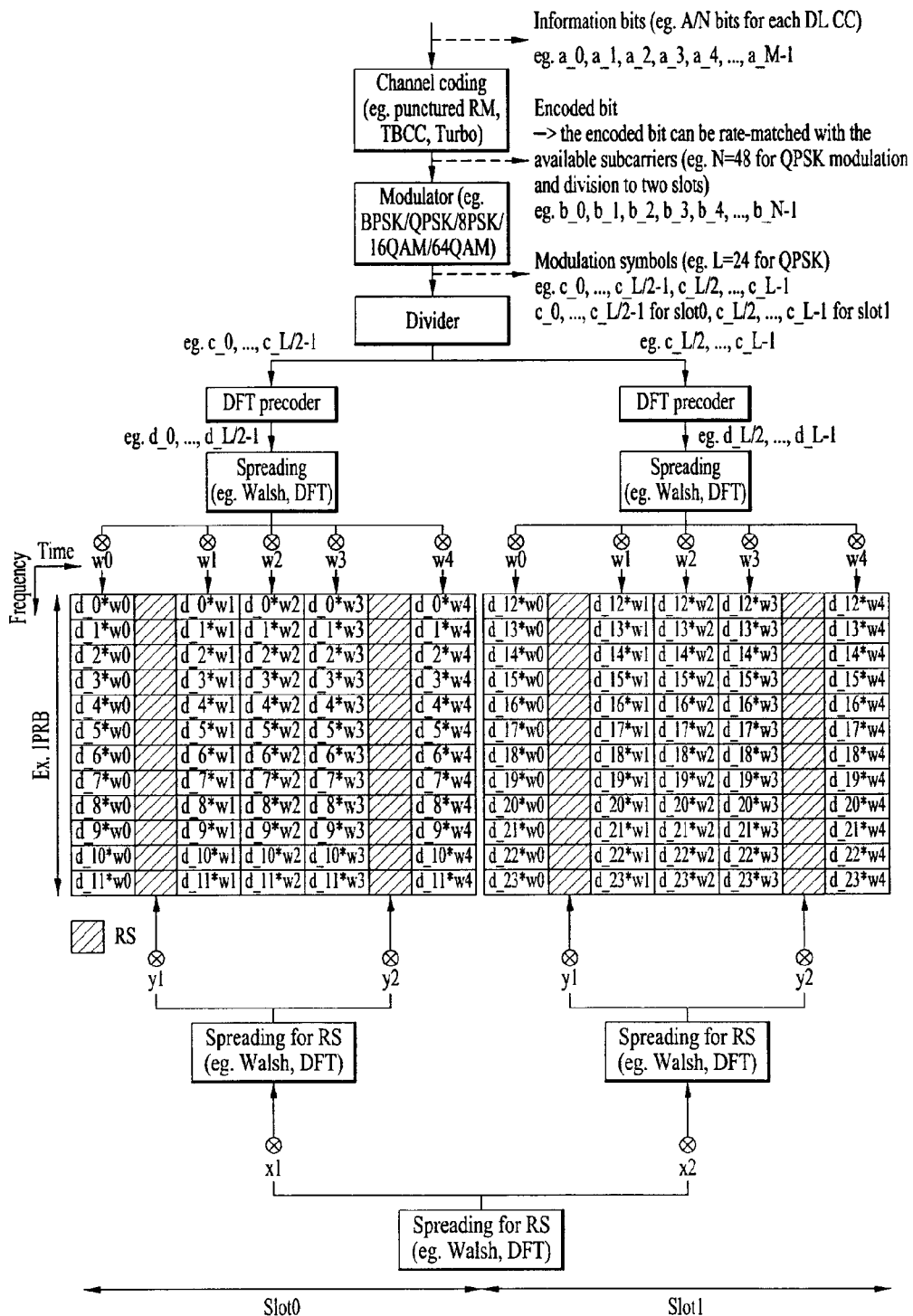

FIG. 32 exemplarily shows a structure of PUCCH format 3 that may increase multiplexing capacity at subframe level.

Referring to FIG. 32, if frequency hopping is not applied at slot level, it may be able to double the multiplexing capacity again by applying Walsh cover by slot unit. In doing so, as mentioned in the foregoing description, it may be able to use '[x1 x2] (=[1 1] or [1 −1])' as the orthogonal cover code. And, its modified form may be usable as well.

For reference, the processing process for PUCCH format 3 may not be bound by the orders shown in FIGS. 29 to 32.

In the following description, detail related to the resource allocation may be explained in detail.

Figure 33:
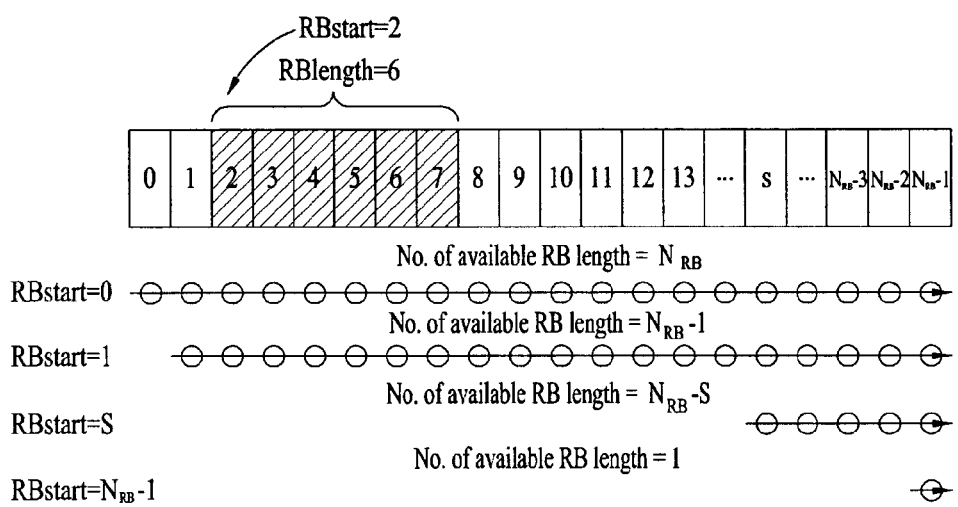
FIG. 33 is a diagram for describing resource allocation indicated to a user equipment according to one embodiment of the present invention.

FIG. 33 is a diagram for describing resource allocation indicated to a user equipment according to one embodiment of the present invention. Control information on this resource allocation may be provided to a user equipment via PDCCH DL control information (DCI) format and may indicate allocation of a physical resource block or allocation of a virtual resource block in accordance with a resource allocation type. FIG. 33 shows a scheme of allocating contiguous frequency resource to UL or DL transmission scheduled for a user equipment.

Table 11 shows a method of signaling a compact scheme, which is a scheme of indicating a start point S of a basic unit 'RB' of resource allocation and the number (=length L) of allocated RBs, in case of informing a user equipment of allocation of contiguous frequency resource. Information field for resource block allocation may include RIV (resource indication value) shown in Table 11. And, the RB start point and the number (length) of the contiguously allocated RBs may be drawn from the RIV. In Table 11, $\lfloor x \rfloor$ may be a floor(x) operation and may mean a maximum integer smaller than X.

TABLE 11 if L−1≤$\lfloor N_{RB}/2 \rfloor$ then
    RIV = $N_{RB}$(L−1)+S
else
    RIV = $N_{RB}$($N_{RB}$−L+1)+($N_{RB}$−1−S)
End
Required bits
    $N_{bit-required}$ = $\lceil \log_2(RIV_{max}+1) \rceil$
    Without limitation
        $RIV_{max}$ = $N_{RB} \cdot (N_{RB}+1)/2 - 1$
    With limitation $L^{Limit}$
        $RIV_{max}$ = min{$N_{RB} \cdot (N_{RB}+1)/2 - 1, N_{RB}(L^{limit}-1)+N_{RB}-L^{limit}$}

As exemplified in FIG. 33, a whole frequency resource available for scheduling of UL or DL transmission may include $N_{RB}$ resource blocks (RBs) 0, . . . , and $N_{RB}-1$). The frequency resource allocated to a user equipment may be notified to the user equipment via an RB start point (RBstart: S) and a resource block length (RBlength: L).

The number of types (or the number of hypotheses) configured by the resource allocation may be $N_{RB}(N_{RB}+1)/2$. And, the number of types (or the number of hypotheses) requested to represent the allocated resource blocks may be ceiling($\log_2(N_{RB}+N_{RB}+1)/2$). In this case, the ceiling(x) may mean a minimum integer equal to or greater than x. Referring to FIG. 33, if S is 0, the number of available RB lengths may be $N_{RB}$. And, if S is 1, the number of available RB lengths may be $N_{RB}-1$. Moreover, if S is $N_{RB}-1$, the number of available RB lengths may be 1. In particular, the start point S of the resource allocation may have a value of '$0 \le S \le N_{RB}-1$' and the number L of RB lengths available for allocation may be represented as $N_{RB}-S$. Alternatively, in case of expression in different aspect, the RB length L available for allocation may have a value of '$1 \le L \le N_{RB}$' and the start point S of the resource allocation may be represented as $N_{RB}-L$.

When a bit field of scheduling control information is configured with reference to a binary value of a maximum value of each value without considering combination possibility according to S and L, if $N_{RB}=20$, it may become $20<2^5$. Hence, total 10 bits (e.g., 5 bits for S and 5 bits for L) are required. Yet, if the bit field is configured in this manner, it may include combinations impossible to occur. And, it may result in the increment of the number of transmission bits unnecessarily. Therefore, the possible combinations of S and L may be represented as RIV only to decrement the transmission bit number and the RIV may be transmitted as a binary number (e.g., binary representation). For instance, if $N_{RB}=20$, the available combinations of available S and L only may be represented as Table 12. Combinations of S and L are shown in Table 12. For instance, it may become $1 \le L \le 20$ if S=0, it may becomes $1 \le L \le 19$ if S=1, it may become $1 \le L \le 18$ if S=2, ..., it may become $1 \le L \le 2$ if S=18, and it may become L=1 if S=19. In particular, a part indicated by hatching may correspond to unavailable combinations of S and L.

In case of configuring the RIV value in the above manner, the RIV of the part represented by hatching lines in case of $L-1 \le \lfloor N_{RB}2 \rfloor$ may be mapped to RIV in case of $L-1 \le \lfloor N_{RB}2 \rfloor$. Hence, it may be able to use the RIV Hence, wastelessly. For instance, if $N_{RB}=20$, RIVs of the part corresponding to $L \le \lfloor N_{RB}2 \rfloor+1=\lfloor 20/2 \rfloor+1=11$ in the region of Table 12 indicated by hatching may be reusable for the part corresponding to $L \le \lfloor N_{RB}2 \rfloor+1=\lfloor 20/2 \rfloor+1=11$ in the remaining part. In this case, a maximum value of RIV indicating the possible combinations of S and L may become 209.

If the RIV (resource indication value) is configured in the above manner, the number of transmission bits may depend on a maximum value of the RIV. And, RIV smaller than the maximum value of the RIV may be configured not to be mapped to a value that may not be able to actually become the combination of S and L. In particular, all values equal to or smaller than the RIV maximum may be able to correspond to the possible combinations of S and L. Since the possible combinations of S and L may be represented as 209 (=$N_{RB}$ ($N_{RB}+1$)/2−1, where $N_{RB}=20$) states, the RIV may be represented using 8 bits only.

TABLE 12

| | | | | | | | | | | S | | | | | | | | | | |
|---|---|---|---|---|---|---|---|---|---|---|---|---|---|---|---|---|---|---|---|---|
| L | 0 | 1 | 2 | 3 | 4 | 5 | 6 | 7 | 8 | 9 | 10 | 11 | 12 | 13 | 14 | 15 | 16 | 17 | 18 | 19 |
| 1 | 0 | 1 | 2 | 3 | 4 | 5 | 6 | 7 | 8 | 9 | 10 | 11 | 12 | 13 | 14 | 15 | 16 | 17 | 18 | 19 |
| 2 | 20 | 21 | 22 | 23 | 24 | 25 | 26 | 27 | 28 | 29 | 30 | 31 | 32 | 33 | 34 | 35 | 36 | 37 | 38 | 39 |
| 3 | 40 | 41 | 42 | 43 | 44 | 45 | 46 | 47 | 48 | 49 | 50 | 51 | 52 | 53 | 54 | 55 | 56 | 57 | 58 | 59 |
| 4 | 60 | 61 | 62 | 63 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 | 96 | 97 | 98 | 99 |
| 6 | 100 | 101 | 102 | 103 | 104 | 105 | 106 | 107 | 108 | 109 | 110 | 111 | 112 | 113 | 114 | 115 | 116 | 117 | 118 | 119 |
| 7 | 120 | 121 | 122 | 123 | 124 | 125 | 126 | 127 | 128 | 129 | 130 | 131 | 132 | 133 | 134 | 135 | 136 | 137 | 138 | 139 |
| 8 | 140 | 141 | 142 | 143 | 144 | 145 | 146 | 147 | 148 | 149 | 150 | 151 | 152 | 153 | 154 | 155 | 156 | 157 | 158 | 159 |
| 9 | 160 | 161 | 162 | 163 | 164 | 165 | 166 | 167 | 168 | 169 | 170 | 171 | 172 | 173 | 174 | 175 | 176 | 177 | 178 | 179 |
| 10 | 180 | 181 | 182 | 183 | 184 | 185 | 186 | 187 | 188 | 189 | 190 | 191 | 192 | 193 | 194 | 195 | 196 | 197 | 198 | 199 |
| 11 | 200 | 201 | 202 | 203 | 204 | 205 | 206 | 207 | 208 | 209 | 210 | 211 | 212 | 213 | 214 | 215 | 216 | 217 | 218 | 219 |
| 12 | 199 | 198 | 197 | 196 | 195 | 194 | 193 | 192 | 191 | 190 | 189 | 188 | 187 | 186 | 185 | 184 | 183 | 182 | 181 | 180 |
| 13 | 179 | 178 | 177 | 176 | 175 | 174 | 173 | 172 | 171 | 170 | 169 | 168 | 167 | 166 | 165 | 164 | 163 | 162 | 161 | 160 |
| 14 | 159 | 158 | 157 | 156 | 155 | 154 | 153 | 152 | 151 | 150 | 149 | 148 | 147 | 146 | 145 | 144 | 143 | 142 | 141 | 140 |
| 15 | 139 | 138 | 137 | 136 | 135 | 134 | 133 | 132 | 131 | 130 | 129 | 128 | 127 | 126 | 125 | 124 | 123 | 122 | 121 | 120 |
| 16 | 119 | 118 | 117 | 116 | 115 | 114 | 113 | 112 | 111 | 110 | 109 | 108 | 107 | 106 | 105 | 104 | 103 | 102 | 101 | 100 |
| 17 | 99 | 98 | 97 | 96 | 95 | 94 | 93 | 92 | 91 | 90 | 89 | 88 | 87 | 86 | 85 | 84 | 83 | 82 | 81 | 80 |
| 18 | 79 | 78 | 77 | 76 | 75 | 74 | 73 | 72 | 71 | 70 | 69 | 68 | 67 | 66 | 65 | 64 | 63 | 62 | 61 | 60 |
| 19 | 59 | 58 | 57 | 56 | 55 | 54 | 53 | 52 | 51 | 50 | 49 | 48 | 47 | 46 | 45 | 44 | 43 | 42 | 41 | 40 |
| 20 | 39 | 38 | 37 | 36 | 35 | 34 | 33 | 32 | 31 | 30 | 29 | 28 | 27 | 26 | 25 | 24 | 23 | 22 | 21 | 20 |

Meanwhile, referring to a lower part of Table 11, if limitation is put on a maximum value (=$L^{limit}$) of the number of RBs that can be allocated in the RIV configuration, i.e., if L is limited to become equal to or lower than $L^{limit}$, the number of bits required for representing the combination of S and L may be decremented. For instance, if it is set to '$L^{limit}=6$' in Table 12, a range of L value possible to occur is given as $1 \le L \le 6$. Since the combination having the range of the L value set to $7 \le L \le 20$ is not used, it may be confirm that the maximum value of the RIV is 114. In particular, as the range of RIV possible to occur is given as $0 \le RIV \le 114 < 2^7$, it may result in $N_{bit\_required\_lim}$ (=7) bits.

Semi-persistent scheduling may be in detail described as follows.

First of all, semi-persistent scheduling (SPS) means a scheduling method including the steps of designating parameters associated with a subframe for performing SPS transmission/reception in UL or DL to a user equipment through RRC (radio resource control) signaling (i.e., designating a subframe cycle and offset) and notifying SPS activation and release to the user equipment via PDCCH actually. In particular, even if information associated with the subframe for performing the SPS transmission/reception is designated to the user equipment through the RRC signaling, the user equipment does not perform the SPS transmission/reception in direct but performs the SPS transmission/reception if receiving PDCCH (i.e., PDCCH from which SPS C-RNTI is detected) indicating the SPS activation/release. Moreover, the user equipment allocates frequency resource to use for the SPS transmission/reception in accordance with resource block allocation information and MCS (modulation and coding scheme) designated via PDCCH indicating the SPS activation and may then able to start the execution of the SPS transmission/reception in accordance with the subframe cycle and offset allocated via the RRC signaling by applying a modulation scheme and a coding rate. Moreover, if the user equipment receives the PDCCH indicating the SPS release, it may interrupt the SPS transmission/reception. If the user equipment receives PDCCH indicating activation (or reactivation) for the interrupted SPS transmission/reception, the user equipment may be able to resume the SPS transmission/reception with the subframe cycle and offset allocated through the RRC signaling in accordance with RB allocation, MCS and the like designated by the corresponding PDCCH.

Currently, in the 3GPP LTE system, various formats including DCI format 0 for UL resource allocation, DCI formats 1, 1A, 1B, 1C, 1D, 2, 2A for DL resource allocation, DCI formats 3 and 3A for transmission power adjustment of a user equipment and the like are defined as PDCCH DCI format. This PDCCH DCI format may include selective combinations of control informations including hopping flag, RB allocation, modulation & coding scheme (MCS), redundancy version (RV), new Data Indicator (NDI), Transmit Power Control (TPC), cyclic shift for DMRS (Demodulation Reference Signal), UL index (for TDD)), DL assignment index (DAI) (for TDD), Channel Quality Information (CQI) request, DL HARQ process number, transmitted precoding matrix index (Transmitted Precoding Matrix Indicator; TPMI), PMI confirmation and/or the like to be suitable for usages.

The PDCCH for the SPS scheduling may be validated in a manner of masking CRC of DCI carried on the PDCCH with SPS C-RNTI and setting 'NDI=0', for example. In particular, in case of SPS activation, by setting a combination of a specific bit field to 0, it may able to check a presence or non-presence of valid SPS activation control information. Table 13 shows specific fields usable for SPS activation PDCCH validation in accordance with DCI format.

TABLE 13

|  | DCI format 0 | DCI format 1/1A | DCI format 2/2A/2B |
| --- | --- | --- | --- |
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Thus, the method of checking a presence or non-presence of error by checking whether a combination of specific bit fields has a prescribed value may be represented as using the combination of the specific bit fields as virtual CRC. In other words, even if an error uncheckable with CRC is generated, it may be able to enable additional error detection by checking whether a corresponding bit field value is a prescribed value determined in advance, using the virtual CRC.

The error detection of the virtual CRC type is very important for the SPS activation/release. For instance, when error is generated from PDCCH detection of a prescribed user equipment, if the prescribed user equipment incorrectly recognizes that the PDCCH indicates the SPS activation for itself despite DCI allocated to another user equipment, since the prescribed user equipment keeps using the SPS transmission resource, the once-error may cause a persistent problem. Therefore, using the virtual CRC, it may be able to prevent the incorrect SPS detection.

Meanwhile, in case of the SPS release, in order o check the recovery of the resource used to allocated to a user equipment, the user equipment may be set to transmit ACK/NACK to indicate whether it has received the SPS release PDCCH. In case of the SPS release, if a value of a specific bit field is set in accordance with DCI format, as shown in Table 14, it may be usable as a virtual CRC.

TABLE 14

|  | DCI format 0 | DCI format 1A |
| --- | --- | --- |
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

In the following description, DL assignment index in TDD type system may be explained in detail.

First of all, PDCCH DCI formats 0, 1, 1A, 1B, 1D, 2, 2A and the like may include DAI (downlink assignment index) field.

The DAI field may include information on the currently cumulative number of PDSCHs transmitted from a base station and/or PDCCHs having no corresponding PDSCH within at least one DL subframe for ACK/NACK transmission in one UL subframe in TDD system. When a user equipment transmits UL ACK/NACK, which is for the PDSCH and/or the PDCCHs having no corresponding PDSCH in at least one DL subframe, in at least one UL subframe, the information on the number of the PDSCHs transmitted from the base station and/or the PDCCHs having no corresponding PDSCH may be drawn using the DAI field. Using this information, the user equipment may be able to determine whether a transmission not detected by itself from the PDSCHs transmitted from the base station and/or the PDCCHs having no PDSCH exists in the at least one DL subframe for the ACK/NACK transmission in one UL subframe. The DAI field may be described in detail as follows.

First of all, FDD is a transmitting/receiving method in a manner of discriminating DL and UL from each other per independent frequency band. Hence, when a base station sends PDSCH or PDCCH having no corresponding PDSCH on DL band, a user equipment may be able to transmit ACK/NACK response indicating a presence or non-presence of full DL data reception via PUCCH on UL band corresponding to the DL band after specific duration. Hence, the DL and the UL may operate by 1-to-1 correspondence.

In particular, for example of the conventional 3GPP LTE system, control information on DL data transmission by a base station may be delivered to a user equipment via PDCCH. Having received the data scheduled via the PDCCH for itself on PDSCH, the user equipment may be able to transmit ACK/NACK on PUCCH, which is the channel for carrying UL control information, (or by piggyback on PUSCH). Moreover, the PDCCH may be used for special purpose without the PDSCH for the data scheduled via PDCCH. For instance, PDCCH indicating DL SPS release may not have PDSCH corresponding to the PDCCH. In 3GPP LTE system, having received the PDCCH having no corresponding PDSCH, a user equipment may be able to transmit ACK/NACK on PUCCH, which is the channel for carrying UL control information, (or by piggyback on PUSCH). In TDD, ACKs/NACKs for the PDSCH and the PDCCH having no corresponding PDSCH across at least one or more DL subframes may be collectively processed and may be then transmitted on PUSCH in one UL subframe. For clarity of the description, PDCCH means the PDCCH for scheduling PDSCH in case of not being confused with PDSSCH for another usage. In particular, if there is no description on a different meaning, the PDCCH for scheduling the PDSCH may be simply represented as PDCCH. For clarity and convenience of the following description, PDCCH having no PDSCH corresponding to ACK/NACK response via PUCCH may be omitted. In general, PUCCH for ACK/NACK transmission is not allocated to each user equipment in advance but may be configured in a manner that a plurality of user equipments in a cell share a plurality of PUCCHs each timing point. Hence, as PUCCH for carrying ACK/NACK transmitted by a user equipment having received DL data at a random timing point, it may be able to use PUCCH corresponding to PDCCH on which the user equipment has received scheduling information on the corresponding DL data.

The PUCCH corresponding to the PDCCH may be described in detail as follows.

First of all, a region for carrying PDCCH in each DL subframe may include a plurality of control channel elements (CCEs). And, PDCCH transmitted to a prescribed user equipment in a random subframe may include at least one of the CCEs configuring the PDCCH region of the corresponding subframe. Moreover, in a region for carrying PUCCH in each UL subframe, resources capable of carrying a plurality of PUCCHs may exist. In this case, the user equipment may be able to transmit ACK/NACK on a PUCCH resource corresponding to an index matching an index of a specific CCE (e.g., a $1^{st}$ CCE) among CCEs configuring the PDCCH received by the user equipment itself.

Figure 34:
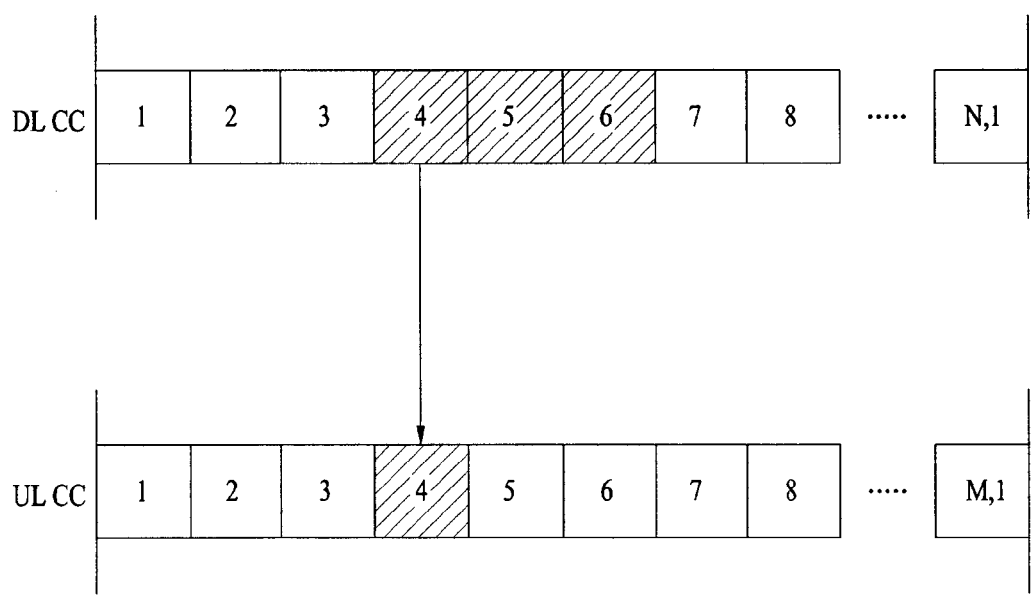
FIG. 34 is a diagram for describing ACK/NACK carrying resource according to one embodiment of the present invention.

FIG. 34 is a diagram for describing a resource for carrying ACK/NACK according to one embodiment of the present invention. In FIG. 34, each square of DL CC indicates CCE. And, each square of UL CC indicates PUCCH resource. Referring to FIG. 34, for example, it may assume a case that a prescribed user equipment obtains PDSCH related information through PDCCH configured with CCE #4, CCE #5 and CCE #6 and then receives PDSCH. In this case, ACK/NACK information on the PDSCH may be transmitted on PUCCH corresponding to the CCE #4 which is a $1^{st}$ CCE configuring the PDCCH for scheduling the PDSCH, i.e., PUCCH resource #4.

Unlike FDD, a system according to TDD may use the same frequency band in a manner of dividing the corresponding frequency band into DL subframe and UL subframe on time axis. Hence, in case of a data traffic situation asymmetric to DL/UL, DL subframes may be allocated more than UL subframes, and vice versa. In this case, unlike FDD, it may happen that DL subframe and UL subframe fail in corresponding to each other by 1 to 1. n particular, if the number of the DL subframes is greater than that of the UL subframes, it may happen that ACK/NACK response to a plurality of PDSCHs transmitted in a plurality of DL subframes should be handled in one UL subframe.

Thus, when a plurality of PDSCHs are transmitted in a plurality of DL subframes to a prescribed user equipment, a base station may transmit a plurality of PDCCHs for a plurality of the PDSCHs one by one. In doing so, the user equipment may be able to transmit ACK/NACK on a single PUCCH in a single SUL subframe for a plurality of the received PDSCHs. A method of transmitting one ACK/NACK for a plurality of PDSCHs may be mainly classified into an ACK/NACK bundling transmission (i.e., ACK/NACK bundling) and a PUCCH selection transmission.

In the ACK/NACK bundling transmission, if decoding of a plurality of PDSCHs received by a user equipment is completely successful, the number of ACK informations may be transmitted via one PUSCCH. Otherwise (i.e., a case that at least one of a plurality of the PDSCHs fails in decoding), the user equipment may transmit NACK. In the following description, in order to prevent confusion with terminologies, the bundled ACK/NACK transmission may be named a bundling scheme. The bundling scheme may be modified to use as follows. First of all, if decoding of at least one of a plurality of PDSCHs received by a user equipment is successful, the user equipment may transmit the number of ACKs on one PUCCH. Secondly, otherwise (i.e., no ACK exists for a plurality of the PDSCHs), NACK may be transmitted. Alternatively, the bundling scheme may be modified to use as follows. First of all, if decoding of at least one of a plurality of PDSCHs received by a user equipment is successful, the user equipment may transmit the number of ACKs contiguous from $1^{st}$ PDSCH on one PUCCH. Secondly, otherwise (i.e., the $1^{st}$ PDSCH among a plurality of the PDSCHs corresponds to NACK), NACK may be transmitted.

In the PUCCH selection transmission (or channel selection transmission), a user equipment receiving a plurality of PDSCHs may occupy a plurality of PUCCHs usable for its ACK/NACK transmission by a random method. The user equipment may be then able to transmit a plurality of ACKs/NACKs using a combination of 'transmission ACK/NACK by selecting which one of a plurality of the occupied PUCCHS (i.e., which channel is selected is used as information bit)' and a modulated/coded content in the selected and transmitted PUCCH. For instance, after one of two PUCCHs has been selected, if a-bit ACK/NACK information is transmitted on the selected PUCCH, since it may be able to represent 1-bit information by selecting one of the two PUCCHs, (a+1)-bit ACK/NACK information may be transmitted.

When a user equipment transmits ACK/NACK signal to a base station by one of the above-described method, it may assume a case that the user equipment may not receive or miss some of PDCCHs sent by the base station in several subframe intervals. In this case, since the user equipment is unable to recognize that PDSCH corresponding to the missing PDCCH has been transmitted to itself, error may occur in ACK/NACK generation.

In order to solve such error, TDD type system defines that the number of PDSCHs, which are to be transmitted for ACK/NACK resource of one UL subframe, is indicated in a manner that DAI (downlink assignment index) is contained in PDCCH. For instance, if one UL subframe is set to correspond to N DL subframes, indexes are sequentially given to PDSCHs transmitted in the N DL subframes (i.e., the PDSCHs are sequentially counted) and are then carried on PDCCH for scheduling the PDSCH. Having received the PDCCH, a user equipment may be aware whether the previous PDCCH has been correctly received using DAI information contained in the PDCCH.

In TDD system, DAI information may be usable as a genuine counter. In particular, a sequence for assignment of DL control channel for a specific user equipment may be represented using 2 bits. Each user equipment may receive the assignment order of DL control channel in a plurality of subframes and may be then able to check a DAI value in the assignment order of the DL control channel. If a previously received DAI value is not contiguous, the corresponding user equipment may be aware that there is assignment missed by itself. In this case, the missing assignment may mean that a user equipment fails in detecting or demodulating PDCCH assigned to itself.

In this case, the DAI value may be represented as Formula 3.

$$I = \mathrm{mod}(P, N) \quad \text{[Formula 3]}$$

In Formula 3, I indicates each DAI value, P indicates an assignment order indicated by the DL assignment index information, N indicates $2^n$, and n indicates the number of bits for indicating the DAI information.

For instance, if the bit number n for indicating the DAI information is 2 and the assignment order P is 0, 1, 2, 3, 4, 5, 6, 7, 8, 9 or 10, the N has a value of 4 and each DAI value becomes 0, 1, 2, 3, 0, 1, 2, 3, 0, 1, or 2.

In the following description, ACK/NACK signal, which is transmitted in case that a user equipment is unable to receive any one of a plurality of PDCCHs in a system of TDD type, is explained with reference to FIG. 35.

Figure 35:
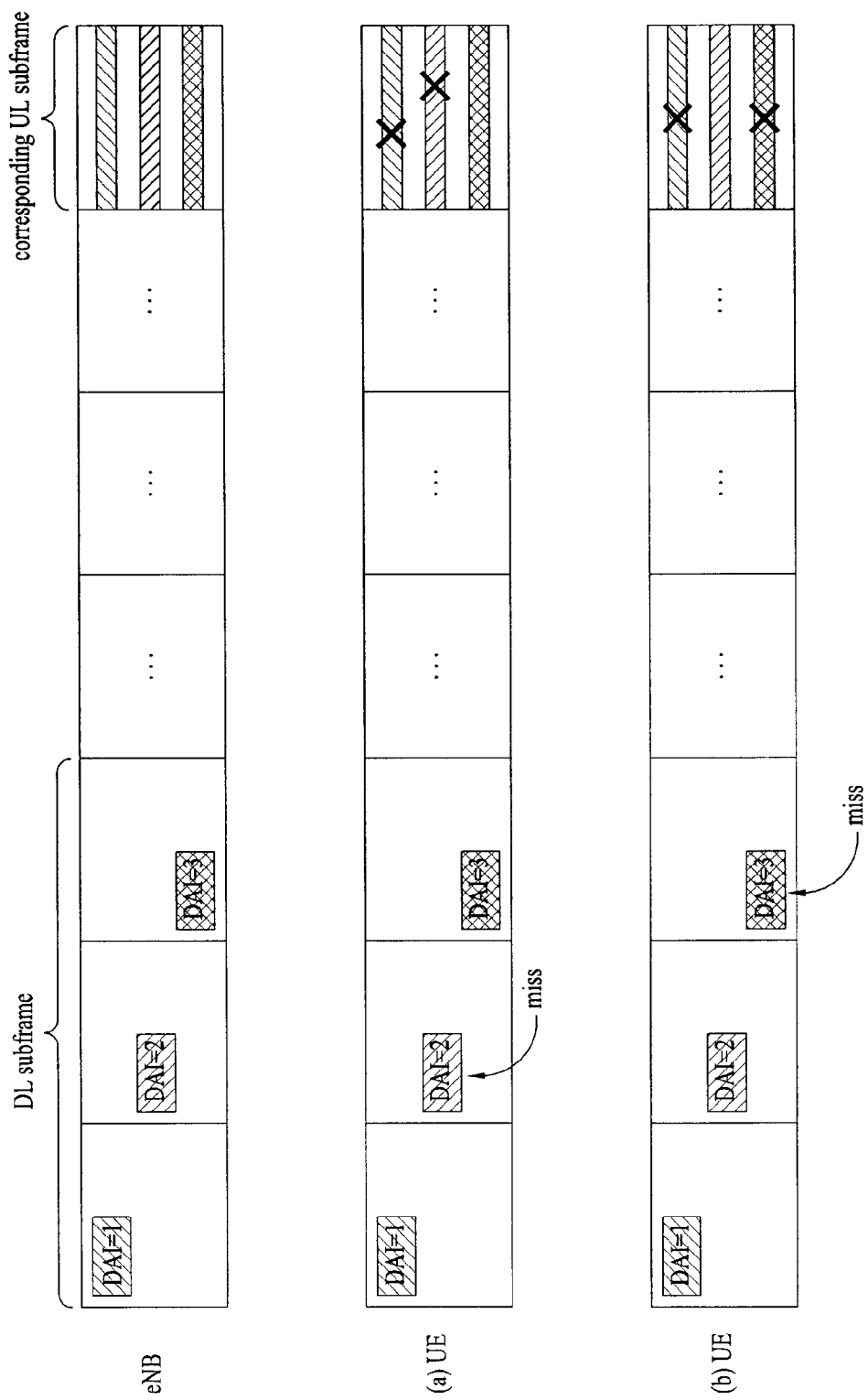
FIG. 35 is a diagram for ACK/NACK transmission, when a user equipment may not receive one of a plurality of PDCCHs in TDD system, according to one embodiment of the present invention.

FIG. 35 is a diagram for ACK/NACK transmission, when a user equipment may not receive one of a plurality of PDCCHs in TDD system, according to one embodiment of the present invention. FIG. 35 shows a case that one DL subframe is set to correspond to 3 DL subframes.

FIG. 35 (b) shows a case that a user equipment (UE) misses $2^{nd}$ PDCCH. In particular, referring to FIG. 35 (b), after the user equipment has received PDCCH having 'DAI=1', the user equipment receives PDCCH having 'DAI=3'. In this case, since the DAI (=3) of $3^{rd}$ PDCCH corresponding to a last PDCCH is different from the number (i.e., 2) of PDCCHs having been received so far, the user equipment may recognize that it has missed $2^{nd}$ PDCCH and may be then able to send ACK/NACK correspondingly.

FIG. 35 (c) shows a case that a user equipment (UE) misses a last PDCCH (i.e., $3^{rd}$ PDCCH). In particular, referring to FIG. 35 (c), after the user equipment has received PDCCH having 'DAI=2', the user equipment fails in receiving PDCCH having 'DAI=3'. In this case, since the DAI index of the last received PDCCH matches the number (i.e., 2) of PDCCHs having been received so far, the user equipment may not be able to recognize that it has missed the last PDCCH. Therefore, the user equipment may be able to recognize that only 2 PDCCHs have been scheduled in the DL subframe. In doing so, since ACK/NACK information is carried on PUCCH resource corresponding not to 'DAI=3' but to 'DAI=2', a base station may recognize that the user equipment has missed the PDCCH having 'DAI=3'.

In the following description, various methods for a user equipment to transmit ACK/NACK signal for a plurality of PDSCHs scheduled in a multi-carrier system are explained in detail.

First of all, in a multi-carrier system, when a plurality of PDCCHs for scheduling a plurality of PDSCH transmissions are transmitted, if a user equipment is fails in receiving at least one of a plurality of the PDCCHs (i.e., missing), ACK/NACK generation error may occur. To settle this error occurrence, it may be able to consider informing the user equipment of total number of the PDCCHs for scheduling the PDSCH or sequence information on the PDCCHs. In order to inform the user equipment of this information, DAI field defined in PDCCH DCI format may be usable. Although previous DAI information is defined by a system of TDD type, the present invention may configure DAI information on PDSCH scheduling in a multi-carrier system of FDD or TDD type. In the following description, unless there is description of another meaning, PDCCH for scheduling PDSCH may be simply named PDCCH. Although ACK/NACK response is actually a response to PDSCH, for clarity and convenience of the following description, the PDSCH for scheduling the PDSCH is interchangeably described without discrimination. Moreover, for clarity and convenience of the following description, PDCCH having no PDSCH may be described without being discriminated from the PDCCH for scheduling the PDSCH.

In the following description, how information indicating the number of PDCCHs transmitted to a corresponding user equipment (i.e., total number of PDSCHs transmitted to a corresponding user equipment) is contained in each PDCCH is explained with reference to FIG. 36.

Figure 36:
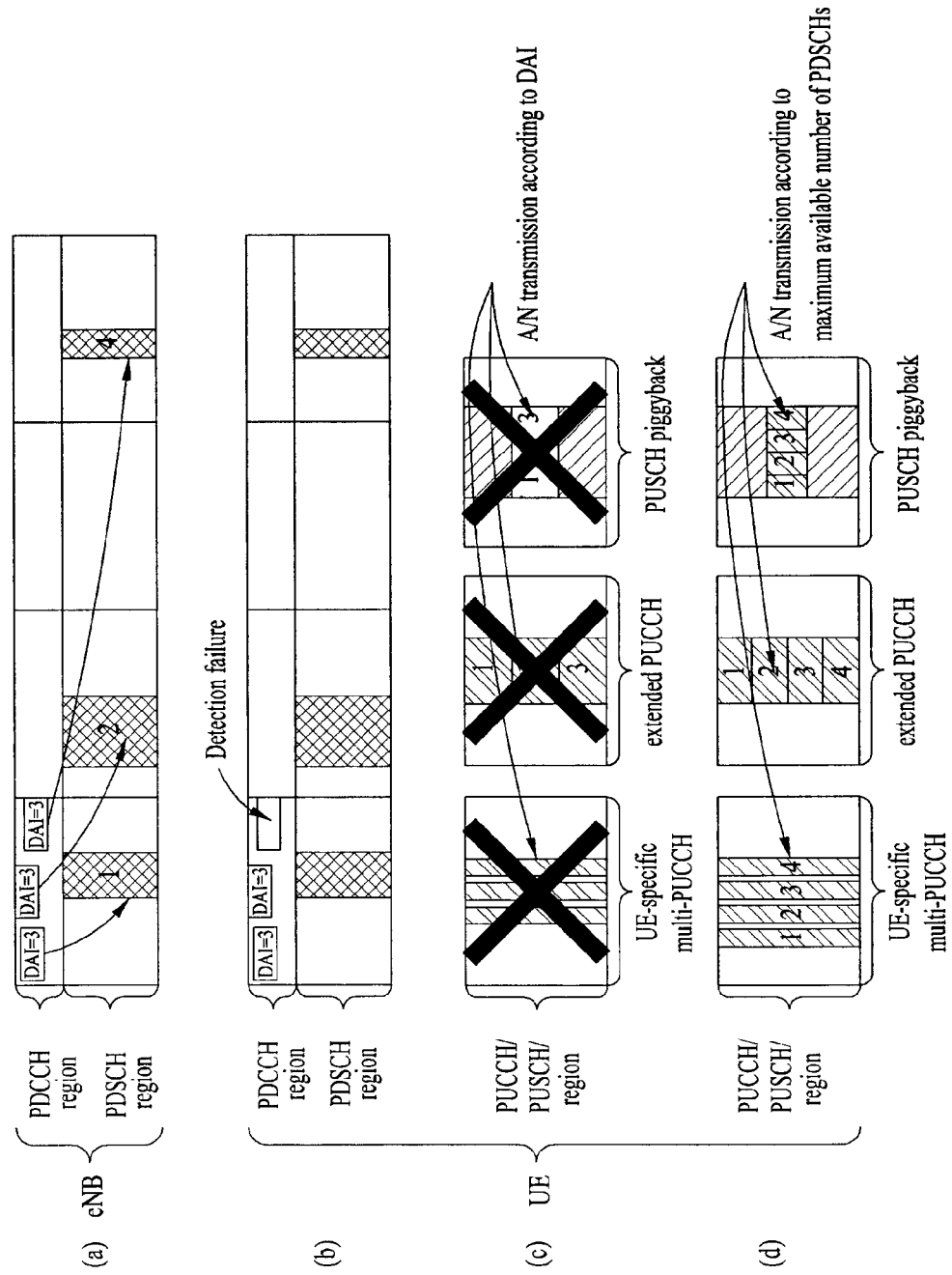
FIG. 36 is a diagram for describing a scheme of indicating total PDCCH number according to one embodiment of the present invention.

FIG. 36 is a diagram for describing a scheme of indicating total number of PDCCHs according to one embodiment of the present invention.

Referring to FIG. 36, as mentioned in the foregoing description, PDCCH may mean the PDCCH for scheduling PDSCH. Since one PDCCH may schedule one PDSCH transmission, the number of PDCCHs may equal to total number of PDSCHs scheduled for a corresponding user equipment. In case that a transmission of PDCCH having no PDSCH is included, the number of PDCCHs may be greater than the total number of PDSCHs scheduled for the corresponding user equipment by a prescribed number. For clarity and convenience of the following description, the transmission of the PDCCH having no PDSCH shall be omitted. Referring to FIG. 36 (a) that shows PDCCH and PDSCH transmitted by a base station eNB, 3 PDCCHs may be able to schedule total 3 PDSCHs, respectively. Moreover, when the base station transmits at least one or more PDCCHs to a random user equipment in one subframe (i.e., a case of cross-carrier scheduling is included), it may be able to provide information indicating the number of PDCCHs, which should be received by the corresponding user equipment in the corresponding subframe, via each of the PDCCHs. Alternatively, when the base station in the TDD transmits at least one or more PDCCHS to a random user equipment in at least one or more DL subframes corresponding to one UL subframe for ACK/NACK response, the base station may provide information indicating the number of PDCCHS, which should be received by the corresponding user equipment for the ACK/NACK response in the corresponding UL subframe, via each of the PDCCHs. And, the corresponding user equipment may be informed of the number of the PDCCHs via DAI field in PDCCH DCI format. FIG. 36 (b) shows a case that a user equipment fails in detecting one of a plurality of PDCCHs. FIG. 36 (c) and FIG. 36 (d) show various schemes of setting a plurality of ACK/NACK resources. FIG. 36 (c) and FIG. 36 (d) show an example of setting a plurality of user-specific PUCCHs and transmitting ACK/NACK information on a plurality of PDSCHs via one of the PUCCH resource, an example of transmitting ACK/NACK information on a plurality of PDSCHs on an extended PUCCH, and an example of transmitting ACK/NACK information on a plurality of PDSCHs via PUSCH by feedback.

For instance, if a base station transmits 3 PDCCHs in at least one or more DL subframes corresponding to one UL subframe for ACK/NACK response to a user equipment, the base station may be able to transmit information indicating that the 3 PDCCHs in a manner that the corresponding information is carried on each of the 3 PDCCHs transmitted to the corresponding user equipment. FIG. 36 (a) and FIG. 36 (b) show that DAI field contained in each PDCCH has a value of 3 (i.e., the number of PDCCHs, the number of PDCCHs).

According to this scheme, if the user equipment misses any one of a plurality of the PDCCHs transmitted to itself, the corresponding user equipment may be aware of the fact through the PDCCH number information carried on other PDCCHs.

According to this scheme, if a user equipment detects 2 of 3 PDCCHs only [FIG. 36 (b)], the user equipment may be aware that only two PDCCHs have been received using via the PDCCH number information, despite that a base station has transmitted the 3 PDCCHs. Yet, the PDCCH missed by the user equipment (i.e., which PDCCH is missing) may be unknown. For instance, in case that ACK/NACK is transmitted on each PUCCH corresponding to a CCE index of each PDCCH, since there is not ACK/NACK transmission to the PUCCH corresponding to the CCE index of the mixed PDCCH, the base station may be able to recognize which PDCCH is mixed by the user equipment. Yet, after PUCCH resources for ACK/NACK transmission have been previously allocated to a user equipment independently irrespective of which PDCCH, if the previously allocated PUCCH resources are arranged in order of the received PDCCH, the user equipment may not be aware of the order of the missing PDCCH. Hence, it may not be able to perform PUCCH resource allocation correctly in case of PDCCH reception error or failure. Likewise, when ACK/NACK information is transmitted on PUSCH resource by piggyback, it may be unable to know the order of the missing PDCCH. Hence, it may not be able to configure ACK/NACK resource mapping.

In particular, referring to FIG. 36 (b), if a user equipment detects 2 PDCCHs from 3 PDCCHs only but fails in detecting the remaining PDCCH, the user equipment may be able to know that total 3 PDCCHs have been transmitted (i.e., total 3 PDSCHs are scheduled). Yet, the user equipment may not be able to know which PDCCH fails in being detected. In this case, referring to FIG. 36 (c), in case that 3 ACK/NACK transmission resources are previously allocated, it may be unclear to determine which ACK/NACK transmission resource corresponds to which PDSCH transmission. In particular, the user equipment may be unable to determine that ACK/NACK information on PDSCH scheduled by the received 2 PDCCHs will be mapped to which 2 of the 3 ACK/NACK transmission resources. Likewise, a base station may not be able to determine that ACK/NACK information mapped to which 2 of the ACK/NACK transmission resources relates to which PDSCH transmission.

Therefore, to prepare for the above-described PDCCH detection failure, ACK/NACK resources corresponding to the number of PDSCHs for receiving maximum scheduling from a base station at a specific timing point are secured. And, the above-mentioned problems may be solved in a following manner. First of all, mapping of the ACK/NACK resources may be defined to be performed in accordance with an order of CC at which the PDSCH is situated (or, order of subframe, 2-dimensional order across CC and subframe). For instance, referring to FIG. 36 (d), if a user equipment receives 2 of 3 PDCCHS, it may be able to know that the total number of the scheduled PDSCHs is total 3.

The user equipment may be aware that PDSCH transmissions on $1^{st}$ and $2^{nd}$ CCs are scheduled by the 2 received PDCCHs (despite being unable to know which PDCCH is the missing PDCCH). Fr instance, the user equipment may be able to map ACK/NACK informations to $1^{st}$ and $2^{nd}$ ACK/NACK transmission resources for the PDSCHs on the $1^{st}$ and $2^{nd}$ CCs, respectively. Likewise, the base station may be able to check that the ACK/NACK information transmitted by the user equipment relates to the PDSCH carried on which CC.

In the following description, how an order value (i.e., an order value of PDSCH transmitted to the corresponding user equipment) of PDCCH transmitted to a corresponding user equipment is contained in each PDCCH is explained with reference to FIG. 37.

Figure 37:
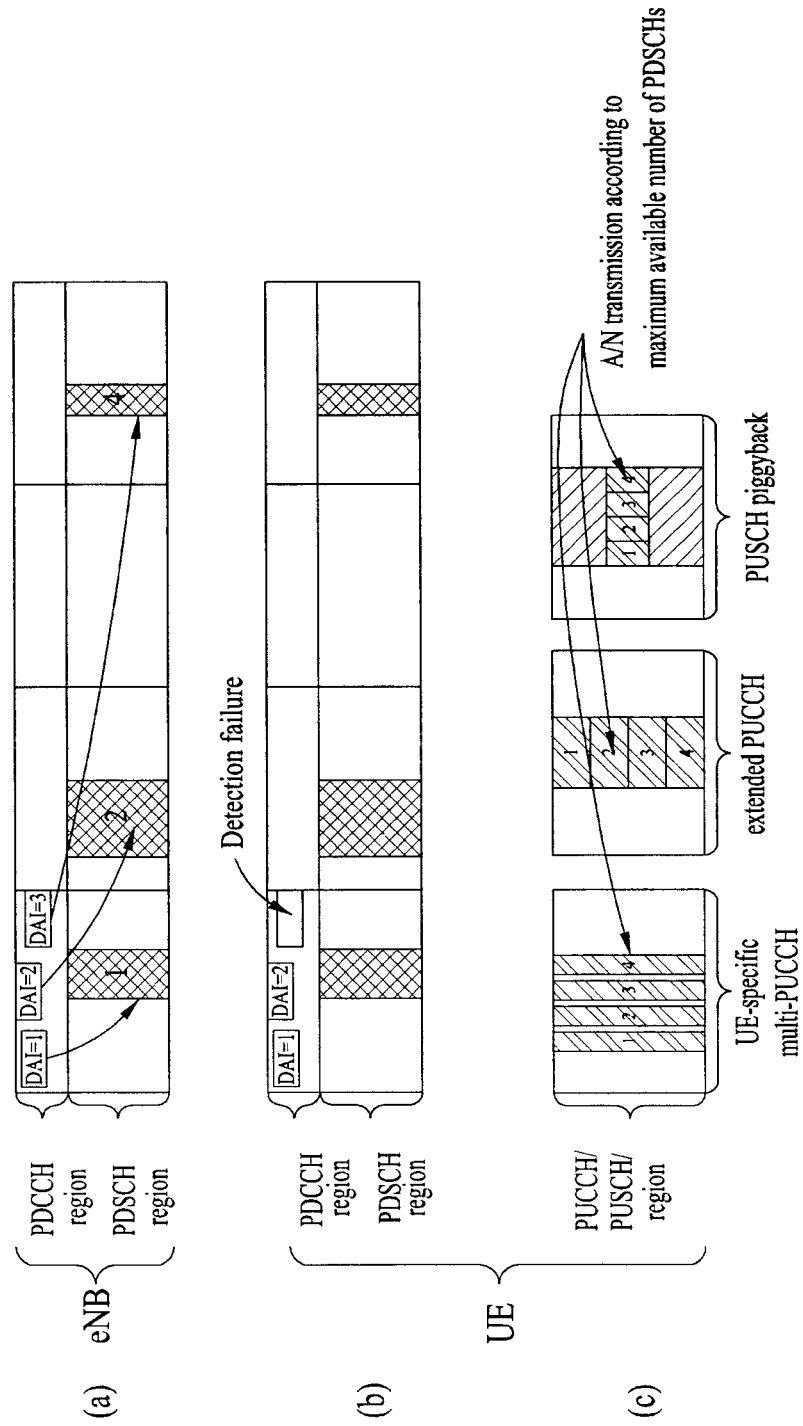
FIG. 37 is a diagram for describing a scheme of indicating PDCCH order value according to one embodiment of the present invention.

FIG. 37 is a diagram for describing a scheme of indicating PDCCH order value according to one embodiment of the present invention.

Referring to FIG. 37, when a base station transmits at least one or more PDCCHs to a random user equipment in at least one DL subframe corresponding to one UL subframe for ACK/NACK response, it may be able to inform the corresponding user equipment of an order value of the PDCCH transmitted in the corresponding subframe. For instance, referring to FIG. 37 (a), if a base station transmits 3 PDCCHs to a user equipment in one subframe, 1, 2 and 3 (or 0, 1 and 2) may be included in the PDCCHs as order values of the corresponding PDCCHs, respectively. Each of the order values may be transmitted via DAI field of PDCCH DCI format. In this case, the order of the PDCCH may be determined in accordance with a sequence of at least one or more subframes corresponding to ACK/NACK transmission in one UL subframe, an index size of CCE configuring PDCCH, a frequency sequence of CC carrying PDSCH, or an order of CIF (carrier indication field) value of CC.

For instance, if a user equipment receives PDCCH having an order value 1 and PDCCH having an order value 3 only in at least one DL subframe corresponding to one UL subframe for ACK/NACK response, the user equipment may be aware that PDCCH having an order value 2 and PDSCH corresponding to this PDCCH have been missing. In particular, unlike the aforesaid scheme, the user equipment may be aware of the order of the received PDCCH and may be then aware of an index of the PDCCH missing in the middle. Yet, referring to FIG. 37 (b), if a last PDCCH is missing, since the order values 1 and 2 of the previously received PDCCHs match an order of a received PDCCH, the user equipment may not be able to be aware that the last PDCCH has been missing. Therefore, the user equipment may not be able to be aware of a total number of PDCCHs transmitted to the corresponding user equipment by a base station.

Moreover, it may be able to consider a case that a user equipment transmits bundled ACK/NACK for all PDSCHs via PUCCH corresponding to a CCE index of a last received PDCCH. In doing so, when a base station assigns 3 PDCCHs to a user equipment, if the user equipment misses a last PDCCH, the user equipment may recognize that 2 PDSCHs scheduled by the received PDCCHs have been correctly received and may then transmit ACK/NACK information via PUCCH resource corresponding to the $2^{nd}$ PDCCH. Thereafter, the base station may be able to know that the ACK/NACK has been transmitted on the PUCCH corresponding not to the last PDCCH but to the $2^{nd}$ PDCCH and may then recognize that the user equipment has missed the last PDCCH. Meanwhile, in case that bundled ACK/NACK is transmitted not via PUCCH corresponding to CCE carrying PDCCH but via PUCCH resource allocated user-specifically, like the above example, if a user equipment transmits the bundled ACK/NACK for first 2 PDCCHs via the assigned PUCCH, it may happen that a base station may not be able to know whether the corresponding ACK/NACK is a bundle for the 2 PDSCHs or a bundle for 3 PDSCHs.

Moreover, in case that total number of transmitted PDSCHs (or the number of PDCCHs for scheduling PDSCHs) is not provided to a user equipment, it may be necessary to secure ACK/NACK resources to match the number of PDSCHs schedulable as many as possible. Referring to FIG. 37 (*c*), in case that maximum 4 PDSCHs are schedulable for example, it may be necessary to secure ACK/NACK resources for transmission on the assumption that 4 PDSCHs are always transmitted. In this case, if multiple ACKs/NACKs are fed back on PUSCH or transmitted in PUCCH format capable of transmitting the multiple ACKs/NACKs, it may be necessary to secure unnecessary resources as well in advance. Therefore, it may be unable to efficiently lower a coding rate due to the increase of ACK/NACK information bits.

In the following description, a process for a user equipment to report control information in a multi-carrier system or a carrier aggregation (CA) system is explained in detail.

First of all, according to a related art, a user equipment reports control information in consideration of a single layer for UL and a single configuration carrier. Yet, a multi-carrier system or a carrier aggregation system may need an effective method for supporting a plurality of configuration carriers.

Prior to the detailed description of this invention, ACK/NACK information reported to a base station may be described in detail as follows.

First of all, ACK/NACK information may include information on PDSCH indicated by PDCCH received by a user equipment from a base station.

Secondly, ACK/NACK information may include information on PDCCH itself indicating a release of semi-persistent scheduling (SPS). In this case, the ACK/NACK information may not include information on SPS (semi-persistent scheduling) activation. And, the ACK/NACK information on the PDCCH indicating the SPS release may exist within a primary cell (PCell) only.

Thirdly, ACK/NACK information may include information on PDSCH assigned by semi-persistent scheduling (SPS). In this case, the ACK/NACK information may exist within a primary cell (PCell) only.

Therefore, the ACK/NACK information may include one of the information on the PDCCH itself, the information on the PDSCH indicated by the PDCCH, and the information on the PDSCH assigned by the semi-persistent scheduling (SPS).

For clarity and convenience of the following description, assume that ACK/NACK information may include information on PDCCH itself, by which the ACK/NACK information may be non-limited. The ACK/NACK information may include the information on the PDSCH indicated by the PDCCH, and the information on the PDSCH assigned by the semi-persistent scheduling (SPS) and the like. And, the contents of this invention may apply to various kinds of ACK/NACK informations.

As mentioned in the foregoing description, a bundling scheme may be usable in a manner of transmitting one ACK/NACK for a plurality of PDSCHs.

In this case, the bundling scheme may include a full bundling scheme and a partial bundling scheme.

The full bundling scheme may mean a scheme of performing bundling on a plurality of subframes and a plurality of configuration carriers in a preset time domain simultaneously. In this case, the full bundling may include a spatial bundling scheme of performing bundling between codewords.

The partial bundling scheme may mean a scheme of performing bundling on either preset subframes or preset configuration carriers. In this case, bundling may be performed on a portion of either the subframes or the configuration carriers.

In particular, the partial bundling scheme may include a CC (configuration carrier) domain partial bundling scheme of performing bundling on configuration carriers per subframe only and a time domain partial bundling scheme of performing bundling on a plurality of subframes per configuration carrier only.

Besides, either the full bundling scheme or the partial bundling scheme may be set to be supported in a specific system. Both of the full bundling scheme and the partial bundling scheme may be designed to be supported by a specific system.

Figure 38:
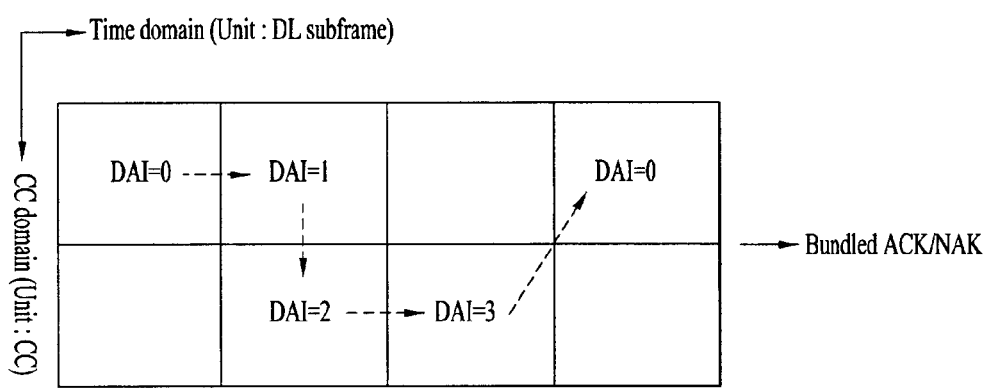
FIG. 38 is a diagram for describing a full bundling scheme according to one embodiment of the present invention.

FIG. 38 is a diagram for describing a full bundling scheme according to one embodiment of the present invention.

In FIG. 38, DAI is used as a genuine counter. In particular, a sequence for assignment of DL control channel for a specific user equipment is displayed as 2 bits and is represented as DAI value by Modular 4 operation according to Formula 3.

Referring to FIG. 38, a plurality of subframes and a plurality of configuration carriers may be bundled in time domain without being discriminated from each other.

Figure 39:
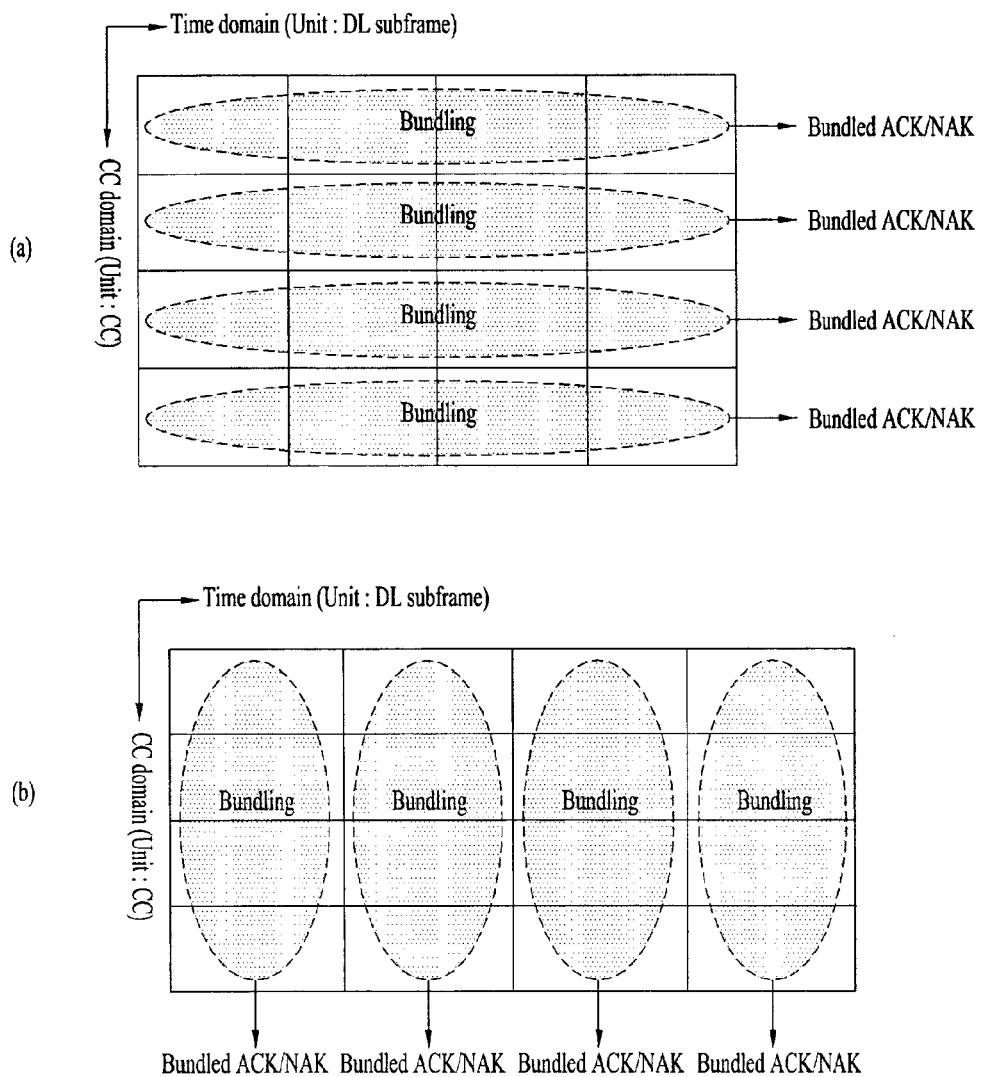
FIG. 39 is a diagram for describing a partial bundling scheme according to one embodiment of the present invention.

FIG. 39 is a diagram for describing a partial bundling scheme according to one embodiment of the present invention.

In particular, FIG. 39 (*a*) shows a time domain partial bundling scheme. Referring to FIG. 39 (*a*), bundling is performed on a plurality of subframes per configuration carrier entirely or in part.

And, FIG. 39 (*b*) shows a configuration carrier domain partial bundling scheme. Referring to FIG. 39 (*b*), bundling is performed on configuration carriers per subframe entirely or in part.

Regarding the full bundling scheme, as shown in FIG. 38, a user equipment may detect PDCCH and may be then able to know whether there is PDCCH missed by the user equipment from contiguity of DAI value.

Yet, in case that a user equipment misses a last PDCCH, it may be difficult for the user equipment to determine whether there is the PDDCH missed by the user equipment. In this case, the missing last PDCCH may indicate one PDCCH or a plurality of PDCCHs last contiguous.

Hence, the user equipment may be able to report information on the last PDCCH detected by the user equipment (e.g., DAI value of the last detected PDCCH), information on the number of PDCCHS detected by the user equipment or the number of ACK responses for the detected PDCCHs and the like to the base station as well as the bundled ACK/NACK information (in this case, DTX may be separately identified or may be handled in the same manner of NACK). Through the reported information(s), the base station may be able to know the accurate PDCCH detection status of the user equipment.

In order to discriminate the information on the last detected PDCCH, the information on the detected PDCCHs or the number of the ACK responses for the detected PDCCHs or the like from the originally bundled ACK/NACK information, it may be able to make a report in a manner of configuring two kinds of informations using separate bit or mapping them to constellation by considering the two kinds of informations complexly.

For instance, in case of reporting a last detected DAI value (in case of 2 bits) as well as the bundled ACK/NACK information, it may be able to additionally use 2 bits for the last detected DAI value as well as 1 bit for the bundled ACK/NACK information.

Moreover, in case of mapping the bundled ACK/NACK information and the last detected DAI value to the constellation complexly, it may be able to make a report using QPSK through the overlapped mapping of a specific DAI value. For example, if the bundled ACK/NACK information is NACK, it may be able to transmit (0, 0). If the bundled ACK/NACK information is ACK and the last DAI value is 0 or 3, it may be able to transmit (0, 1). If the bundled ACK/NACK information is ACK and the last DAI value is 1, it may be able to report (1, 0). If the bundled ACK/NACK information is ACK and the last DAI value is 2, it may be able to transmit (1, 1).

Yet, if so, the following problems may be caused.

First of all, when the last DIA value is 0 or 3, if assignment orders of 3 DL control channels are consecutively missing in a plurality of last PDCCHs, since overlapping information is mapped to the constellation, it may be difficult for the base station to identify this situation.

Secondly, if information is transmitted to the base station using QPSK in the above-described manner, since a minimum distance between informations becomes greater than BPSK, it may cause degradation of performance.

Thirdly, if information is transmitted to the base station using QPSK in the above-described manner, since a state of ACK/NACK does not have the same part on the constellation (e.g., 1 NACK and 3ACKs on constellation), it may cause degradation of performance.

The basic object of using the full bundling scheme is to drive transmission power of a user equipment to smaller transmission bit(s), the performance degradation through the QPSK constellation may cause a problem.

Therefore, this invention provides a method of using channel selection to enhance performance of ACK/NACK full bundling scheme by effectively supporting a plurality of configuration carriers in a mobile communication system.

Bundling mentioned in the following description may mean a logical AND operation, which is just exemplary. Alternatively, bundling may be performed by such a method as a logical OR operation and the like. Therefore, in the following description of this invention, bundling may generally mean a method for representing a plurality of ACKs/NACKs with less bits (i.e., any method for representing M-bit ACK/NACK informations as N bits (M≤N).

For clarity and convenience of the following description, although this invention is applicable to both TDD and FDD, assume a case of TDD.

Although ACK and NACK may be described by being discriminated from each other in association with control information, DTX state is mapped to NACK to apply this invention.

In applying this invention, a presence or non-presence of application of the aforesaid spatial bundling, an application sequence of the bundling and the like may non-limit this invention.

For instance, spatial bundling may be performed on a specific subframe and a specific configuration carrier (CC) in the first place and full or partial bundling may be then performed on the spatially-bundled ACK/NACK informations.

For another instance, full or partial bundling may be performed on spatially-bundled ACK/NACK informations and spatial bundling may be then performed in addition. For clarity and convenience of the following description, assume that spatial bundling is performed on a specific subframe and a specific configuration carrier (CC) in the first place.

In order to solve the above-mentioned problems, this invention may provide a method of devising performance enhancement of a full bundling scheme using channel selection. Details of this invention may be described as follows.

First of all, DAI information may be used as a genuine counter and represents an assignment order of DL control channel for a specific user equipment as 2 bits, which is just exemplary. Alternatively, DAI information may be represented in different way.

Secondly, a user equipment detects PDCCH and may then perform full bundling using DAI.

In doing so, in order to prevent a case that a last PDCCH in a subframe is missing, bundled ACK/NACK information and information on a detected last PDCCH, information on the number of detected PDCCHs or the like may be reported to a base station through channel selection. For instance, it may apply a channel selection method using 2 PUCCH resources by using 2-bit DAI value.

In particular, a user equipment may calculate full-bundled ACK/NACK information and may then calculate bits or a state transmitted using the ACK/NACK information bundled by a channel selection mapping table and the last detected DAI value.

A result value of the calculation may be transmitted as final transmission information in a predetermined transmission format through channel coding and may be then mapped by a final transmission format through channel coding (e.g., Reed-Muller coding), convolution turbo coding, etc.). In this case, the final transmission format, the channel coding scheme and the like may non-limit this invention.

Information on last detected PDCCH transmitted together with bundled ACK/NACK information may be implemented with various kinds of informations. For instance, the information on the last detected PDCCH may include total number of detected PDCCH, total ACK number of detected PDCCH, total number of missing PDCCH, and DAI value of last detected PDCCH. Moreover, if transmission of ACK/NACK information on SPS (semi-persistent scheduling) is necessary based on total number of detected PDCCH, total ACK number of detected PDCCH or total number of missing PDCCH, it may be able to use a value having an additional offset added thereto.

In order to reduce a size of a transmitted information, a modular operation with a predetermined value may be performed on the DAI value, the total number of the detected PDCCHs, the total ACK number of the detected PDCCHs, the number of the missing PDCCHs or the like. In this case, a modular operation according to Formula 3 may be applicable.

For clarity and convenience of the following description, information on last detected PDCCH transmitted together with bundled ACK/NACK information may be assumed as DAI value of the last detected PDCCH, which is just exemplary. Alternatively, as mentioned in the foregoing description, the information on the last detected PDCCH may be applicable in a manner of substituting the DAI value with the total number of the detected PDCCHs, the total number of the missing PDCCHs or the like.

Figure 40:
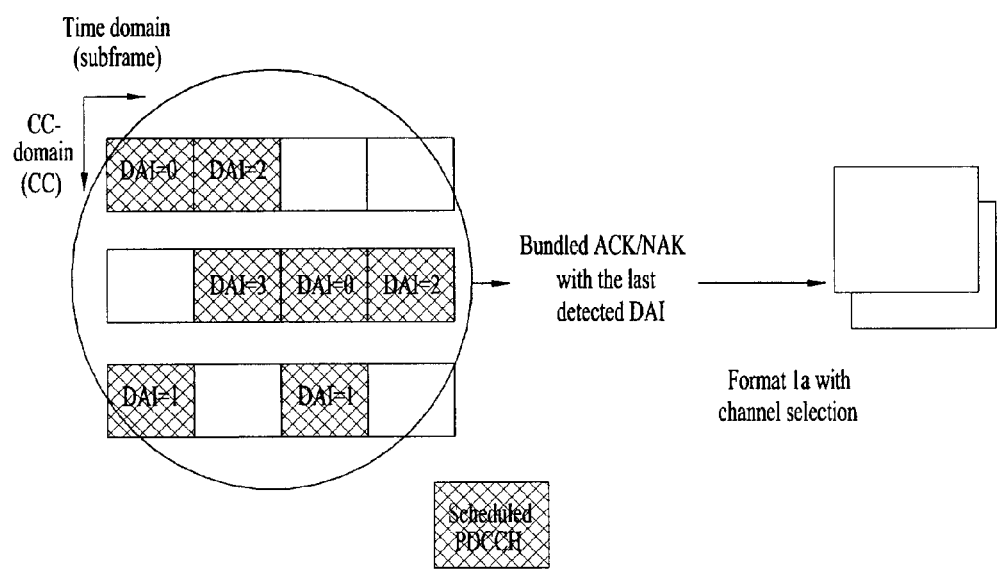
FIG. 40 is a diagram for one example of transmitting a bundled ACK/NACK information via channel selection together with a last detected DAI value according to one embodiment of the present invention.

FIG. 40 is a diagram for one example of transmitting a bundled ACK/NACK information via channel selection together with a last detected DAI value according to one embodiment of the present invention.

Referring to FIG. 40, a user equipment may perform full bundling without discriminating a plurality of preset subframes and a plurality of preset configuration carriers in a time domain.

The user equipment may then transmit bundled ACK/NACK information to a base station together with DAI value of a last detected PDCCH. In doing so, the user equipment may be able to transmit the two kinds of information to the base station using a plurality of PUCCH resources through channel selection.

In the following description, detailed embodiments of the present invention are explained.

First of all, according to one embodiment of the present invention, channel selection may be applicable using 3 PUCCH resources.

This may be described with reference to Table 15 as follows.

TABLE 15

| 1. NACK w any DAI | → | '1' in $1^{st}$ PUCCH resource |
| 2. ACK w DAI = 0 | → | '−1' in $1^{st}$ PUCCH resource |
| 3. ACK w DAI = 1 | → | '1' in $2^{nd}$ PUCCH resource |
| 4. ACK w DAI = 2 | → | '−1' in $2^{nd}$ PUCCH resource |
| 5. ACK w DAI = 3 | → | '1' in $3^{rd}$ PUCCH resource |

In Table 15, '1' or '−1' may mean a value mapped on BPSK constellation, which is just exemplary. Alternatively, the values may be interchanged, another specific value may be added, or the value may be scaled. In Table 15, 'w' is an abbreviation of 'with' and may indicate that both of bundled ACK/NACK information and DAI value of last detected PDCCH are transmitted to a base station. In Table 15, the DAI value is a genuine counter, displays a last assignment order of DL control channel for a specific user equipment using 2 bits, and is represented as a DAI value by the modular 4 operation according to Formula 3.

Referring to Table 15, in case that the bundled information is NACK information, a $1^{st}$ PUCCH resource may be used irrespective of DAI value of a last detected PDCCH and the bundled information may be mapped to '1' on BPSK constellation.

In case that the bundled information is ACK information and DAI value of a last detected PDCCH is 0, a $1^{st}$ PUCCH resource may be used and the bundled information may be mapped to '−1' on BPSK constellation.

In case that the bundled information is ACK information and DAI value of a last detected PDCCH is 1, a $2^{nd}$ PUCCH resource may be used and the bundled information may be mapped to '1' on BPSK constellation.

In case that the bundled information is ACK information and DAI value of a last detected PDCCH is 2, a $2^{nd}$ PUCCH resource may be used and the bundled information may be mapped to '−1' on BPSK constellation.

Finally, in case that the bundled information is ACK information and DAI value of a last detected PDCCH is 3, a $3^{rd}$ PUCCH resource may be used and the bundled information may be mapped to '1' on BPSK constellation.

Therefore, it may be advantageous in that problems caused by a plurality of overlapped mappings and degradation of performance may be prevented through channel selection.

According to another embodiment of the present invention, ACK information and NACK information may be discriminated from each other by being contained in different resources instead of being discriminated from each other on constellation.

In particular, according to the former embodiment of the present invention described with reference to Table 15, NACK information state and ACK information state exist within $1^{st}$ PUCCH resource. In this case, if the NACK information and the ACK information are contained in different resources, respectively, a minimum distance may be elongated more. Hence, it may be able to devise enhancement of performance. In Table 16, channel selection is applied in a manner of preventing ACK information and NACK information are not arranged within the same resource.

TABLE 16

| 1. NACK w any DAI | → | '1' in $1^{st}$ PUCCH resource |
| 2. ACK w DAI = 0 | → | '1' in $2^{nd}$ PUCCH resource |
| 3. ACK w DAI = 1 | → | '−1' in $2^{nd}$ PUCCH resource |
| 4. ACK w DAI = 2 | → | '1' in $3^{rd}$ PUCCH resource |
| 5. ACK w DAI = 3 | → | '−1' in $3^{rd}$ PUCCH resource |

In Table 16, channel selection may be applied using 3 PUCCH resources. The former assumption in Table 15 may be identically applicable to Table 16.

Referring to Table 16, in case that the bundled information is NACK information, a $1^{st}$ PUCCH resource may be used irrespective of DAI value of a last detected PDCCH and the bundled information may be mapped to '1' on BPSK constellation.

In case that the bundled information is ACK information and DAI value of a last detected PDCCH is 0, unlike Table 15, a $2^{nd}$ PUCCH resource may be used and the bundled information may be mapped to '−1' on BPSK constellation.

In case that the bundled information is ACK information and DAI value of a last detected PDCCH is 1, a $2^{nd}$ PUCCH resource may be used and the bundled information may be mapped to '−1' on BPSK constellation.

In case that the bundled information is ACK information and DAI value of a last detected PDCCH is 2, a $3^{rd}$ PUCCH resource may be used and the bundled information may be mapped to '1' on BPSK constellation.

Finally, in case that the bundled information is ACK information and DAI value of a last detected PDCCH is 3, a $3^{rd}$ PUCCH resource may be used and the bundled information may be mapped to '−1' on BPSK constellation.

Therefore, it may be advantageous in that problems caused by a plurality of overlapped mappings may be prevented through channel selection. Moreover, since the ACK information and the NACK information are discriminated from each other resources, the effects of the present invention may be enhanced.

According to another embodiment of the present invention, in order to reduce overhead of physical resource, a channel selection method may be applicable in a manner that overlapping is allowed more or less. In particular, according to the former embodiments of the present invention described with reference to Table 15 and Table 16, the methods for discriminating all the last detected DAI values from each other accurately are applied.

In this case, if a channel selection method is applied in a manner of allowing overlapping for a specific DAI value in consideration of overhead of physical resource, it may be able to reduce the number of channels in use.

For instance, a case, in which bundled information is ACK information and DAI value of a last detected PDCCH is 0, and a case, in which bundled information is ACK information and DAI value of a last detected DAI value is 3, may be mapped in a manner of overlapping with each other. In this case, although a base station may not be able to discriminate the overlapped mapping, since a space in-between is considerable, it is less probable that the base station recognizes it by being confused.

Moreover, if TDD system is taken into consideration, since the number of UL subframes is limited, it may be further less probable that the problem is caused. Therefore, it is more important for TDD to reduce the number of transmission bits by applying a channel selection method in a manner f allowing overlapping for a specific DAI value.

Table 17 shows one example of applying a channel selection method in a manner of allowing overlapping for a specific DAI value.

TABLE 17

| 1. NACK w any DAI | → | '1' in $1^{st}$ PUCCH resource |
| 2. ACK w DAI = 0 or 3 | → | '−1' in $1^{st}$ PUCCH resource |
| 3. ACK w DAI = 1 | → | '1' in $2^{nd}$ PUCCH resource |
| 4. ACK w DAI = 2 | → | '−1' in $2^{nd}$ PUCCH resource |

In Table 17, channel selection may be applied using 2 PUCCH resources. The former assumption in Table 15 may be identically applicable to Table 17.

Referring to Table 17, in case that the bundled information is NACK information, a $1^{st}$ PUCCH resource may be used irrespective of DAI value of a last detected PDCCH and the bundled information may be mapped to '1' on BPSK constellation.

In case that the bundled information is ACK information and DAI value of a last detected PDCCH is 0 or 3, a $1^{st}$ PUCCH resource may be used and the bundled information may be mapped to '−1' on BPSK constellation.

In case that the bundled information is ACK information and DAI value of a last detected PDCCH is 1, a $2^{nd}$ PUCCH resource may be used and the bundled information may be mapped to '1' on BPSK constellation.

Finally, in case that the bundled information is ACK information and DAI value of a last detected PDCCH is 2, a $2^{nd}$ PUCCH resource may be used and the bundled information may be mapped to '−1' on BPSK constellation.

Therefore, it may be advantageous in that overhead of physical resource may be reduced using the less number of PUCCH resources by applying a channel selection method in a manner of allowing overlapping for a specific DAU value.

According to the embodiments described with reference to Tables 15 to 17, NACK information is assumed as mapped to the $1^{st}$ PUCCH resource.

Yet, if NACK information includes DTX information or PUCCH resource is induced from a location (e.g., CCE index, etc.) of PDCCH, it may happen that a location of a $1^{st}$ PUCCH resource is unknown. To prepare for this case, according to another embodiment of the present invention, a method of mapping NACK information not to a $1^{st}$ PUCCH resource but to another PUCCH resource may be applicable. For instance, NACK information may be mapped to a $2^{nd}$ resource. This may be described with reference to FIG. 18 as follows.

TABLE 18

| 1. ACK w DAI = 0 or 3 | → | '1' in $1^{st}$ PUCCH resource |
| 2. ACK w DAI = 1 | → | '−1' in $1^{st}$ PUCCH resource |
| 3. ACK w DAI = 2 | → | '1' in $2^{nd}$ PUCCH resource |
| 4. NACK w any DAI | → | '−1' in $2^{nd}$ PUCCH resource |

In Table 18, channel selection may be applied using 2 PUCCH resources and NACK information may be mapped to a $2^{nd}$ resource. The former assumption in Table 15 may be identically applicable to Table 18 as well.

Referring to Table 18, in case that the bundled information is ACK information and DAI value of a last detected PDCCH is 0 or 3, a $1^{st}$ PUCCH resource may be used and the bundled information may be mapped to '1' on BPSK constellation.

In case that the bundled information is ACK information and DAI value of a last detected PDCCH is 1, a $1^{st}$ PUCCH resource may be used and the bundled information may be mapped to '−1' on BPSK constellation.

In case that the bundled information is ACK information and DAI value of a last detected PDCCH is 2, a $2^{nd}$ PUCCH resource may be used and the bundled information may be mapped to '1' on BPSK constellation.

Finally, in case that the bundled information is NACK information, irrespective of DAI value of a last detected PDCCH, a $2^{nd}$ PUCCH resource may be used and the bundled information may be mapped to '1' on BPSK constellation.

Therefore, it may be able to prevent degradation of performance by mapping NACK information not to a $1^{st}$ PUCCH resource but to another PUCCH resource.

According to the embodiments of the present invention described with reference to Tables 15 to 18, examples of using BPSK constellation are explained.

Yet, a method of using a portion of QPSK constellation may be applicable only to a special case according to another embodiment of the present invention.

For instance, ACK informations having different DAI values in specific PUCCH resource may be discriminated or identified using a portion of QPSK constellation.

In particular, compared to ACK-to-NACK error or NACK-to-ACK error, error between ACK informations having different DAI values have relatively low significance. Hence, between ACK informations having different DAIs in the same channel may be able to use a whole part or a portion of QPSK constellation. Through this, it may be able to use channel selection without mapping DAI value redundantly.

This is shown in Table 19.

TABLE 19

| 1. ACK w DAI = 0 | → | '1' in $1^{st}$ PUCCH resource |
| 2. ACK w DAI = 1 | → | 'j' in $1^{st}$ PUCCH resource |
| 3. ACK w DAI = 2 | → | '−1' in $1^{st}$ PUCCH resource |
| 4. ACK w DAI = 3 | → | '1' in $2^{nd}$ PUCCH resource |
| 5. NACK w any DAI | → | '−1' in $2^{nd}$ PUCCH resource |

In Table 19, channel selection may be applied using 2 PUCCH resources. The 'j' meaning QPSK constellation value may be used for clarity and convenience of the following description and '−j' may be usable instead. The former assumption in Table 15 may be identically applicable to Table 18 as well.

Referring to Table 19, in case that the bundled information is ACK information and DAI value of a last detected PDCCH is 0, a $1^{st}$ PUCCH resource may be used and the bundled information may be mapped to '1'.

In case that the bundled information is ACK information and DAI value of a last detected PDCCH is 1, a $1^{st}$ PUCCH resource may be used and the bundled information may be mapped to 'j' on QPSK constellation.

In case that the bundled information is ACK information and DAI value of a last detected PDCCH is 2, a $1^{st}$ PUCCH resource may be used and the bundled information may be mapped to '1'

In case that the bundled information is ACK information and DAI value of a last detected PDCCH is 3, a $2^{nd}$ PUCCH resource may be used and the bundled information may be mapped to '1'

Finally, in case that the bundled information is NACK information, irrespective of DAI value of a last detected PDCCH, a $2^{nd}$ PUCCH resource may be used and the bundled information may be mapped to '−1'.

Therefore, it may be advantageous in preventing the problems due to a plurality of overlapped mappings through the channel selection method having QPSK constellation value applied thereto. And, it may be advantageous in preventing degradation of performance as well.

Meanwhile, the mapping sequence shown in Table 1 is just exemplary. And, the mapping sequence may be reversely usable. This is shown in Table 20 and Table 21.

TABLE 20

| 1. NACK w any DAI | → | '1' in $1^{st}$ PUCCH resource |
| 2. ACK w DAI = 0 | → | '−1' in $1^{st}$ PUCCH resource |
| 3. ACK w DAI = 1 | → | '1' in $2^{nd}$ PUCCH resource |
| 4. ACK w DAI = 2 | → | 'j' in $2^{nd}$ PUCCH resource |
| 5. ACK w DAI = 3 | → | '−1' in $2^{nd}$ PUCCH resource |

Referring to Table 20, in case that the bundled information is NACK information, irrespective of DAI value of a last detected PDCCH, a $1^{st}$ PUCCH resource may be used and the bundled information may be mapped to '1'.

In case that the bundled information is ACK information and DAI value of a last detected PDCCH is 0, a $1^{st}$ PUCCH resource may be used and the bundled information may be mapped to '−1'.

In case that the bundled information is ACK information and DAI value of a last detected PDCCH is 1, a $2^{nd}$ PUCCH resource may be used and the bundled information may be mapped to '1'

In case that the bundled information is ACK information and DAI value of a last detected PDCCH is 2, a $2^{nd}$ PUCCH resource may be used and the bundled information may be mapped to 'j' on QPSK constellation.

In case that the bundled information is ACK information and DAI value of a last detected PDCCH is 3, a $2^{nd}$ PUCCH resource may be used and the bundled information may be mapped to '−1'.

TABLE 21

| 1. NACK w any DAI | → | '1' in $1^{st}$ PUCCH resource |
| 2. ACK w DAI = 0 | → | '−1' in $1^{st}$ PUCCH resource |
| 3. ACK w DAI = 1 | → | '1' in $2^{nd}$ PUCCH resource |
| 4. ACK w DAI = 2 | → | 'j' in $2^{nd}$ PUCCH resource |
| 5. ACK w DAI = 3 | → | '−1' in $2^{nd}$ PUCCH resource |

Referring to Table 21, in case that the bundled information is NACK information, irrespective of DAI value of a last detected PDCCH, a $1^{st}$ PUCCH resource may be used and the bundled information may be mapped to '1'.

In case that the bundled information is ACK information and DAI value of a last detected PDCCH is 3, a $1^{st}$ PUCCH resource may be used and the bundled information may be mapped to '−1'.

In case that the bundled information is ACK information and DAI value of a last detected PDCCH is 2, a $2^{nd}$ PUCCH resource may be used and the bundled information may be mapped to '1'

In case that the bundled information is ACK information and DAI value of a last detected PDCCH is 2, a $2^{nd}$ PUCCH resource may be used and the bundled information may be mapped to 'j' on QPSK constellation.

In case that the bundled information is ACK information and DAI value of a last detected PDCCH is 0, a $2^{nd}$ PUCCH resource may be used and the bundled information may be mapped to '−1'.

According to another embodiment of the present invention, ACK information and NACK information may be configured in a manner of being completely separated on each other on PUCCH resource to minimize ACK-to-NACK error and NACK-to-ACK error.

Based on the former embodiment described with reference to Table 19, one example of applying a channel selection method by separating ACK information and NACK information from each other on PUCCH resource is described with reference to Table 22 as follows.

TABLE 22

| 1. ACK w DAI = 0 | → | '1' in $1^{st}$ PUCCH resource |
| 2. ACK w DAI = 1 | → | 'j' in $1^{st}$ PUCCH resource |
| 3. ACK w DAI = 2 | → | '−1' in $1^{st}$ PUCCH resource |
| 4. ACK w DAI = 3 | → | '−j' in $1^{st}$ PUCCH resource |
| 5. NACK w any DAI | → | '1' in $2^{nd}$ PUCCH resource |

Referring to Table 22, in case that the bundled information is ACK information and DAI value of a last detected PDCCH is 0, a $1^{st}$ PUCCH resource may be used and the bundled information may be mapped to '1'.

In case that the bundled information is ACK information and DAI value of a last detected PDCCH is 1, a $1^{st}$ PUCCH resource may be used and the bundled information may be mapped to 'j' on QPSK constellation.

In case that the bundled information is ACK information and DAI value of a last detected PDCCH is 2, a $1^{st}$ PUCCH resource may be used and the bundled information may be mapped to '−1'

In case that the bundled information is ACK information and DAI value of a last detected PDCCH is 3, a $1^{st}$ PUCCH resource may be used and the bundled information may be mapped to '−j' on QPSK constellation.

Finally, in case that the bundled information is NACK information, irrespective of DAI value of a last detected PDCCH, a $2^{nd}$ PUCCH resource may be used and the bundled information may be mapped to '−1'.

Therefore, it may be advantageous in preventing the problems due to a plurality of overlapped mappings through the channel selection method having QPSK constellation value applied thereto in a manner of separating ACK information and NACK information from each other on PUCCH resource. And, it may be advantageous in preventing degradation of performance as well.

According to the above-mentioned embodiment of the present invention, since the DAI value of PDCCH starts with 0, if the bundled information is ACK, the DAI value of the last detected PDCCH may become a value resulting from subtracting 1 from a value of applying a modular function 4 to an ACK counter. Moreover, in case that the bundled information is NACK, the ACK counter may be set to 0 (zero).

Therefore, a designing method including the steps of mapping NACK state in a manner of setting an ACK counter to 0 and transmitting the ACK counter may have the same result of the above-described contents of the present invention.

In this case, the ACK counter may mean a constellation point except NACK state among a plurality of constellations including channel selection and may have a modular operation applied thereto.

For instance, in case of using BPSK constellation and 2 PUCCH resources, it may be possible to assign one state for NACK information among 4 constellation points and the rest of 3 states may be then applied to ACK counter using a modular function 3. This is shown in Table 23.

TABLE 23

| 1. ACK-counter modular 3 == 0 | → | '1' in $1^{st}$ PUCCH resource |
| 2. ACK-counter modular 3 == 1 | → | '−1' in $1^{st}$ PUCCH resource |
| 3. ACK-counter modular 3 == 2 | → | '1' in $2^{nd}$ PUCCH resource |
| 4. NACK w any DAI | → | '−1' in $2^{nd}$ PUCCH resource |

Referring to Table 23, in case that a value resulting from applying a modular function 3 to a calculated ACK counter value is 0, a $1^{st}$ PUCCH resource may be used and the corresponding value may be mapped to 1.

In case that a value resulting from applying a modular function 3 to a calculated ACK counter value is 1, a $1^{st}$ PUCCH resource may be used and the corresponding value may be mapped to −1.

In case that a value resulting from applying a modular function 3 to a calculated ACK counter value is 2, a $2^{nd}$ PUCCH resource may be used and the corresponding value may be mapped to 1.

Finally, in case that information is NACK, a $2^{nd}$ PUCCH resource may be used and the corresponding value may be mapped to −1.

Yet, the '1' or '−1', which is the mapped BPSK constellation value in Table 23, is an exemplary value for clarity and convenience of the following description. This value may be interchanged or may be added or scaled by a specific value.

As mentioned in the foregoing description, the present invention relates to a method of applying full bundling through channel selection using BPSK constellation.

Yet, it may be unnecessary to design the method to use BPSK constellation in all cases. And, this method may be designed to include channel selection using BPSK constellation. In particular, it may be able to design the present invention to use QPSK constellation if necessary.

For instance, the present invention may design a method of channel selection using QPSK constellation in case that PDCCH containing a plurality of codewords are received.

In particular, in case that PDCCH containing a plurality of codewords are received. Full bundling may be performed per codeword. And, the full-bundled information and DAI value of a last detected PDCCH may be transmitted to a base station using a channel selection scheme using QPSK constellation. In doing so, if PDCCH including one codeword is received, a plurality of codewords are may be regarded as included in accordance with a predetermined rule but information of the added codeword may be handled as NACK information.

Thus, one example related to a method using QPSK constellation may be shown in Table 24.

TABLE 24

| 1. ACK/ACK w DAI = 0 or 3 | → | '00' in $1^{st}$ PUCCH resource |
| 2. ACK/ACK w DAI = 1 | → | '01' in $1^{st}$ PUCCH resource |
| 3. ACK/ACK w DAI = 2 | → | '10' in $1^{st}$ PUCCH resource |
| 4. ACK/NACK w DAI = 0 or 2 | → | '11' in $1^{st}$ PUCCH resource |
| 5. ACK/NACK w DAI = 1 or 3 | → | '00' in $2^{nd}$ PUCCH resource |
| 6. ACK/ACK w DAI = 0 or 2 | → | '01' in $2^{nd}$ PUCCH resource |
| 7. ACK/ACK w DAI = 1 or 3 | → | '10' in $2^{nd}$ PUCCH resource |
| 8. ACK/NACK w any DAI | → | '11' in $2^{nd}$ PUCCH resource |

In Table 24, "00", "01", "10" or "11" may mean a value mapped on QPSK constellation, which is just exemplary. Alternatively, values may be interchanged or another specific value may be added or scaled. In Table 24, 'w' is an abbreviation of 'with' and may indicate that both of bundled ACK/NACK information and DAI value of last detected PDCCH are transmitted to a base station. In Table 24, the DAI value is a genuine counter, displays a last assignment order of DL control channel for a specific user equipment using 2 bits, and is represented as a DAI value by the modular 4 operation according to Formula 3.

Referring to Table 24, in case that the bundled information per codeword is ACK/NACK information and DAI value of a last detected PDCCH is 0 or 3, a $1^{st}$ PUCCH resource may be used and the bundled information may be mapped to '00' on QPSK constellation.

In case that the bundled information per codeword is ACK/NACK information and DAI value of a last detected PDCCH is 1, a $1^{st}$ PUCCH resource may be used and the bundled information may be mapped to '01' on QPSK constellation.

In case that the bundled information per codeword is ACK/NACK information and DAI value of a last detected PDCCH is 2, a $1^{st}$ PUCCH resource may be used and the bundled information may be mapped to '1o' on QPSK constellation.

In case that the bundled information per codeword is ACK/NACK information and DAI value of a last detected PDCCH is 0 or 2, a $1^{st}$ PUCCH resource may be used and the bundled information may be mapped to '11' on QPSK constellation.

In case that the bundled information per codeword is ACK/NACK information and DAI value of a last detected PDCCH is 1 or 3, a $2^{nd}$ PUCCH resource may be used and the bundled information may be mapped to '00' on QPSK constellation.

In case that the bundled information per codeword is ACK/NACK information and DAI value of a last detected PDCCH is 0 or 2, a $2^{nd}$ PUCCH resource may be used and the bundled information may be mapped to '01' on QPSK constellation.

In case that the bundled information per codeword is ACK/NACK information and DAI value of a last detected PDCCH is 1 or 3, a $2^{nd}$ PUCCH resource may be used and the bundled information may be mapped to '10' on QPSK constellation.

Finally, in case that the bundled information per codeword is ACK/NACK information, a $2^{nd}$ PUCCH resource may be used irrespective of DAI value of a last detected PDCCH and the bundled information may be mapped to '11' on QPSK constellation.

Yet, the contents of this invention are described as applied to a plurality of PDCCHs included in a plurality of configuration carriers, by which the present invention may be non-limited. In TDD, the present invention may be applicable to PDCCH within at least one DL subframe. IN particular, it may be apparent to those skilled in the art that the contents of the present invention are applicable to a method of bundling and transmitting ACK/NACK information on PDCCH in at least one DL subframe including a plurality of configuration carriers to a base station. And, the DL subframe corresponding to a unit of applying bundling may be named a bundling window (=M).

Meanwhile, referring now to FIG. 30, the partial bundling scheme of supporting a plurality of configuration carriers in a multi-carrier or carrier aggregation system may be described in detail as follows.

As mentioned in the foregoing description, the partial bundling scheme may include a scheme of performing bundling on either subframes or configuration carriers. And, bundling may be performed on a portion of either subframes or configuration carriers. The partial bundling scheme may include a time domain partial bundling scheme of performing bundling on configuration carriers only per subframe shown in FIG. 39 (a) and a configuration carrier (CC) domain bundling scheme of performing bundling on a plurality of subframes only per configuration carrier shown in FIG. 39 (b).

In the following description, a configuration carrier (CC) domain bundling scheme and a time domain partial bundling scheme may be explained in detail with reference to FIG. 41.

Figure 41:
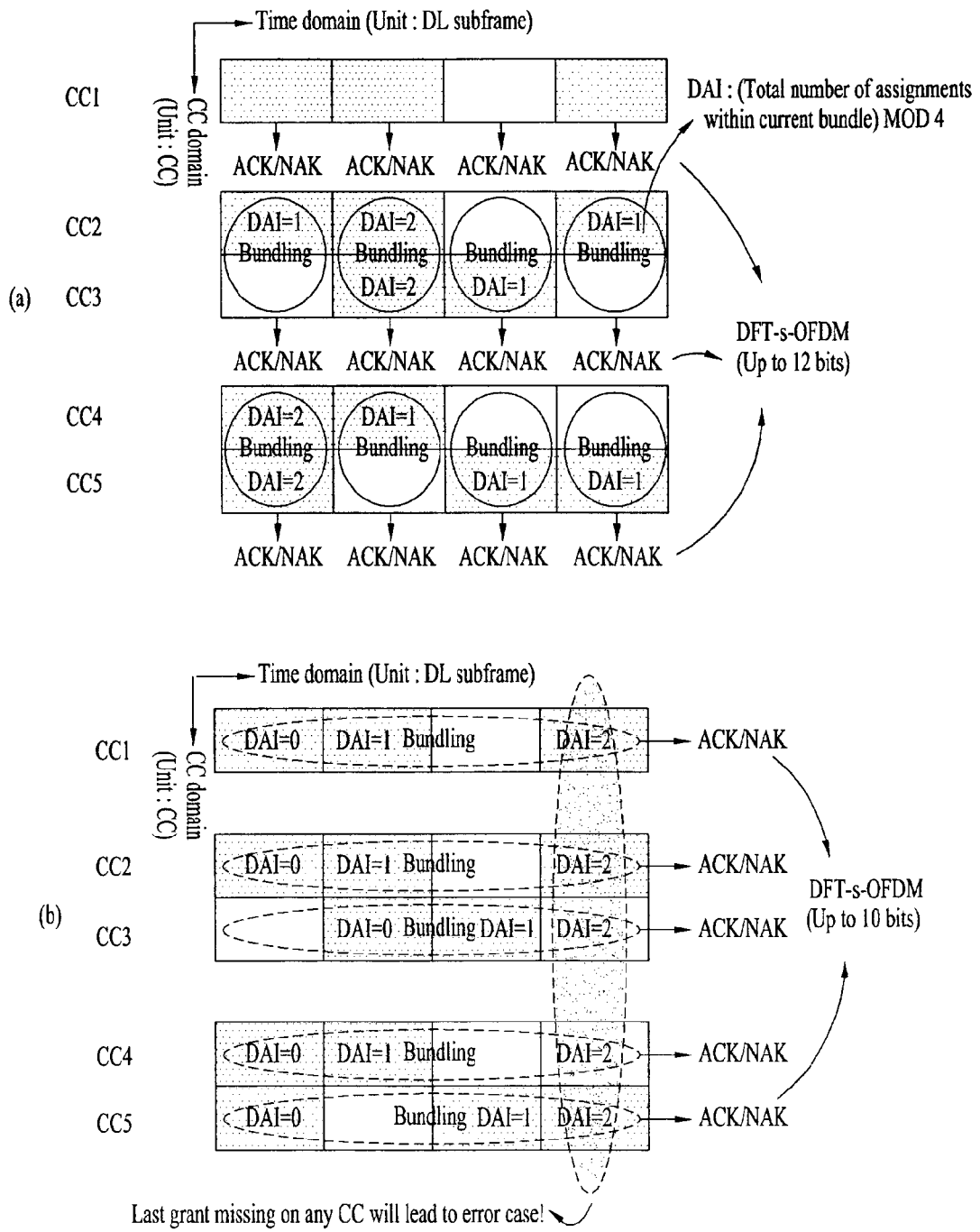
FIG. 41 is a diagram of a configuration carrier domain bundling scheme and a time-domain partial bundling scheme according to one embodiment of the present invention.

FIG. 41 is a diagram of a configuration carrier domain bundling scheme and a time domain partial bundling scheme according to one embodiment of the present invention.

In FIG. 41, assume that each of 5 configuration carriers corresponding to one UL subframe for ACK/NACK response may have 4 subframes.

FIG. 41 (a) shows a configuration carrier (CC) domain bundling scheme.

Referring to FIG. 41 (a), a DAI value may indicate the total number of PDCCHs assigned to a specific user equipment by including preset configuration carriers in each subframe. In particular, in a $2^{nd}$ configuration carrier and a $3^{rd}$ configuration carrier, the DAI value may indicate the total number of PDCCHs assigned to a user equipment within a configuration carrier group of the $2^{nd}$ and $3^{rd}$ configuration carriers. And, in a $4^{th}$ configuration carrier and a $5^{th}$ configuration carrier, the DAI value may indicate the total number of PDCCHs assigned to a user equipment within a configuration carrier group of the $4^{th}$ and $5^{th}$ configuration carriers.

In FIG. 41 (a), a partial bundling scheme may be applied to a partial region of a configuration carrier in each subframe. Bundling may not be applied to a 1$^{st}$ configuration carrier, partial bundling may be applied between a 2$^{nd}$ configuration carrier and a 3$^{rd}$ configuration carrier, and partial bundling may be applied between a 4$^{th}$ configuration carrier and a 5$^{th}$ configuration carrier, whereby a final bundled ACK/NACK information may be generated. In dong so, a user equipment may be able to determine whether missing PDCCH information exists in a plurality of subframes and a plurality of configuration carriers using the DAI information.

FIG. 41 (b) shows a time domain partial bundling scheme.

Referring to FIG. 41 (b), DAI may be used as a genuine counter per configuration carrier. In particular, an assignment order of DL control for a specific user equipment may be displayed using 2 bits and may be represented as a DAI value by a modular 4 operation according to Formula 3.

In FIG. 41 (b), a partial bundling scheme may be applied to a whole or partial region of a subframe in each configuration carrier. In this case, like FIG. 41 (a), if DAI value in PDCCH detected per configuration carrier is not contiguous, a user equipment may be aware that there is missing PDCCH.

Yet, in case of the time domain partial bundling scheme, it may cause a problem that a last PDCCH is missed per configuration carrier.

In particular, referring to FIG. 41 (b), if a user equipment misses last PDCCHs of 1$^{st}$ to 5$^{th}$ configuration carriers, it may cause a problem that the user equipment has difficulty in determining whether the PDCCH missed by itself exists.

Therefore, when a time domain partial bundling scheme is performed on each configuration carrier, the demand for a method to prevent an increment of a transmission bit number by solving the problem of missing last PDCCHs is rising.

In order to maintain a small bit number without incrementing a transmission bit number by solving the problem of missing last PDCCHs in a time domain partial bundling, the present invention may propose a method of transmitting a function associated with information (e.g., DAI value of a last detected PDCCH, the number of detected PDCCHs, total ACK number for detected PDCCHs, etc.) on a last PDCCH detected by a user equipment as well as bundled ACK/NACK information (in this case, DTX may be separately identifiable and may be identically handled as NACK).

In the following description, partial bundling may mean a logical AN operation, which may be just exemplary. Alternatively, the partial bundling may be performed by such a method as a logical OR operation and the like. In particular, in the following description of the present invention, partial bundling may generally mean a method for representing a plurality of ACKs/NACKs as a small bit number (i.e., any method for representing M-bit ACK/NACK informations as N bits, where M≥N).

For clarity and convenience of the following description, although the present invention may be applicable to both of TDD and FDD, assume a case of TDD.

Although ACK and NACK may be described by being discriminated from each other in association with control information, DTX state is mapped to NACK to apply this invention.

For clarity and convenience, as mentioned in the foregoing description, Assume that ACK/NACK information may include information on PDCCH itself, by which the ACK/NACK information may be non-limited. The ACK/NACK information may include information on PDSCH indicated by the PDCCH, information on PDSCH assigned by semi-persistent scheduling (SPS) and the like. And, contents of the present invention may be applicable to various kinds of ACK/NACK informations.

In applying this invention, a presence or non-presence of application of the aforesaid spatial bundling, an application sequence of the bundling and the like may non-limit this invention.

For instance, spatial bundling may be performed on a specific subframe and a specific configuration carrier (CC) in the first place and full or partial bundling may be then performed on the spatially-bundled ACK/NACK informations.

For another instance, full or partial bundling may be performed on spatially-bundled ACK/NACK informations and spatial bundling may be then performed in addition. For clarity and convenience of the following description, assume that spatial bundling is performed on a specific subframe and a specific configuration carrier (CC) in the first place.

Information on a last detected PDCCH transmitted together with partially bundled ACK/NACK information may be implemented with various kinds of information. For instance, the information on the last detected PDCCH may include total number of detected PDCCH, total ACK number of detected PDCCH, total number of missing PDCCH, and DAI value of last detected PDCCH.

In order to reduce a size of a transmitted information, a modular operation with a predetermined value may be performed on the DAI value, the total number of the detected PDCCHs, the total ACK number of the detected PDCCHs, the number of the missing PDCCHs or the like. In this case, a modular operation according to Formula 3 may be applicable.

For clarity and convenience of the following description, information on last detected PDCCH transmitted together with partially bundled ACK/NACK information may be assumed as DAI value of the last detected PDCCH, which is just exemplary. Alternatively, as mentioned in the foregoing description, the information on the last detected PDCCH may be applicable in a manner of substituting the DAI value with the total number of the detected PDCCHs, the total ACK number for the detected PDCCHs, the total number of the missing PDCCHs or the like.

For clarity and convenience of the following description, assume a transmission format including partially bundled ACK/NACK information and information of a last detected PDCCH may include DFT-s-OFDM, by which the present invention may be non-limited.

Details of the present invention may be described with reference to FIG. 42 as follows. In this case, DAI may be used as a genuine counter per configuration carrier.

Figure 42:
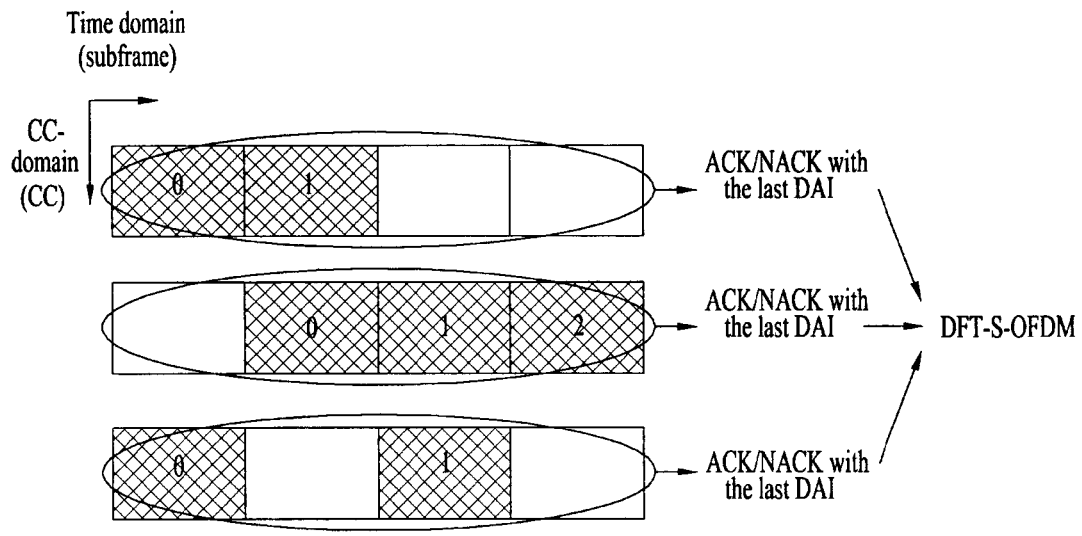
FIG. 42 is a diagram for describing a method of transmitting a partially-bundled ACK/NACK information per configuration carrier together with a last detected DAI value according to one embodiment of the present invention.

FIG. 42 is a diagram for describing a method of transmitting a partially-bundled ACK/NACK information per configuration carrier together with a last detected DAI value according to one embodiment of the present invention.

Referring to FIG. 42, a user equipment may perform time domain partial bundling per configuration carrier.

Thereafter, the user equipment may transmit the ACK/NACK information bundled per configuration carrier and DAI value of a last detected PDCCH to a base station.

In doing so, information on the DAI value of the last detected PDCCH may include separate bit(s) (e.g., the bundled ACK/NACK information includes 1 bit and the DAI value of the last detected PDCCH includes 2 bits.) discriminated from the bundled ACK/NACK information.

Yet, in order to reduce the total transmission bit number of all configuration carriers or the transmission bit number per configuration carrier, the DAI value information may be preferably configured in a manner of being combined with the bundled ACK/NACK information.

For example of this combination, a separate mapping table may be configured for the combination of the bundled ACK/NACK information and the DAI value information of the last detected PDCCH or the combination may be mapped on such a constellation as QPSK.

In particular, the user equipment ma calculate the bundled ACK/NACK information per configuration carrier and may calculate bits to transmit or a state using the bundled ACK/NACK information and the DAI value information of the last detected PDCCH in accordance with a mapping rule.

Result values for the configuration carriers may be combined together as final transmission information, may then undergo channel coding, and may be then transmitted to the base station in DFT-S-OFDM format that is a predetermined transmission format as shown in FIG. 42. Yet, a final transmission format may be non-limited by the DFT-S-OFDM format.

In this case, the result values for the configuration carriers may be combined in order of logical CC indexes or may be combined by granting priority to P-cell (primary cell). Moreover, it may be possible to change the combination orders by performing interleaving in the combining process. Thereafter, the corresponding combination may be mapped to the final transmission format through channel coding (e.g., Reed-Muller coding, convolutional turbo coding, etc.).

In the following description, detailed embodiments of the present invention may be explained on the assumption that the combination of the ACK/NACK information bundled for each configuration carrier and the DAI value information of the last detected PDCCH may include 2-bit state.

And, assume that DAI may be a genuine counter and may represent an assignment order of DL control channel for a specific user equipment using 2 bits.

First of all, the combination of the ACK/NACK information bundled for each configuration carrier and the DAI value information of the last detected PDCCH may be configured as shown in Table 25.

TABLE 25

| | | |
|---|---|---|
| 1. NACK w any DAI | → | '00' |
| 2. ACK w DAI = 0 or 3 | → | '01' |
| 3. ACK w DAI = 1 | → | '10' |
| 4. ACK w DAI = 2 | → | '11' |

Referring to Table 25, if bundled information in a $1^{st}$ configuration carrier is NACK information, it may have a 2-bit state of '00' irrespective of a DAI value of a last detected PDCCH.

If bundled information in a $2^{nd}$ configuration carrier is ACK information and a DAI value of a last detected PDCCH is 0 or 3, it may have a 2-bit state of '01'.

If bundled information in a $3^{rd}$ configuration carrier is ACK information and a DAI value of a last detected PDCCH is 1, it may have a 2-bit state of '10'.

Finally, if bundled information in a $4^{th}$ configuration carrier is ACK information and a DAI value of a last detected PDCCH is 2, it may have a 2-bit state of '11'.

Thereafter, a user equipment may finally combine the above informations together in accordance with DFT-S-OFDM format and may then transmit the corresponding combination to a base station.

In the above-described embodiment, if the bundled information is ACK information and the DAI value of the last detected PDCCH is 0 or 3, the base station may not be able to identify the overlapped mappings. Yet, since a space in-between is considerably large, it may be less probable that the base station is confused to recognize them.

When TDD system is taken into consideration, since the number of UL subframes is limited, it may be less probable that a problem is caused. Thus, it may be more important for TDD to reduce the transmission bit number by applying a channel selection scheme in a manner of allowing overlapping for a specific DAI value.

Therefore, it may be advantageous in that the problem of the missing last PDCCHs can be solved without incrementing the transmission bit number.

Figure 43:
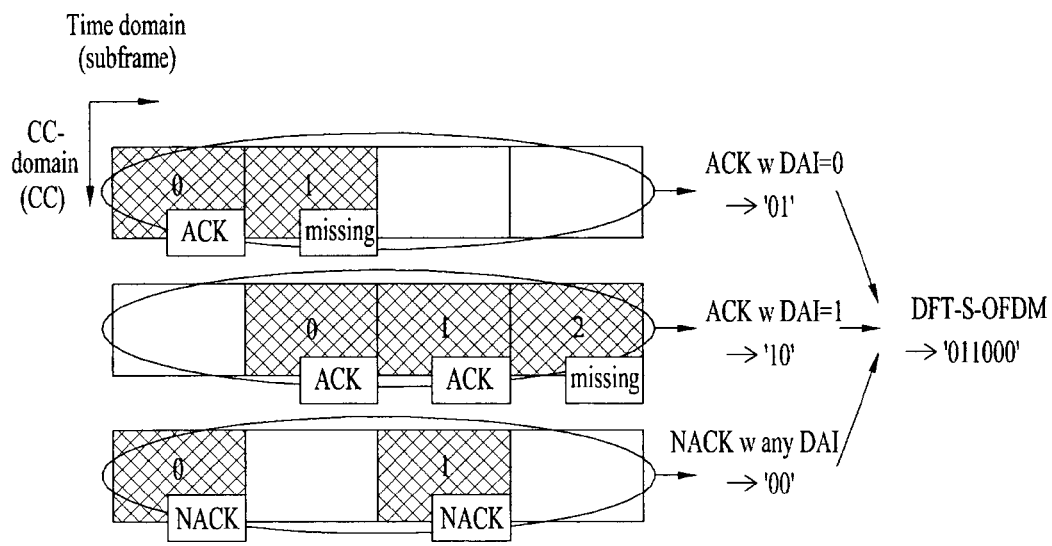
FIG. 43 is a diagram for one example of transmitting a partially-bundled ACK/NACK information per configuration carrier together with a last detected DAI value according to one embodiment of the present invention.

The above-described embodiment may be shown in FIG. 43.

FIG. 43 is a diagram for one example of transmitting a partially-bundled ACK/NACK information per configuration carrier together with a last detected DAI value according to one embodiment of the present invention.

Referring to FIG. 43, assume that 3 configuration carriers corresponding to one UL subframe for ACK/NACK response may exist. And, assume that each of the configuration carriers may have 4 DL subframes.

First of all, information bundled in association with a $1^{st}$ configuration carrier may become ACK information. Since a user equipment has missed '1' which is a DAI value of final PDCCH, a DAI value of a last detected PDCCH in the $1^{st}$ configuration carrier may become 0. In Table 25, the bundled information is ACK information and the DAI value of the last detected PDCCH is 0. Hence, a 2-bit combination of '01' may be generated.

Secondly, information bundled in association with a $2^{nd}$ configuration carrier may become ACK information. Since a user equipment has missed '2' which is a DAI value of final PDCCH, a DAI value of a last detected PDCCH in the $2^{nd}$ configuration carrier may become 1. In Table 25, the bundled information is ACK information and the DAI value of the last detected PDCCH is 1. Hence, a 2-bit combination of '10' may be generated.

Finally, since information bundled in association with a $3^{rd}$ configuration carrier is ACK information, a 2-bit combination of '00' may be generated.

Therefore, the user equipment may finally transmit information '011000' to a base station in accordance with DFT-S-OFDM transmission format.

Meanwhile, according to another embodiment of the present invention, as shown in Table 26, it may be able to configure a combination of ACK/NACK information bundled for each configuration carrier and DAI value information of a last detected PDCCH.

TABLE 26

| | | | | |
|---|---|---|---|---|
| A. ACK w DAI = 0 | → | 0 | → | '00' |
| B. ACK w DAI = 1 | → | 1 | → | '01' |
| C. ACK w DAI = 2 | → | 2 | → | '10' |
| D. ACK w DAI = 3 | → | 0 | → | '00' |
| E. NACK w any DAI | → | '11' | | |

Referring to Table 26, if bundled information is NACK information, it may have a 2-bit state of '00'. If bundled information is ACK information, it may have a 2-bit state corresponding to each value resulting from applying a modular 3 function to a value corresponding to a value of subtracting 1 from a total number of ACK informations. In particular, if the bundled information is the ACK information, a DAI value of a last detected PDCCH may have the same meaning of the value resulting from applying a modular 3 function to a value corresponding to a value of subtracting 1 from a total number of ACK informations.

Moreover, the above result may be implemented in a manner of applying the modular 3 function to the DAI value of the last detected PDCCH.

This may be described in detail with reference to Table 26 as follows.

First of all, if information bundled in a 1$^{st}$ configuration carrier is ACK information and there is one ACK information, it may become MOD [(1-1), 3]=0 and have a 2-bit state of '00' corresponding to 0.

If information bundled in a 2$^{nd}$ configuration carrier is ACK information and there are 2 ACK informations, it may become MOD [(2-1), 3]=1 and have a 2-bit state of '01' corresponding to 1.

If information bundled in a 3$^{rd}$ configuration carrier is ACK information and there are 3 ACK informations, it may become MOD [(3-1), 3]=2 and have a 2-bit state of '10' corresponding to 2.

If information bundled in a 4$^{th}$ configuration carrier is ACK information and there are 4 ACK informations, it may become MOD [(4-1), 3]=0 and have a 2-bit state of '00' corresponding to 0.

Finally, if information bundled in a 5$^{th}$ configuration carrier is NACK information and there are 2 ACK informations, it may have a 2-bit state of '00'.

Thereafter, a user equipment may finally combine the above informations together in accordance with DFT-S-OFDM transmission format and may then transmit the corresponding combination to a base station.

In the above-described embodiment, if the bundled information is ACK information and the DAI value of the last detected PDCCH is 0 or 3, the base station may not be able to identify the overlapped mappings. Yet, a space in-between is considerably large and the number of UL subframes is limited in TDD system. Hence, it may be less probable that a problem is caused.

The above embodiment may be described with reference to FIG. 44.

Figure 44:
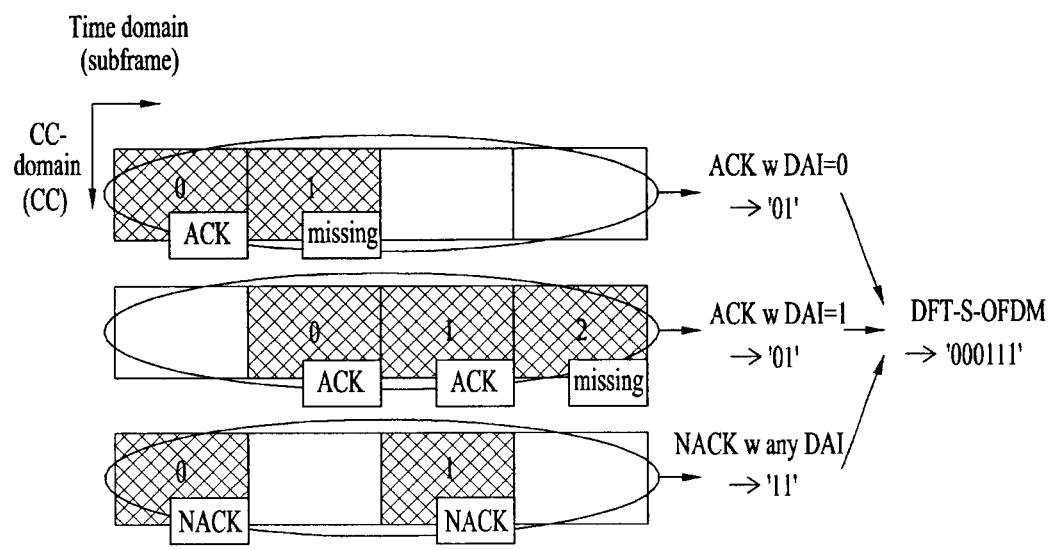
FIG. 44 is a diagram for one example of transmitting a partially-bundled ACK/NACK information per configuration carrier together with a last detected DAI value according to another embodiment of the present invention.

FIG. 44 is a diagram for one example of transmitting a partially-bundled ACK/NACK information per configuration carrier together with a last detected DAI value according to another embodiment of the present invention.

Referring to FIG. 44, if information bundled in a 1$^{st}$ configuration carrier is ACK information and there is one ACK information, it may become MOD [(1-1), 3]=0 and have a 2-bit state of '00' corresponding to 0 in accordance with Table 26.

If information bundled in a 2$^{nd}$ configuration carrier is ACK information and there are 2 ACK informations, it may become MOD [(2-1), 3]=1 and have a 2-bit state of '01' corresponding to 1 in accordance with Table 26.

Finally, if information bundled in a 3$^{rd}$ configuration carrier is NACK information and there are 2 ACK informations, it may generate a 2-bit combination of '11' in accordance with Table 26.

Thereafter, a user equipment may finally transmit information '000111' to a base station in accordance with DFT-S-OFDM transmission format.

Meanwhile, according to another embodiment of the present invention, as shown in Table 27, it may be able to configure a combination of ACK/NACK information bundled for each configuration carrier and DAI value information of a last detected PDCCH.

TABLE 27

| | | | | | |
|---|---|---|---|---|---|
| A. ACK w DAI = 0 | → | min (1, 3) | → | 1 | → '01' |
| B. ACK w DAI = 1 | → | min (2, 3) | → | 2 | → '10' |
| C. ACK w DAI = 2 | → | min (3, 3) | → | 3 | → '11' |
| D. ACK w DAI = 3 | → | min (4, 3) | → | 3 | → '11' |
| E. NACK w any DAI | → | '00' | | | |

In Table 26, informations may be combined according to Formula 4 as follows.

$$\min(DAI+1, 3) \quad \text{[Formula 4]}$$

In Formula 4, 'B' in a function min (A, B) may mean a maximum number that may be represented as 2 bits. Hence, Formula 4 may have the following meanings. First of all, if a value resulting from adding 1 to a DAI value of a last detected PDCCH is smaller than 3, the corresponding value may be used as it is. If the value becomes greater than 3, the corresponding value may be regarded as a smaller number 3 to use.

This may be construed as the following settings. First of all, if bundled information is NACK information, '00' may be transmitted. Secondly, if bundled information is ACK information, the number of ACKs (i.e., ACK-counter) may be transmitted. In doing so, the embodiment of the present invention may be applicable to maximum ACK information (e.g., if bundled information is ACK information and a DAI value of a last detected PDCCH is 3) by a separate method. If the contents shown in Table 26 are construed as transmitting total number of ACK informations, it may have the same meaning. In particular, if bundled information is NACK information, it may regard ACK counter as '0'. If bundled information is ACK information and a DAI value is 0~2, it may be handled as an ACK counter. In this case, if the bundled information is the ACK information and the DAI value is 3, it may be set to be mapped to a value except '0' among previously mapped values. For instance, mapping may be performed in the same manner of a largest ACK counter (=3). Yet, in order to minimize bad influence due to the error, it may be preferably mapped to a smallest ACK counter (=1) except 0.

A result identical to the contents shown in Table 27 may be brought by a following method. In particular, a user equipment may transmit ACK counter (binary numbers 0~3). If ACK counter is 4, the user equipment may transmit a decimal number '1' (i.e., binary number '01'). If a system enables ACK counter to have a value equal to or greater than 4, it may be able to additionally apply a modular operation. In this case, if bundled information is ACK information, a DAI value of a last detected PDCCH has the same value resulting from applying a modular 4 function to ACK counter and then subtracting 1 from the result thereof.

In the following description, contents of Table 27 having Formula 4 applied thereto may be explained in detail First of all, partially bundled information in a 1$^{st}$ configuration carrier is ACK information. And, a DAI value of a last detected PDCCH is 0. If Formula 4 is applied thereto, it may become min (1, 3)=1. Hence, it may have a 2-bit state of '01' corresponding to 1.

Secondly, partially bundled information in a 2$^{nd}$ configuration carrier is ACK information. And, a DAI value of a last detected PDCCH is 1. If Formula 4 is applied thereto, it may become min (2, 3)=2. Hence, it may have a 2-bit state of '10' corresponding to 2.

Thirdly, partially bundled information in a 3$^{rd}$ configuration carrier is ACK information. And, a DAI value of a last detected PDCCH is 2. If Formula 4 is applied thereto, it may become min (3, 3)=3. Hence, it may have a 2-bit state of '11' corresponding to 3.

Fourthly, partially bundled information in a $4^{th}$ configuration carrier is ACK information. And, a DAI value of a last detected PDCCH is 3. If Formula 4 is applied thereto, it may become min (4, 3)=3. Hence, it may have a 2-bit state of '11' corresponding to 3.

Finally, if bundled information in $5^{th}$ configuration carrier is NACK information, it may have a 2-bit state of '00'.

Thereafter, a user equipment may finally combine the above informations together in accordance with DFT-S-OFDM transmission format and may then transmit the result to a base station.

Meanwhile, according to another embodiment of the present invention, bundled ACK/NACK information and DAI value information of a last detected PDCCH may be mapped on a final format by being combined together in accordance with a preset rule.

First of all, if there are 2 codewords of a specific configuration carrier included in a prescribed subframe, spatial bundling may be performed between the codewords. In this case, the spatially bundled ACK/NACK information may become 1 bit. Yet, it may be possible not to perform the spatial bundling. In this case, the spatially bundled ACK/NACK information for a specific configuration carrier included in each subframe may become 1 bit or 2 bits in accordance with the number of codewords.

Secondly, using DAI value per configuration carrier, time domain partial bundling may be performed. In this case, the partially bundled ACK/NACK information per configuration carrier may become 1 bit.

Thereafter, final bit information may be determined per configuration carrier in accordance with a predetermined mapping rule for a DAI value of a last detected PDCCH per configuration carrier and the formerly determined partially bundled ACK/NACK information. For instance, the predetermined mapping rule may apply to one of the rules shown in Table 25 to 27. For clarity and convenience, in the description of the above-mentioned method, the final bits are assumed as 2 bits. Alternatively, bits greater or smaller than 2 bits may be allocated.

Meanwhile, if the spatial bundling is not performed between the codewords, ACK/NACK information bundled per codeword of each configuration carrier may be calculated and spatial bundling may be then performed thereon.

Moreover, if the spatial bundling is not performed between the codewords, final bits may become 2 bits (in case of 1 codeword) or 4 bits (in case of 2 codewords) in accordance with the number of codewords.

In this case, it may be able to assume a case that PDCCH carries maximum transport blocks. If the PDCCH carries transport blocks equal to or less than the maximum transport blocks, control information on each of the transport blocks except the transport blocks actually carried on the PDCCH among the maximum transport blocks may be regarded as NACK information. Moreover, it may be handled to have the same value of the control information on the actually carried transport blocks.

Finally, information on final bits may be combined in accordance with a predetermined rule (e.g., sequential mapping in accordance with a logical CC index, a mapping by an interleaver, etc.) and may be then transmitted by being mapped on a final format through channel coding (e.g., Reed-Muller coding, etc.).

As mentioned in the foregoing description, if bundled ACK/NACK information is ACK information, a DAI value of a last detected PDCCH may have the same meaning of a value resulting from subtracting 1 from a value of applying a modular 4 function to ACK counter. Moreover, if bundled ACK/NACK information is NACK information, a DAI value of a last detected PDCCH may have the same meaning of ACK counter 0. Therefore, when the present invention is applied, it may be able to design the following. First of all, the NACK state is mapped in a manner that ACK counter is 0. Secondly, the ACK counter may be simply transmitted.

In this case, the ACK counter may mean a constellation point except 1 NACK state among a plurality of constellations including channel selection and may be transmitted to a base station by having a modular operation applied thereto.

For instance, in case of using BPSK constellation and 2 PUCCH resources, it may be possible to assign one state for NACK information among 4 constellation points and to map each value of ACK counter having a modular function 3 applied thereto for the rest of 3 states.

This is shown in Table 28 and Table 29.

In Table 28 and Table 29, if bundled ACK/NACK information is ACK information, transmission bits may be determined in a manner of applying a modular 3 function to ACK counter which is the total number of ACK informations.

In doing so, mapping according to an operation result value may be performed by a predetermined rule. If bundled ACK/NACK information is NACK information, it may be mapped to a state previously assigned for the NACK information.

TABLE 28

| | | | | | |
|---|---|---|---|---|---|
| A. ACK-counter modular 3 == 0 | → | min (1, 3) | → | 1 | → '01' |
| B. ACK-counter modular 3 == 1 | → | min (2, 3) | → | 2 | → '10' |
| C. ACK-counter modular 3 == 2 | → | min (3, 3) | → | 3 | → '11' |
| D. NACK w any DAI | → | '00' | | | |

Referring to Table 28, in a $1^{st}$ configuration carrier, a value of applying a modular 3 function to a calculated ACK counter value may become 0. In this case, if Formula 4 is applied thereto, it may become min (1, 3)=1. Hence, it may have a 2-bit state of '01' corresponding to 1.

In a $2^{nd}$ configuration carrier, a value of applying a modular 3 function to a calculated ACK counter value may become 1. In this case, if Formula 4 is applied thereto, it may become min (2, 3)=2. Hence, it may have a 2-bit state of '10' corresponding to 2.

In a $3^{rd}$ configuration carrier, a value of applying a modular 3 function to a calculated ACK counter value may become 2. In this case, if Formula 4 is applied thereto, it may become min (3, 3)=3. Hence, it may have a 2-bit state of '11' corresponding to 3.

Finally, if bundled information in a $4^{th}$ configuration carrier is NACK information, it may have a 2-bit state of '00'.

Moreover, it may be able to implement the following modification shown in Table 29.

TABLE 29

| | | | | | |
|---|---|---|---|---|---|
| A. ACK-counter modular 3 == 0 | → | min (1, 3) | → | 0 | → '00' |
| B. ACK-counter modular 3 == 1 | → | min (2, 3) | → | 2 | → '01' |
| C. ACK-counter modular 3 == 2 | → | min (3, 3) | → | 3 | → '10' |
| D. NACK w any DAI | → | '11' | | | |

Referring to Table 29, in a $1^{st}$ configuration carrier, a value of applying a modular 3 function to a calculated ACK counter value may become 0. In this case, if Formula 4 is applied thereto, it may become min (1, 3)=1. Hence, it may have a 2-bit state of '00' corresponding to 1.

In a $2^{nd}$ configuration carrier, a value of applying a modular 3 function to a calculated ACK counter value may become 1.

In this case, if Formula 4 is applied thereto, it may become min (2, 3)=2. Hence, it may have a 2-bit state of '01' corresponding to 2 instead of '10'.

In a $3^{rd}$ configuration carrier, a value of applying a modular 3 function to a calculated ACK counter value may become 2. In this case, if Formula 4 is applied thereto, it may become min (3, 3)=3. Hence, it may have a 2-bit state of '10' corresponding to 3 unlike Table 28.

Finally, if bundled information in a $4^{th}$ configuration carrier is NACK information, it may have a 2-bit state of '11' unlike Table 28.

According to the above-mentioned embodiment, a user equipment may transmit ACK/NACK information bundled per configuration carrier and a DAI value of a last detected PDCCH through DFT-O-OFDM structure to a base station. One example related to this DFT-S-OFDM structure may be shown in FIG. 45.

Figure 45:
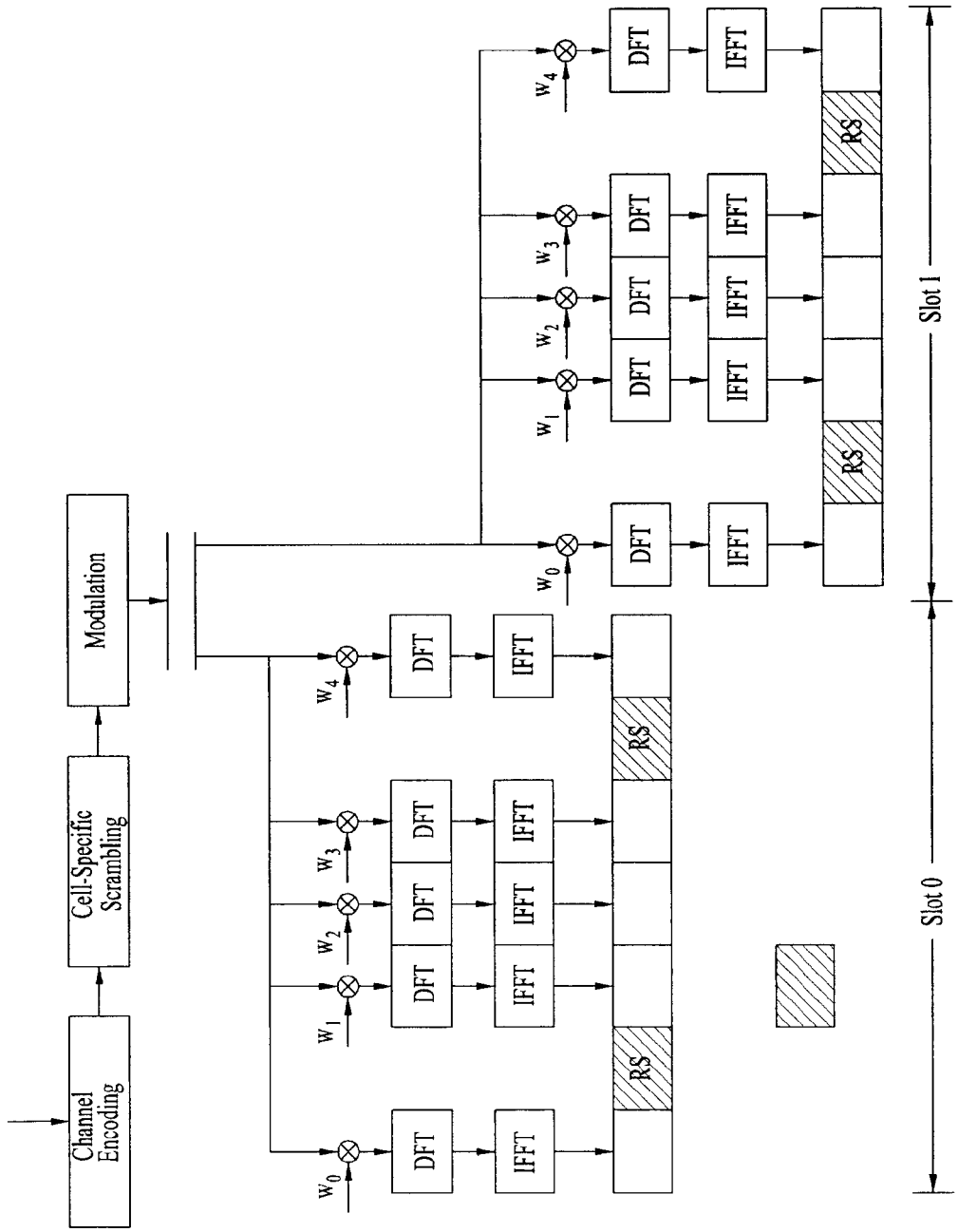
FIG. 45 is a diagram for one example of transmitting a bundled ACK/NACK information per configuration carrier together with a last detected DAI value of PDCCH to a base station via DFT-S-OFDM structure according to one embodiment of the present invention.

FIG. 45 is a diagram for one example of transmitting a bundled ACK/NACK information per configuration carrier together with a last detected DAI value of PDCCH to a base station via DFT-S-OFDM structure according to one embodiment of the present invention.

The DFT-S-OFDM structure shown in FIG. 45 shows one example of a structure capable of transmitting information more than that of a conventional method, which may non-limit a final transmission format having the present invention applied thereto. Moreover, a resource allocated location in the final transmission format shown in FIG. 45 may be just exemplary, by which the present invention may be non-limited.

Yet, the above-mentioned contents of the present invention may be applicable to a plurality of PDCCHs included in a plurality of configuration carriers, by which the present invention may be non-limited. And, the present invention may be applicable to PDCCH in at least one DL subframe in TDD. In particular, it may be apparent that the contents of the present invention are applicable to a method of transmitting ACK/NACK information on PDCCH in at least one DL subframe including a plurality of configuration carriers to a base station in a manner of bundling the ACK/NACK information. The DL subframe, which is a unit of applying bundling, may be called a bundling window (M).

Meanwhile, when the present invention is applied, using DFT-SOFDM structure may be just one example. And, other methods may be applicable as well.

In particular, it may be possible for a user equipment to transmit ACK/NACK information bundled per configuration carrier and a DAI value of a last detected PDCCH through channel selection.

This may be described in detail with reference to FIG. 46 as follows.

Figure 46:
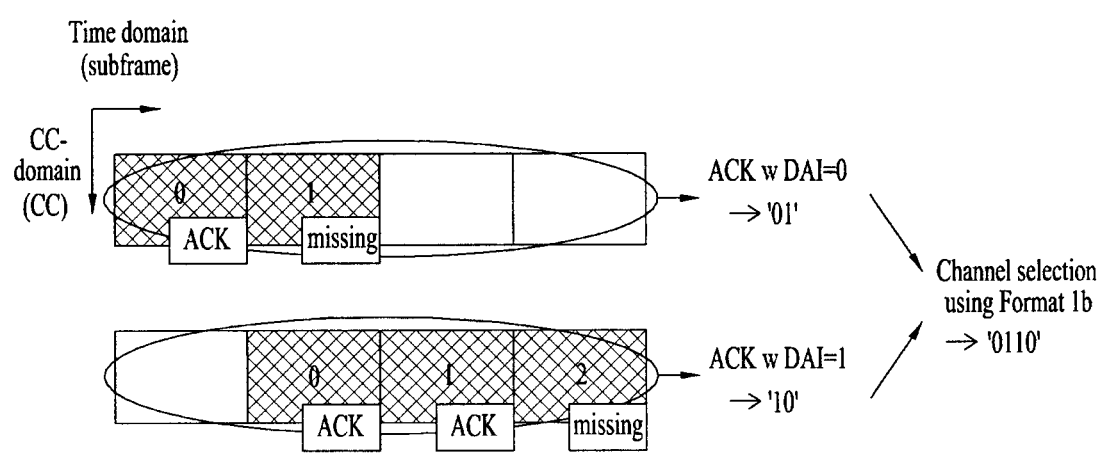
FIG. 46 is a diagram for one example of transmitting a partially-bundled ACK/NACK information per configuration carrier together with a last detected DAI value via channel selection according to another embodiment of the present invention.

FIG. 46 is a diagram for one example of transmitting a partially-bundled ACK/NACK information per configuration carrier together with a last detected DAI value via channel selection according to another embodiment of the present invention.

In FIG. 46, 2 configuration carriers are shown. Since bits of information carried on each configuration carrier are 2 bits, information transmission amounting to total 4 bits may be required.

In this case, ACK/NACK information bundled through channel selection using 4 PUCCH resources and a DAI value of a last detected PDCCH may be transmitted together through channel selection.

As mentioned in the foregoing description, channel selection may mean a method of representing information using a selected channel (or resource) as well as information actually transmitted via a specific structure. In particular, after a plurality of channels have been assigned, it may be able to represent a transmitted information in accordance with what channel is selected by a user equipment.

Referring to FIG. 46, information '0110' may be finally generated. In this case, it may be able to apply a rule of regarding the final information '0110' as ACK or NACK information. For instance, '0' and '1' may be regarded as ACK information and NACK information, respectively, and vice versa. For this, it may be able to apply a channel selection mapping table, which is shown in Table 30 or Table 31.

Table 30 and Table 31 show channel selection mapping tables related to channel selection using 4 PUCCH resources for 4-bit information transmission.

Table 31 and Table 32 may indicate what kind of symbol (e.g., a modulated symbol) is transmitted on which one of a plurality of PUCCH channels in accordance with the bit number and information of ACK/NACK to transmit.

In accordance with information to be transmitted by a user equipment, the user equipment may select one channel (i.e., PUCCH resource) and a modulated symbol using such a mapping table as Table 31 and Table 32 and may then transmit the information in a predetermined format (e.g., LTE Rel-8 PUCCH Format 1a, LTE Rel-8 PUCCH Format 1b, etc.).

When a channel selection mapping table is applied to the present invention, it may be able to use a new mapping table. Alternatively, a previously existing mapping table may be modified and applied.

TABLE 30

| PCC | SCC | ch1 | ch2 | ch3 | ch4 |
|-----|-----|-----|-----|-----|-----|
| DTX | DTX | 0   | 0   | 0   | 0   |
| N, N | DTX | 1  |     |     |     |
| N, A | DTX | -j |     |     |     |
| A, N | DTX | j  |     |     |     |
| A, A | DTX | -1 |     |     |     |
| DTX | N, N | 0  | 0   | 0   | 0   |
| N, N | N, N | 1  |     |     |     |
| N, A | N, N | -j |     |     |     |
| A, N | N, N | j  |     |     |     |
| A, A | N, N | -1 |     |     |     |
| DTX | N, A |    | -j  |     |     |
| N, N | N, A |    | -j  |     |     |
| N, A | N, A |    |     | -j  |     |
| A, N | N, A |    |     | j   |     |
| A, A | N, A |    |     | -1  |     |
| DTX | A, N |    | j   |     |     |
| N, N | A, N |    | j   |     |     |
| N, A | A, N |    |     |     | -j  |
| A, N | A, N |    |     |     | j   |
| A, A | A, N |    |     |     | -1  |
| DTX | A, A |    |     | -1  |     |
| N, N | A, A |    |     | -1  |     |
| N, A | A, A |    |     |     | 1   |
| A, N | A, A |    |     | 1   |     |
| A, A | A, A |    | 1   |     |     | ch1 is derived from PCC
ch2 is derived from SCC
ch3 is derived from PCC
ch4 is derived from SCC If a DTX state exists in a channel selection mapping table, it may cause a problem of a corresponding definition of the DTX state. In this case, the DTX state may be set to have the same channel selection value of NACK information. In case that a channel selection mapping table is reused with the information in the present invention, it may be able to set the DTX state in the table to be ignored. Alternatively, after a predetermined part of a table has been designated in advance, the same information, which should be transmitted by an index of a row in the previously designated part, may be selected and transmitted.

Referring to Table 30, it may be possible to set $2^{nd}$ to $17^{th}$ rows or $1^{st}$ to $16^{th}$ rows for the transmission of 4-bit information. In this case, a row fully containing DTX states may be excluded from the setting part.

Moreover, it may be able to configure a channel selection mapping table related to channel selection using 4 PUCCH resources as shown in Table 31.

TABLE 31

| | | (b(0), b(1)) | | | |
|---|---|---|---|---|---|
| CC-0 | CC-1 | Ch0 | Ch1 | Ch2 | Ch3 |
| A, A | A, A | none | none | none | (1, 1) |
| A, N | A, A | none | none | none | (1, 0) |
| N, A | A, A | none | none | none | (0, 1) |
| N, N | A, A | none | none | (1, 1) | none |
| A, A | A, N | none | none | (0, 0) | none |
| A, N | A, N | none | (1, 1) | none | none |
| N, A | A, N | none | (1, 0) | none | none |
| N, N | A, N | none | none | (1, 0) | none |
| A, A | N, A | none | none | none | (0, 0) |
| A, N | N, A | none | (0, 1) | none | none |
| N, A | N, A | none | (0, 0) | none | none |
| N, N | N, A | none | none | (0, 1) | none |
| A, A | N, N | (1, 1) | none | none | none |
| A, N | N, N | (1, 0) | none | none | none |
| N, A | N, N | (0, 1) | none | none | none |
| N, N | N, N | (0, 0) | none | none | none |
| A, A | DTX | (1, 1) | none | none | none |
| A, N | DTX | (1, 0) | none | none | none |
| N, A | DTX | (0, 1) | none | none | none |
| N, N | DTX | (0, 0) | none | none | none |
| DTX | A, A | none | none | (1, 1) | none |
| DTX | A, N | none | none | (1, 0) | none |
| DTX | N, A | none | none | (0, 1) | none |
| DTX | N, N | none | none | none | none |
| DTX | DTX | none | none | none | none |

Yet, Table 30 and Table 31 show examples related to channel selection for 4-bit ACK/NACK information transmission for clarity. Alternatively, it may be able to configure a channel selection mapping table for transmission of ACK/NACK information including bits more than 4 bits.

Meanwhile, if a user equipment fails in receiving data, it may be regarded as a DTX (discontinuous transmission) state. Alternatively, it may be handled as a case of having no received data in accordance with a predetermined rule. Alternatively, it may be handled in the same manner of NACK (i.e., decoding is unsuccessful despite receiving data).

When the present invention is applied, how to handle DTX information may be explained in detail as follows.

First of all, DTX information may be regarded as NACK information. In particular, this may be a most general method. If DTX state is generated in a user equipment, the DTX information may be handled as the NACK information.

If DTX information is generated, it may be able to make a report on bundled ACK/NACK information on PDCCH right before the generated DTX information. In particular, PDCCHs including a last PDCCH until the generation of the DTX information may be regarded as received by the user equipment. And, responses to the PDCCHs including the last PDCCH until the generation of the DTX information may be then transmitted. In this case, instead of regarding every DTX information as NACK information, it may be able to report the bundled ACK/NACK information up to the last PDCCH before the DTX information.

When DTX information is generated, only if a responses to the PDCCHs until the generation of the DTX information is ACK information, it may be able to make a report on the bundled ACK/NACK information. In particular, when the DTX information is generated, if a response to the PDCCHs before the DTX information is ACK information, the PDCCHs including the last PDCCH before the DTX information may be regarded as received and a response to the PDCCHs including the last PDCCH before the DTX information may be transmitted. Yet, if a response to the PDCCHs until the generation of the DTX information is NACK information, no response may be made. Through this, even if DTX information is generated, it may be able to prevent all bundled ACK/NACK information from being handled as NACK. And, it may be able to successfully complete the transmission of PDCCHs of the previous ACK information.

One of a plurality of the DTX information handling methods may be selected and applied to the present invention.

The application of the present invention may be instructed to a user equipment through an upper layer configuration. Alternatively, the present may be configured to be applied in a situation specifically predetermined by a user equipment.

The aforesaid embodiments of the present invention may be applicable to various UL control information transmissions. By applying the same principle, SR information and the number of ACK/NACK informations may be variously applicable as well. And, it may be apparent that a new control information transmitting method may be derived by combining a plurality of the embodiments together. Moreover, it may be apparent that transmission bits of the corresponding embodiment may be applicable to control information transmissions of various embodiments.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, embodiments of the present invention are described centering on the data transmission/reception relations between a base station and a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment may be performed by a base station or other networks except the base station. In this case, 'base station' can be replaced by such a terminology as a fixed station, a Node B, an eNode B (eNB), an access point and the like. And, 'terminal' may be replaced by such a terminology as a user equipment (UE), a user equipment (MS), a mobile subscriber station (MSS)' and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

As mentioned in the foregoing description, the detailed descriptions for the preferred embodiments of the present invention may be provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

[Industrial Applicability]

As mentioned in the foregoing description, a method of transmitting control information in a wireless communication system and apparatus therefor may be described with reference to an example applied to 3GPP LTE system. Moreover, the present invention may be applicable to various mobile communication systems as well as to the 3GPP LTE system.

The invention claimed is:

1. A method of transmitting control information, which is transmitted to a base station by a user equipment in a wireless communication system, the method comprising:
   receiving at least one physical channel including at least one physical downlink control channel (PDCCH) from the base station via at least one serving cell configured in the user equipment;
   bundling acknowledgement/negative acknowledgement (ACK/NACK) information for at least a part of the at least one physical channel;
   determining downlink assignment index (DAI) information last detected by the user equipment from among at least one DAI information carried on the at least one PDCCH, each DAI information indicating an assignment order of a corresponding PDCCH;
   selecting a physical uplink control channel (PUCCH) resource from at least one PUCCH resource and a modulation value from a plurality of modulation values, the at least one PUCCH resource being associated with the at least one PDCCH; and
   transmitting the selected modulation value to the base station using the selected PUCCH resource,
   wherein a combination of the selected PUCCH resource and the selected modulation value identifies the bundled ACK/NACK information and the last detected DAI information,
   wherein, when the bundled ACK/NACK information corresponds to an ACK, the PUCCH resource and the modulation value are selected using the bundled ACK/NACK information and the last detected DAI information, and
   wherein, when the bundled ACK/NACK information corresponds to a NACK, the PUCCH resource and the modulation value are selected using the bundled ACK/NACK information only.

2. The method of claim 1, wherein when the bundled ACK/NACK information corresponds to a NACK, the selected PUCCH resource is a pre-set PUCCH resource among the at least one PUCCH resource.

3. The method of claim 2, wherein when the bundled ACK/NACK information corresponds to an ACK, the selected PUCCH resource is a PUCCH resource except the pre-set PUCCH resource among the at least one PUCCH resource.

4. The method of claim 1, wherein the bundling comprises a full bundling.

5. The method of claim 1, wherein the at least one physical channel further includes at least one physical downlink shared channel (PDSCH) each of which carries one or more transport blocks, and the bundled ACK/NACK information relates to the one or more transport blocks.

6. The method of claim 5, wherein when the number of the one or more transport blocks is smaller than a maximum number of transport blocks, ACK/NACK information for each transport block except transport blocks actually carried by the PDSCH among the maximum number of transport blocks is set to a NACK.

7. The method of claim 5, wherein when the number of the one or more transport blocks is smaller than a maximum number of transport blocks, ACK/NACK information for each transport block except transport blocks actually carried by the PDSCH among the maximum number of transport blocks is set equal to ACK/NACK information for the actually carried transport blocks.

8. The method of claim 1, wherein when ACK/NACK information for the at least one physical channel includes a discontinuous transmission (DTX), the bundled ACK/NACK information and the last detected DAI information relate to a PDCCH received before the DTX is detected.

9. A method of receiving control information, which is received by a base station from a user equipment in a wireless communication system, the method comprising:
   transmitting physical channel including at least one physical downlink control channel (PDCCH) via at least one serving cell configured in the user equipment; and
   receiving a modulation value from the user equipment using a physical uplink control channel (PUCCH) resource in response to the at least one physical channel,
   wherein a combination of the received modulation value and the PUCCH resource identifies bundled acknowledgement/negative acknowledgement (ACK/NACK) information for at least a part of the at least one physical channel and downlink assignment index (DAI) information last detected by the user equipment from among at least one DAI information carried on the at least one PDCCH, each DAI information indicating an assignment order of a corresponding PDCCH,
   wherein, when the bundled ACK/NACK information corresponds to an ACK, the PUCCH resource and the modulation value are selected by the user equipment using the bundled ACK/NACK information and the last detected DAI information, and
   wherein, when the bundled ACK/NACK information corresponds to a NACK, the PUCCH resource and the modulation value are selected by the user equipment using the bundled ACK/NACK information only.

10. A user equipment configured to transmit control information to a base station in a wireless communication system, comprising:
- a receiver configured to receive at least one physical channel including at least one physical downlink control channel (PDCCH) from the base station via at least one serving cell configured in the user equipment;
- a processor configured to bundle acknowledgement/negative acknowledgement (ACK/NACK) information for at least a part of the at least one physical channel, determine downlink assignment index (DAI) information last detected by the user equipment from among at least one DAI information carried on the at least one PDCCH, each DAI information indicating an assignment order of a corresponding PDCCH, select a physical uplink control channel (PUCCH) resource from at least one PUCCH resource and a modulation value from a plurality of modulation values, the at least one PUCCH resource being associated with the at least one PDCCH; and
- a transmitter configured to transmit the selected modulation value to the base station using the selected PUCCH resource,
- wherein a combination of the selected PUCCH resource and the selected modulation value identifies the bundled ACK/NACK information and the last detected DAI information,
- wherein when the bundled ACK/NACK information corresponds to an ACK, the PUCCH resource and the modulation value are selected using the bundled ACK/NACK information and the last detected DAI information, and
- wherein when the bundled ACK/NACK information corresponds to a NACK, the PUCCH resource and the modulation value are selected using the bundled ACK/NACK information only.

11. The user equipment of claim 10, wherein when the bundled ACK/NACK information corresponds to a NACK, the selected PUCCH resource is a pre-set PUCCH resource among the at least one PUCCH resource.

12. The user equipment of claim 11, wherein when the bundled ACK/NACK information corresponds to an ACK, the selected PUCCH resource is a PUCCH resource except the pre-set PUCCH resource among the at least one PUCCH resource.

13. The user equipment of claim 10, wherein the at least one physical channel further includes at least one physical downlink shared channel (PDSCH) each of which carries one or more transport blocks, and the bundled ACK/NACK information relates to the one or more transport blocks.

14. The user equipment of claim 13, wherein when the number of the one or more transport blocks is smaller than a maximum number of transport blocks, ACK/NACK information for each transport block except transport blocks actually carried by the PDSCH among the maximum number of transport blocks is set to a NACK.

15. The user equipment of claim 13, wherein when the number of the one or more transport blocks is smaller than a maximum number of transport blocks, ACK/NACK information for each transport block except transport blocks actually carried by the PDSCH among the maximum number of transport blocks is set equal to ACK/NACK information for the actually carried transport blocks.

16. The user equipment of claim 10, wherein when ACK/NACK information for the at least one physical channel includes a discontinuous transmission (DTX), the bundled ACK/NACK information and the last detected DAI information relate to a PDCCH received before the DTX is detected.

17. The user equipment of claim 10, wherein the bundling comprises a full bundling.

18. The method of claim 9, wherein when the bundled ACK/NACK information corresponds to a NACK, the selected PUCCH resource is a pre-set PUCCH resource among the at least one PUCCH resource.

19. The method of claim 18, wherein when the bundled ACK/NACK information corresponds to an ACK, the selected PUCCH resource is a PUCCH resource except the pre-set PUCCH resource among the at least one PUCCH resource.

20. The method of claim 9, wherein the at least one physical channel further includes at least one physical downlink shared channel (PDSCH) each of which carries one or more transport blocks, and the bundled ACK/NACK information relates to the one or more transport blocks.

* * * * *